United States Patent
Kawazoe

(10) Patent No.: US 11,505,955 B2
(45) Date of Patent: Nov. 22, 2022

(54) BINDING MACHINE

(71) Applicant: MAX CO., LTD., Tokyo (JP)

(72) Inventor: Akira Kawazoe, Tokyo (JP)

(73) Assignee: MAX CO., LTD., Tokyo (JP)

( * ) Notice: Subject to any disclaimer, the term of this patent is extended or adjusted under 35 U.S.C. 154(b) by 585 days.

(21) Appl. No.: 16/456,212

(22) Filed: Jun. 28, 2019

(65) Prior Publication Data
US 2020/0002963 A1    Jan. 2, 2020

(30) Foreign Application Priority Data

Jun. 29, 2018 (JP) .............................. JP2018-125602

(51) Int. Cl.
*E04G 21/12* (2006.01)
*B65B 13/02* (2006.01)

(52) U.S. Cl.
CPC .......... *E04G 21/123* (2013.01); *B65B 13/025* (2013.01)

(58) Field of Classification Search
CPC ........ B21F 15/02; B21F 15/04; B65B 13/025; B65B 13/04; B65B 13/08; B65B 13/16; E04G 21/122; E04G 21/123
See application file for complete search history.

(56) References Cited

U.S. PATENT DOCUMENTS

| | | |
|---|---|---|
| 5,947,166 A | 9/1999 | Doyle et al. |
| 2007/0199610 A1* | 8/2007 | Itagaki .................. E04G 21/123 140/93.6 |
| 2010/0147411 A1 | 6/2010 | Kusakari et al. |
| 2014/0246114 A1 | 9/2014 | Kusakari et al. |
| 2015/0267423 A1 | 9/2015 | Kusakari et al. |
| 2016/0031575 A1 | 2/2016 | Shindou |
| 2016/0222683 A1 | 8/2016 | Kusakari et al. |
| 2017/0218631 A1 | 8/2017 | Matsuno |

(Continued)

FOREIGN PATENT DOCUMENTS

| | | |
|---|---|---|
| CN | 1151129 A | 6/1997 |
| CN | 102441625 A | 5/2012 |

(Continued)

OTHER PUBLICATIONS

Partial European Search Report issued in Application No. 19182918.3, dated Nov. 28, 2019, 26 pages.

(Continued)

*Primary Examiner* — Debra M Sullivan
(74) *Attorney, Agent, or Firm* — Weihrouch IP

(57) ABSTRACT

A binding machine comprises a cutting portion which cuts the wire, a fixed blade in which a first wire passage through which the wire passes is formed; and a movable blade in which a second wire passage through which the wire passes is formed. The movable blade includes a blade portion provided on one side of the second wire passage and a passage forming member provided on the other side of the second wire passage, the second wire passage includes a guiding portion for guiding the wire after cutting in a movement when the movable blade moves from the movement finish position to the standby position, and the guiding portion is protrudes in a direction of the guide portion and blocks a portion between the movable blade and the guide portion in a non-wire-passing-through manner when the movable blade moves to the standby position.

1 Claim, 32 Drawing Sheets

(56) References Cited

U.S. PATENT DOCUMENTS

| | | |
|---|---|---|
| 2018/0202178 A1 | 7/2018 | Shima et al. |
| 2018/0363309 A1 | 12/2018 | Kusakari et al. |
| 2019/0194959 A1* | 6/2019 | Shima ................... B21F 15/04 |
| 2020/0149279 A1 | 5/2020 | Matsuno |

FOREIGN PATENT DOCUMENTS

| | | |
|---|---|---|
| CN | 104494897 A | 4/2015 |
| CN | 107031891 A | 8/2017 |
| DE | 112016002691 T5 | 3/2018 |
| EP | 2196600 A2 | 6/2010 |
| EP | 2980335 A1 | 2/2016 |
| EP | 3336281 A1 | 6/2018 |
| JP | 5309947 B2 | 7/2013 |
| JP | 2016-210442 A | 12/2016 |

OTHER PUBLICATIONS

Extended European Search Report issued in Application No. 19182918.3, dated Mar. 26, 2020, 27 pages.
Chinese OA for CN Application No. 201910589659.8 dated Mar. 16, 2022 (9 pp.) with machine English Translation.

* cited by examiner

BINDING MACHINE

CROSS-REFERENCE TO RELATED APPLICATIONS

This application is based on and claims priority to Japanese Patent Application No. 2018-125602 filed on Jun. 29, 2018, the disclosures of which are incorporated herein in their entirety by reference, and priority is claimed to the foregoing.

TECHNICAL FIELD

The present disclosure relates to a binding machine for binding a binding target material such as a reinforcing bar with a wire.

BACKGROUND ART

In recent years, there has been proposed a binding machine called a "reinforcing bar binding machine", in which a wire is wound around reinforcing bars and the plurality of reinforcing bars are bound by twisting the wire.

In the related art, in this kind of reinforcing bar binding machine, a wire wound around a wire reel is fed toward a tip end side of a binding machine body by a feeding mechanism and the fed wire is curled by a curl guide provided on the tip end side of the binding machine body. In this case, the wire is curled so as to surround the reinforcing bars. The wire curled along a perimeter of the reinforcing bar is cut by a cutter and then twisted by a twisting mechanism.

The cutter is configured by a fixed blade having a wire through hole through which the wire can pass, a movable blade sliding on an outer peripheral surface of the fixed blade, and a link member for driving the movable blade. In order to cut the wire, the movable blade may be slid by the link member with the wire passing through the wire through hole. The movable blade is formed with an engaging portion which engages with a vicinity of an end portion of the cut wire and is capable of bending and holding the vicinity of the end portion. In the engaging portion, a part engaging with the wire is formed at an acute angle so that the wire can be bent and held. By holding the vicinity of the end portion of the wire, it is possible to prevent the vicinity of the end portion from being caught and clogged between the curl guide and the cutter or between the movable blade and the link member, or the like (see Japanese Patent No. 5309947, for example).

SUMMARY

It is possible to hold the vicinity of the end portion of the wire by forming the engaging part of the engaging portion at an acute angle. However, the repeated use may cause gradual wear on the engaging part, which may not make it possible to firmly hold the vicinity of the end portion. As a result, it is conceivable that the vicinity of the end portion may be caught and clogged between the curl guide and the cutter or between the movable blade and the link member, or the like.

The present disclosure is made to solve such problems and an object thereof is to provide a binding machine capable of preventing a vicinity of an end portion of a cut wire from being caught and clogged between a curl guide and a cutter or between a movable blade and a link member, or the like.

To solve the problem shown above, an aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire;
a first abutment portion which is provided between the wire feeding portion and the cutting portion and on a first side of a feeding path of the wire and capable of abutting on the wire from the first side; and
a guide portion which is provided on a downstream side of the cutting portion and on a second side opposite to the first side with respect to the feeding path of the wire, includes a second abutment portion capable of abutting on the wire from the second side, and regulates an advancing direction of the wire and causes the wire to curl by making the second abutment portion abut on the wire in a state where the wire abuts on the first abutment portion, wherein
the cutting portion includes:
a fixed blade in which a first wire passage through which the wire passes is formed; and
a movable blade in which a second wire passage through which the wire passes is formed and which slides on an outer peripheral surface of the fixed blade and cuts the wire,
the movable blade is capable of moving between a standby position where the first wire passage and the second wire passage communicate with each other and a movement finish position where the first wire passage and the second wire passage do not communicate with each other by sliding on the outer peripheral surface of the fixed blade,
the second wire passage includes a guiding portion for guiding the wire after cutting in a movement when the movable blade moves from the movement finish position to the standby position, and
the guiding portion is located on the second side and is configured to protrude in a direction of the guide portion and blocks a portion between the movable blade and the guide portion in a non-wire-passing-through manner when the movable blade moves to the standby position.

In the invention, when the movable blade moves to the standby position, the wire after cutting is guided by the guiding portion and the portion between the movable blade and the guide portion is blocked in a non-wire-passing-through manner.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire;
a first abutment portion provided between the wire feeding portion and the cutting portion and on a first side of a feeding path of the wire and capable of abutting on the wire from the first side; and
a guide portion which is provided on a downstream side of the cutting portion and on a second side opposite to the first side with respect to the feeding path of the wire, includes a second abutment portion capable of abutting on the wire from the second side, and regulates an advancing direction of the wire and causes the wire to curl by making the second abutment portion abut on the wire in a state where the wire abuts on the first abutment portion, wherein the cutting portion includes:
- a fixed blade in which a first wire passage through which the wire passes is formed; and
- a movable blade in which a second wire passage through which the wire passes is formed and which slides on an outer peripheral surface of the fixed blade and cuts the wire, the movable blade is capable of moving between a standby position where the first wire passage and the second wire passage communicate with each other and a movement finish position where the first wire passage and the second wire passage do not communicate with each other by sliding on the outer peripheral surface of the fixed blade, the second wire passage includes a guiding portion for guiding the wire after cutting in a movement when the movable blade moves from the movement finish position to the standby position, and in the second wire passage, an opening on a side facing the guide portion is expanded toward the second side along a movement direction of the movable blade with respect to an opening on a side opposite to the fixed blade.

In the invention, when the movable blade moves to the standby position, the wire after cutting is guided by the guiding portion.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along a feeding direction of the wire and causes the wire to curl by regulating an advancing direction of the wire, wherein the cutting portion includes:
- a fixed blade in which a first wire passage through which the wire passes is formed;
- a movable blade in which a second wire passage through which the wire passes is formed and which slides on an outer peripheral surface of the fixed blade and cuts the wire; and
- a driving member which is connected to the movable blade and drives the movable blade, the movable blade is capable of moving between a standby position where the first wire passage and the second wire passage communicate with each other and a movement finish position where the first wire passage and the second wire passage do not communicate with each other by sliding on the outer peripheral surface of the fixed blade, and in the cutting portion, an opening which is equal to or larger than a diameter of the wire is formed between the movable blade and the driving member when the movable blade moves to the standby position.

In the invention, even when the movable blade moves to the standby position and a rear end of the wire is pinched between the movable blade and the driving member, the wire can easily be removed from a portion between the movable blade and the driving member.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along the feeding direction of the wire and causes the wire to curl by regulating an advancing direction of the wire, wherein the cutting portion includes:
- a fixed blade in which a first wire passage through which the wire passes is formed;
- a movable blade in which a second wire passage through which the wire passes is formed and which slides on an outer peripheral surface of the fixed blade and cuts the wire; and
- a driving member which is connected to the movable blade and drives the movable blade, the movable blade is capable of moving between a standby position where the first wire passage and the second wire passage communicate with each other and a movement finish position where the first wire passage and the second wire passage do not communicate with each other by sliding on the outer peripheral surface of the fixed blade, and the cutting portion is configured such that a distance between the movable blade and the driving member is less than the diameter of the wire when the movable blade moves to the standby position.

In the invention, when the movable blade moves to the standby position, the wire is prevented from being pinched between the movable blade and the driving member.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along the feeding direction of the wire and causes the wire to curl by regulating an advancing direction of the wire, wherein the cutting portion includes:
- a fixed blade in which a first wire passage through which the wire passes is formed;
- a movable blade in which a second wire passage through which the wire passes is formed and which slides on an outer peripheral surface of the fixed blade and cuts the wire; and
- a driving member which is connected to the movable blade and drives the movable blade, the movable blade is capable of moving between a standby position where the first wire passage and the second wire passage communicate with each other and a movement finish position where the first wire passage and the second wire passage do not communicate with each other by sliding on the outer peripheral surface of the fixed blade and has a protruding portion protruding in a direction of the guide portion, and the cutting portion suppresses a change in behavior of the wire between the protruding portion and the guide portion when the movable blade moves to the movement finish position.

In the invention, the protruding portion faces the guide portion when the movable blade is at the movement finish position. Thus, the distance between the movable blade and the guide portion decreases compared to the configuration in which the protruding portion is not provided. Therefore, when a force to pull the wire is applied by twisting the wire wound around the reinforcing bar, it is suppressed that the behavior of the wire is greatly changed.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along a feeding direction of the wire and causes the wire to curl by regulating an advancing direction of the wire, wherein
the cutting portion includes:
 a fixed blade in which a first wire passage through which the wire passes is formed;
 a movable blade in which a second wire passage through which the wire passes is formed and which slides on an outer peripheral surface of the fixed blade and cuts the wire; and
 a driving member which is connected to the movable blade and drives the movable blade,
the movable blade is capable of moving between a standby position where the first wire passage and the second wire passage communicate with each other and a movement finish position where the first wire passage and the second wire passage do not communicate with each other by sliding on the outer peripheral surface of the fixed blade, and
the guide portion includes a wire retracting portion at an end portion facing the movable blade, the wire retracting portion being constituted by a surface retracted in a direction where a distance from the movable blade increases.

In the invention, since the distance between the guide portion and the movable blade increases when the movable blade is moved to the standby position, the wire is prevented from being pinched between the guide portion and the movable blade and bent.

Another aspect of the present invention provides a binding machine, comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along the feeding direction of the wire and causes the wire to curl by regulating an advancing direction of the wire, wherein
the cutting portion includes:
 a fixed blade in which a first wire passage through which the wire passes is formed;
 a movable blade in which a second wire passage through which the wire passes is formed and which slides on an outer peripheral surface of the fixed blade and cuts the wire; and
 a driving member which is connected to the movable blade and drives the movable blade,
the movable blade is capable of moving between a standby position where the first wire passage and the second wire passage communicate with each other and a movement finish position where the first wire passage and the second wire passage do not communicate with each other by sliding on the outer peripheral surface of the fixed blade, and
the guide portion includes a movable range suppressing portion which is formed by extending an end portion of the guide portion facing the movable blade in a direction of the movable blade, and the movable range suppressing portion reduces a movable range of the wire between the guide portion and the cutting portion.

In the invention, by providing the movable range suppressing portion, the distance between the guide portion and the movable blade decreases. Therefore, when a force to pull the wire is applied by twisting the wire wound around the reinforcing bar, by reducing the movable range of the wire, it is suppressed that the wire is pinched when the movable blade rotates to the standby position.

Another aspect of the present invention provides a binding machine comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along the feeding direction of the wire and causes the wire to curl by regulating an advancing direction of the wire, wherein
the cutting portion includes:
 a fixed blade in which a first wire passage through which the wire passes is formed;
 a movable blade in which a second wire passage through which the wire passes is formed and which slides on an outer peripheral surface of the fixed blade and cuts the wire;
 a driving member which is connected to the movable blade and drives the movable blade;
 a driving portion which drives the driving member; and
 a control unit for which controls the driving portion,
the movable blade is capable of moving between a standby position where the first wire passage and the second wire passage communicate with each other and a movement finish position where the first wire passage and the second wire passage do not communicate with each other by sliding on the outer peripheral surface of the fixed blade, and
the control unit controls the driving portion such that the movable blade is moved by a predetermined amount in a direction of cutting the wire after the movable blade is moved from the movement finish position to the standby position, and then the movable blade is moved to the standby position.

In the invention, even when the rear end portion of the wire is pinched between the driving member and the movable blade, by moving the movable blade by a predetermined amount in the direction of cutting the wire, the movable blade and the driving member move away from the end portion of the wire, so that the wire pinched between the driving member and the movable blade is released.

In the invention, even when the rear end portion of the wire cannot be held by the movable blade, the rear end portion of the wire is prevented from being pinched between the driving member and the guide portion. The rear end portion of the wire is prevented from being pinched between the driving member and the movable blade. Therefore, it is suppressed that the wire after binding becomes hard to come off from the binding machine, and thus the working efficiency is improved.

DESCRIPTION OF EMBODIMENTS

Hereinafter, with reference to the drawings, an example of a reinforcing bar binding machine as an embodiment of a binding machine of the invention will be described.

Configuration Example of Reinforcing Bar Binding Machine of Embodiment

Figure 1:
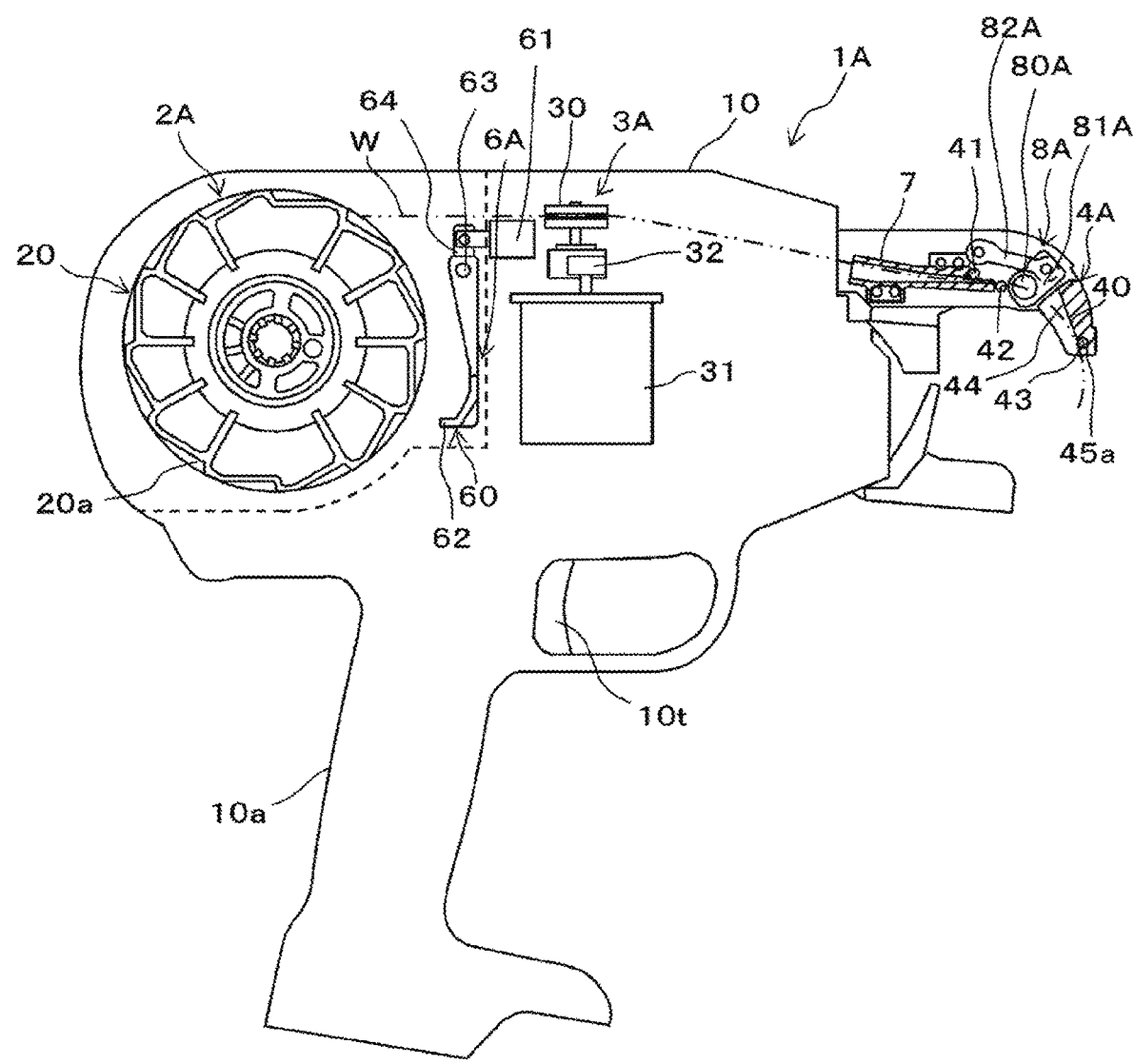
FIG. 1 is an overall configuration view seen from one lateral side illustrating an example of a reinforcing bar binding machine of an embodiment.
Figure 2:
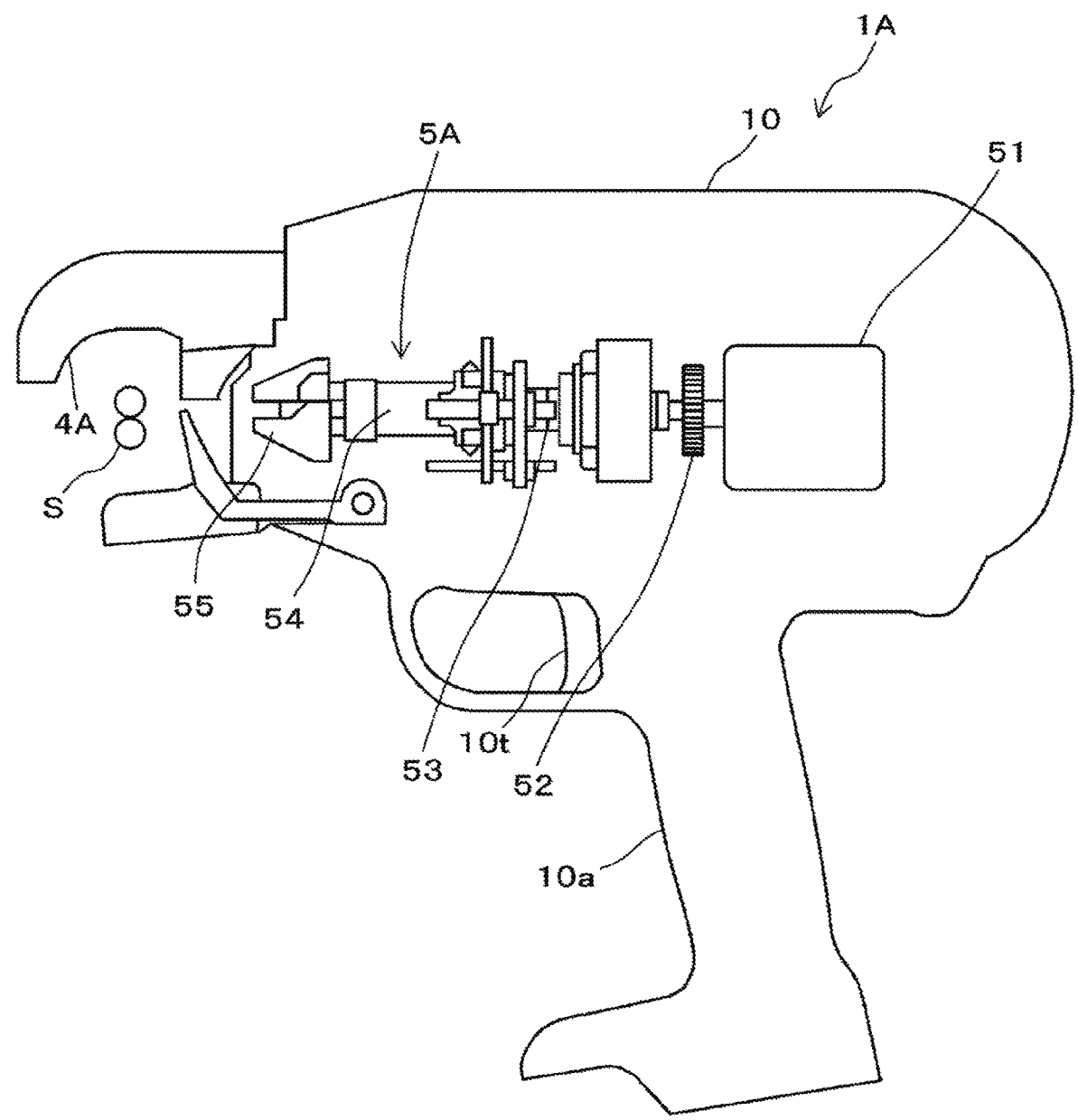
FIG. 2 is an overall configuration view seen from the other lateral side illustrating the example of the reinforcing bar binding machine of the embodiment.

FIG. 1 is an overall configuration view seen from one lateral side illustrating an example of the reinforcing bar binding machine according to the embodiment and FIG. 2 is an overall configuration view seen from the other lateral side illustrating the example of the reinforcing bar binding machine of the embodiment.

A reinforcing bar binding machine 1A includes a reel accommodating portion 2A rotatably accommodating a wire reel 20 in which one or more wires are wound and a wire feeding portion 3A for feeding a wire W wound around the wire reel 20 accommodated in the reel accommodating portion 2A. In addition, the reinforcing bar binding machine 1A includes a curl forming portion 4A which curls the wire W sent by the wire feeding portion 3A and winds the wire W around a reinforcing bar S. Furthermore, the reinforcing bar binding machine 1A includes a binding portion 5A for twisting the wire W wound around the reinforcing bar S and a braking portion 6A for braking the rotating wire reel 20 and restricting the rotation of the wire reel 20. The reinforcing bar binding machine 1A includes a guiding path 7 for guiding the wire W and a cutting portion 8A for cutting the wire W.

The reinforcing bar binding machine 1A is provided in a form in which a handle portion 10a protrudes from a main body portion 10. Further, in the reinforcing bar binding machine 1A, the curl forming portion 4A is provided on one side in a state where the handle portion 10a is interposed between the curl forming portion 4A and the reel accommodating portion 2A and the reel accommodating portion 2A is provided on the other side. In the following description, a side on which the handle portion 10a is provided with respect to the main body portion 10 of the reinforcing bar binding machine 1A is set as a downward side and a side opposite to the handle portion 10a is set as an upward side. A side on which the curl forming portion 4A is provided is set as a front side and a side on which the reel accommodating portion 2A is provided is set as a rear side.

The reel accommodating portion 2A is configured to detachably support the wire reel 20. The wire feeding portion 3A includes a pair of feed gears 30 as feed members. The pair of feed gears 30 are disposed so as to pinch the feeding path of the wire W. The wire feeding portion 3A includes a feed motor 31 which drives the feed gear 30, and a gear 32 which transmits the rotation of the feed motor 31 to the feed gear 30. The wire feeding portion 3A sends the wire W toward the curl forming portion 4A by rotating the feed gears 30 with the wire W held between the pair of feed gears 30.

The curl forming portion 4A is in contact with the wire W sent by the wire feeding portion 3A and includes a guide portion 40 which regulates a traveling direction of the wire W. The curl forming portion 4A guides the wire W so that the wire W has a substantially circular shape around the reinforcing bar S and curls the wire W (curling the wire W).

The curl forming portion 4A includes a wire guide 42 which is provided between the feed gear 30 of the wire feeding portion 3A and the cutting portion 8A and on a first side of the feeding path of the wire W indicated by a two-dot chain line and which can come into contact with the wire A from the first side. The wire guide 42 is an example of a first abutment portion. The curl forming portion 4A includes a wire guide 43 which is provided on a downstream side of the cutting portion 8A and on a second side opposite to the first side with respect to the feeding path of the wire W and which can come into contact with the wire W from the second side. The wire guide 43 is an example of a second abutment portion. The wire guide 43 is provided, along a feeding direction of the wire W, at an end portion 45a on the downstream side of a wire sliding surface 44 of the guide portion 40 with which the wire W comes into contact and protrudes from the wire sliding surface 44. Also, the curl forming portion 4A includes a wire guide 41 which is provided on the upstream side of the wire guide 42 and on the second side with respect to the feeding path of the wire W and can come into contact with the wire W from the second side. The first side is a radially inner side of the curled wire W and the second side is a radial outer side of the curled wire W.

At least the wire guide 42 and the wire guide 43 may be provided to curl the wire W. Further, it is preferable to include the wire guide 41, the wire guide 42, and the wire guide 43 for more reliable curling. The wire sliding surface 44 also contributes to the curling, but the wire sliding surface 44 is not an essential configuration.

The binding portion 5A includes a torsion motor 51, a gear 52, a screw shaft portion 53, an advancing and retracting cylinder portion 54, and a torsion hook 55. As a drive source of the binding portion 5A, the torsion motor 51 driven separately from the feed motor 31 is used.

The screw shaft portion 53 is rotatably supported with respect to the main body portion 10 and is rotated by a driving force of the torsion motor 51 which is transmitted through the gear 52. The screw shaft portion 53 has a thread formed on an outer peripheral surface and the advancing and retracting cylinder portion 54 has a thread formed on an inner peripheral surface, whereby the thread on the outer peripheral surface of the screw shaft portion 53 is screwed into the thread on the inner peripheral surface of the advancing and retracting cylinder portion 54.

The binding portion 5A is configured such that advancing and retracting cylinder portion 54 is moved back and forth by rotation of the screw shaft portion 53 by rotation of the torsion motor 51 while rotation of the advancing and retracting cylinder portion 54 is regulated. Further, it is configured such that, by combining the screw shaft portion 53 and the advancing and retracting cylinder portion 54 to rotate integrally, the rotation of the screw shaft portion 53 by the rotation of the torsion motor 51 rotates the advancing and retracting cylinder portion 54.

The torsion hook 55 is a pair of claw members attached to a tip end of the advancing and retracting cylinder portion 54. The torsion hook 55 is configured to be opened or closed in accordance with the advancing and retracting operation of the advancing and retracting cylinder portion 54 by a known structure.

The braking portion 6A includes a reel brake 60 engageable with the wire reel 20 and a solenoid 61 for driving the reel brake 60. In the reel brake 60, an engaging portion 62 which engages with an engaged portion 20a of the wire reel 20 is provided at one end portion. Further, the other end portion of the reel brake 60 which is the end portion opposite to a side where the engaging portion 62 is provided is attached to a shaft 63 and is rotatably supported by the main body portion 10 by the shaft 63.

The solenoid 61 is operated by an electromagnet (not illustrated), a spring, and the like and is connected to a link 64 attached to the shaft 63. The braking portion 6A rotates about the shaft 63 as a fulcrum to move between a braking position where the engaging portion 62 of the reel brake 60 engages with the engaged portion 20a of the wire reel 20 and a retracted position where the engaging portion 62 of the reel brake 60 is separated from the wire reel 20.

The wire reel 20 rotates following the feed of the wire W by the wire feeding portion 3A. Therefore, even after the wire feeding portion 3A stops feeding the wire W, the wire reel 20 tries to keep rotating by inertia.

Here, in the braking portion 6A, in conjunction with the wire feeding portion 3A stopping the feeding of the wire W, the solenoid 61 is operated and the engaging portion 62 of the reel bracket 60 moves from the retracted position to the braking position.

Therefore, in conjunction with the wire feeding portion 3A stopping the feeding of the wire W, the engaging portion 62 of the reel bracket 60 engages with the engaged portion 20a of the wire reel 20 and stops the rotation of the wire reel 20. As a result, after the wire feeding portion 3A stops feeding the wire W, the rotation of the wire reel 20 by inertia is restricted.

The guiding path 7 is provided on the upstream side of the cutting portion 8A with respect to the feeding direction of the wire W and configures a path for guiding the wire W sent by the wire feeding portion 3A to the cutting portion 8A.

The cutting portion 8A includes a fixed blade 80A fixed to a guide frame 11, a movable blade 81A rotatably provided relative to the fixed blade 80A, and a driving member 82A for rotating the movable blade 81A. The details of the cutting portion 8A of the embodiment will be described below.

Operation Example of Reinforcing Bar Binding Machine of Embodiment

Next, with reference to the drawings, an operation of binding the reinforcing bar S using the wire W in the reinforcing bar binding machine 1A of the embodiment will be described.

When a trigger 10t of the reinforcing bar binding machine 1A is operated, by driving the feed motor 31, by a predetermined amount the wire W is fed the wire feeding portion 3A and is wound around the reinforcing bar S by the curl forming portion 4A. The feed amount of wire W sets the number of times the wire W is wound around the reinforcing bar S. The wire W is sent by the wire feeding portion 3A and the wire reel 20 rotates following the feeding of the wire W. After the feeding operation of the wire W by the wire feeding portion 3A is stopped, the wire reel 20 rotated following the feeding of the wire W is subjected to braking by braking portion 6A, in such a manner that the rotation of the wire reel 20 is regulated.

In the binding portion 5A, the torsion motor 51 rotates forward and the rotation of the torsion motor 51 is transmitted to the screw shaft portion 53 via the gear 52. In this case, the screw shaft portion 53 is rotated and the rotation of the advancing and retracting cylinder portion 54 is restricted. Therefore, the advancing and retracting cylinder portion 54 is sent forward by the action of the screwed screw. When advancing and retracting cylinder portion 54 is sent forward, the cutting portion 8A is operated to cut the wire W. Also, the torsion hook 55 advances to a position where torsion hook 55 comes into contact with the wire W. The torsion hook 55 is operated in a closing direction in conjunction with the advancement of the advancing and retracting cylinder portion 54 and grips a part of the wire wound in a loop shape.

The restriction on the rotation of the advancing and retracting cylinder portion 54 is released at a predetermined advanced position and the advancing and retracting cylinder portion 54 rotates with the screw shaft portion 53. The wire W is twisted by rotating the torsion hook 55 holding the wire W.

When the twisting operation is finished, the torsion motor 51 reverses and the screw shaft portion 53 rotates in a reverse direction. Therefore, the advancing and retracting cylinder portion 54 and the torsion hook 55 also move backward and the torsion hook 55 opens to release the wire W. The torsion motor 51 reverses until the advancing and retracting cylinder portion 54 and the torsion hook 55 move to a standby position. When the advancing and retracting cylinder portion 54 and the torsion hook 55 move to the standby position, the torsion motor 51 is stopped and a series of operations are completed. As a result, the reinforcing bar S is bound by the wire W.

Problem Example of Reinforcing Bar Binding Machine of Embodiment

Figure 3:
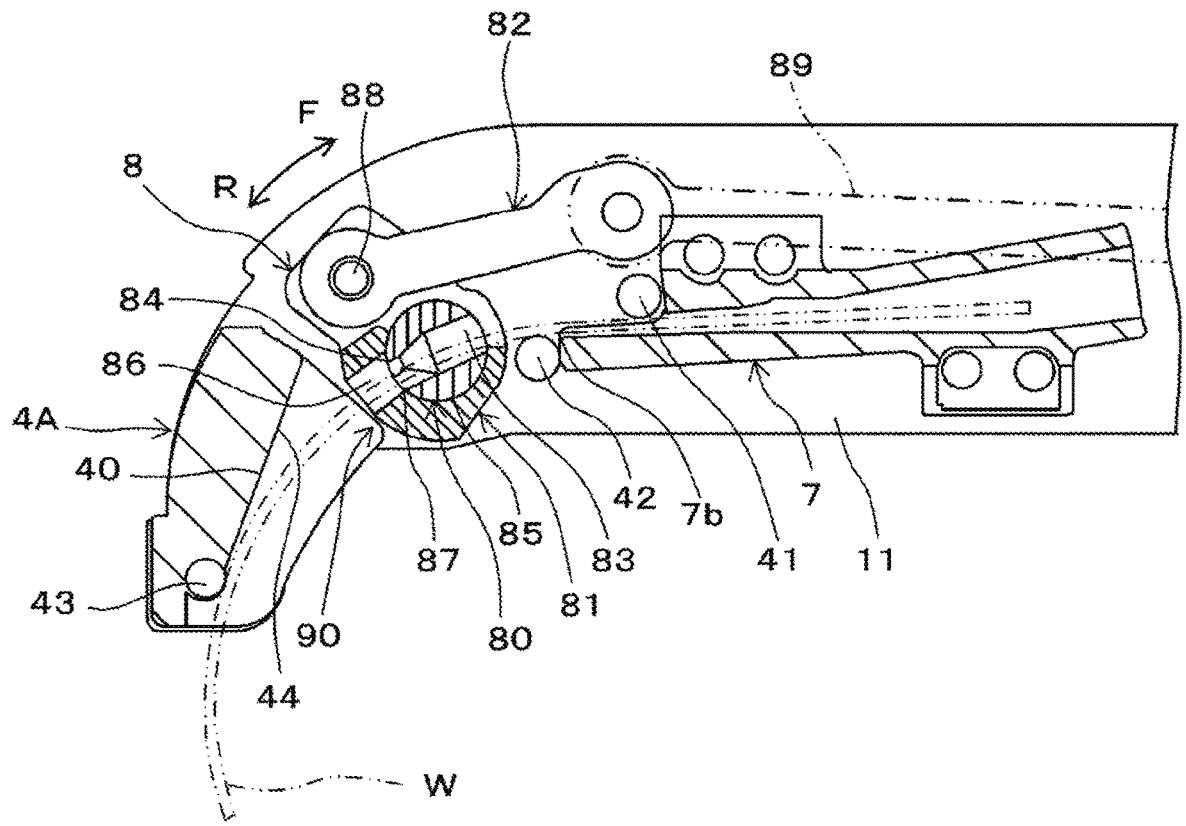
FIG. 3 is a view illustrating an example of a cutting portion of the related art.

Next, a configuration of the cutting portion 8 of the related art for cutting the wire W will be described. FIG. 3 is a view illustrating an example of a cutting portion of the related art. The cutting portion 8 includes a fixed blade 80 fixed to the guide frame 11, a movable blade 81 rotatably provided relative to the fixed blade 80, and a driving member 82 for rotating the movable blade 81.

The fixed blade 80 is provided in a feeding path of the wire W which passes through the guiding path 7. The fixed blade 80 is formed of a column-shaped member and is erected from the guide frame 11 so that an axial direction of the column shape is perpendicular to the feeding direction of the wire W. In the fixed blade 80, a first wire passage 83 through which the wire W passes is formed penetrating the column shape in a radial direction.

The first wire passage 83 extends along the feeding path of the wire W and an end portion on the upstream side along the feeding direction of the wire W opens toward an end portion 7b of the guiding path 7. In the first wire passage 83, an end portion on the downstream side along the feeding direction of the wire W opens toward the guide portion 40 and a blade portion 84 is formed at an edge portion of an opening of the end portion on the downstream side along feeding direction of the wire W. Furthermore, the diameter of the first wire passage 83 is configured to be larger than the diameter of the wire W.

The movable blade 81 includes a shaft hole portion 85 into which the fixed blade 80 is inserted, a second wire passage 86 through which the wire W passes, a blade portion 87 sliding along the outer peripheral surface of the fixed blade 80, and a connecting portion 88 to which the driving member 82 is connected.

The shaft hole portion 85 is formed with an opening having an inner diameter substantially equal to the outer diameter of the fixed blade 80 or slightly larger than the outer diameter of the fixed blade 80. The movable blade 81 is rotatably supported about the fixed blade 80 by inserting the fixed blade 80 into the shaft hole portion 85.

The second wire passage 86 is configured by an opening such as a groove or a hole through which the wire W passes. When the movable blade 81 is located at the standby position illustrated in FIG. 3, the second wire passage 86 is connected to the first wire passage 83 of the fixed blade 80 and the wire W before cutting passes through the connected passages. Also, the second wire passage 86 guides the wire W after cutting to a path where the wire W can be removed from the cutting portion 8 by the operation of the movable blade 81 after the cutting of the wire W.

The blade portion 87 is provided on the second wire passage 86 along an inner peripheral surface of the shaft hole portion 85 and the movable blade 81 slides along the outer peripheral surface of the fixed blade 80 as the movable blade 81 rotates about the fixed blade 80. When the movable blade 81 rotates in a cutting direction illustrated by the arrow F from a state where the movable blade 81 is located at the standby position illustrated in FIG. 3, the blade portion 87 moves in a direction approaching the blade portion 84 of the fixed blade 80. As a result, the wire W passed through the first wire passage 83 of the fixed blade 80 is pinched between the blade portion 84 of the fixed blade 80 and the blade portion 87 of the movable blade 81 and is cut. Further, when the movable blade 81 rotates in a retracting direction indicated by the arrow R, the blade portion 87 moves away from the blade portion 84 of the fixed blade 80 and the second blade passage 86 of the movable blade 81 and the first wire passage 83 of the fixed blade 80 are connected.

The connecting portion 88 is formed on an opposite side of the shaft hole portion 85 and the driving member 82 is rotatably connected thereto.

The driving member 82 is connected via a link 89 or the like to an advancing and retracting cylinder portion 54 which is driven by the torsion motor 51 illustrated in FIG. 2 and moves along an extension direction of the screw shaft portion 53 with linear motion and rotational motion.

As a result, the movement of advancing and retracting cylinder portion 54 reciprocating along the screw shaft portion 53 is transmitted to movable blade 81 via the link 89 and the driving member 82 and the movable blade 81 rotates about the fixed blade 80 in the cutting direction illustrated by the arrow F and in the retracting direction illustrated by the arrow R.

Figure 4A:
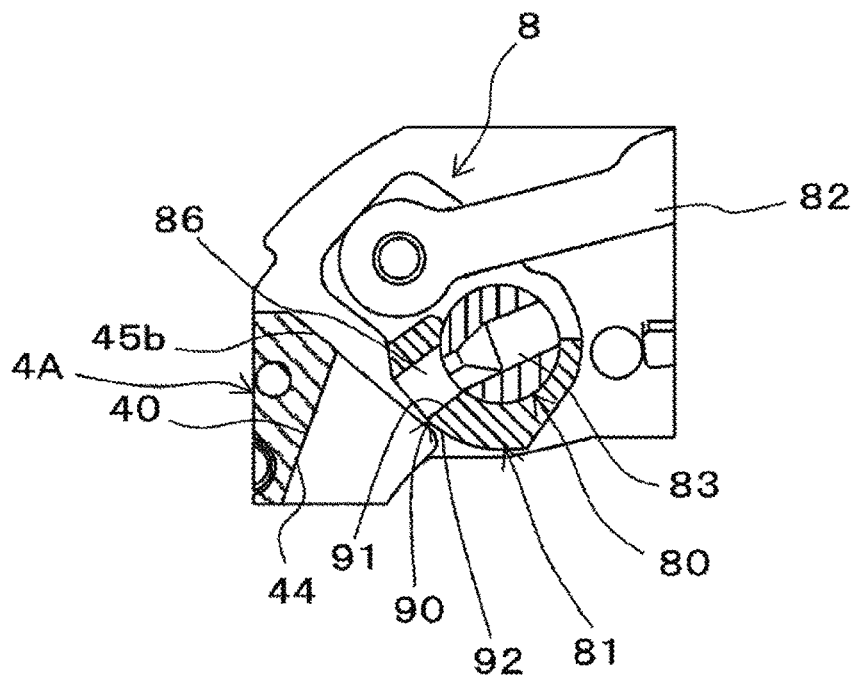
FIG. 4A is a view illustrating an operation and a problem of the cutting portion of the related art.

Next, the operation and problems of the cutting portion of the related art will be described. FIGS. 4A to 4F are views illustrating the operation and problems of the cutting portion of the related art. As illustrated in FIG. 4A, in the second wire passage 86 of the movable blade 81, an engaging portion 90 capable of holding a rear end portion WE of the wire W cut by the cutting portion 8 is formed. That is, the engaging portion 90 is configured by a first engagement surface 91 engageable with a lower surface of the wire W which passes through the first wire passage 83 at the time of cutting and a second engagement surface 92 formed at an acute angle from the tip end portion of the first engagement surface 91 and engageable with the lower surface of the wire W after cutting of the wire W.

According to the above configuration, when the cutting portion 8 operates and the movable blade 81 rotates the wire W is curled by the curl forming portion 4A and the wire W is wound around the reinforcing bar, the wire W is cut and the first engagement surface 91 of the engaging portion 90 engages in the vicinity of the rear end portion WE of the wire W and pushes it up. Part of the wire W abuts on the wire sliding surface 44 of the guide portion 40 and the wire W cannot be further pushed up, and thus part of the wire W in the vicinity of the rear end portion WE is bent by the tip end portion of the first engagement surface 91.

Figure 4B:
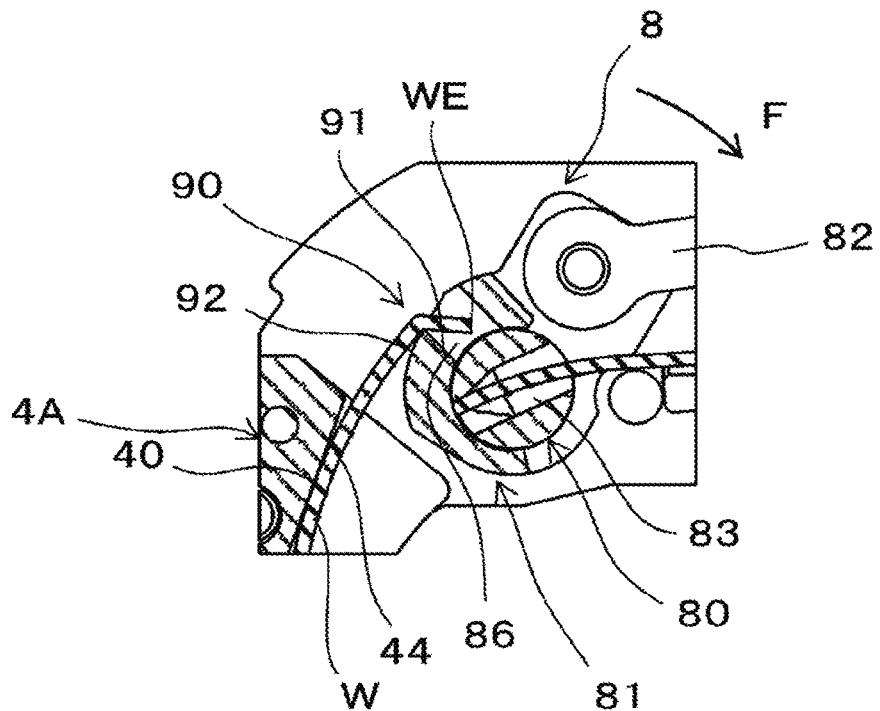
FIG. 4B is a view illustrating the operation and problem of the cutting portion of the related art.

Therefore, as illustrated in FIG. 4B, even when a force to pull the wire W is applied by motion for twisting the wire W wound around the reinforcing bar S with the binding portion 5A, the rear end portion WE of the wire W is caught on the tip end of first engagement surface 91 and is held in a state where the rear end portion WE is engaged with second engagement surface 92.

Figure 4C:
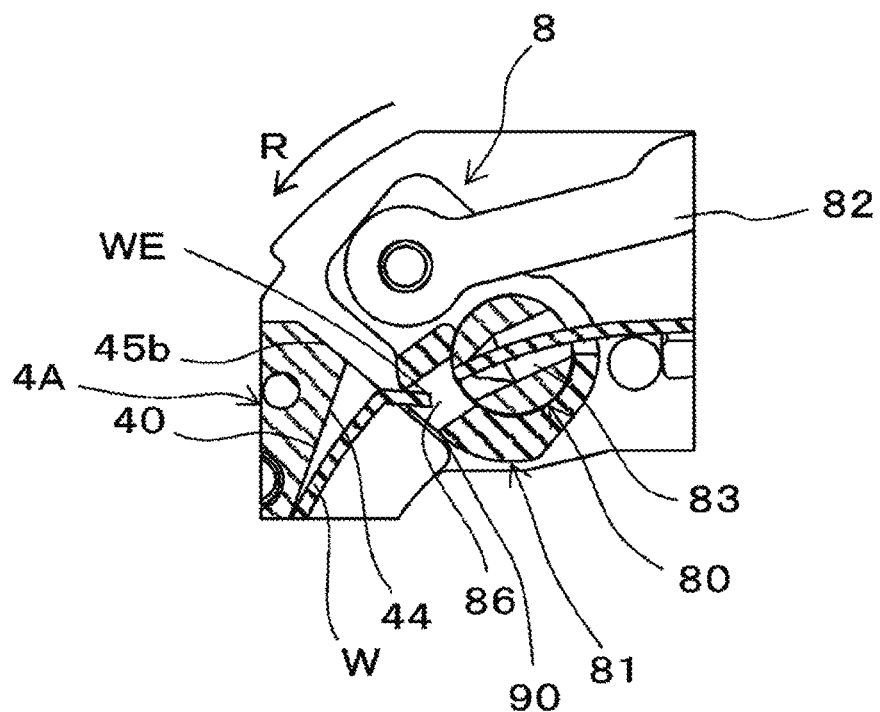
FIG. 4C is a view illustrating the operation and problem of the cutting portion of the related art.

Therefore, when the operation of twisting the wire W with the binding portion 5A is finished and the movable blade 81 rotates in the retracting direction indicated by the arrow R in conjunction with the returning operation of the binding portion 5A, as illustrated in FIG. 4C, the rear end portion WE of the wire W can be pushed back by the second wire passage 86 of the movable blade 81 and the wire W after cutting can be guided to a path where the rear end portion WE can be pulled out from the cutting portion 8.

Figure 4D:
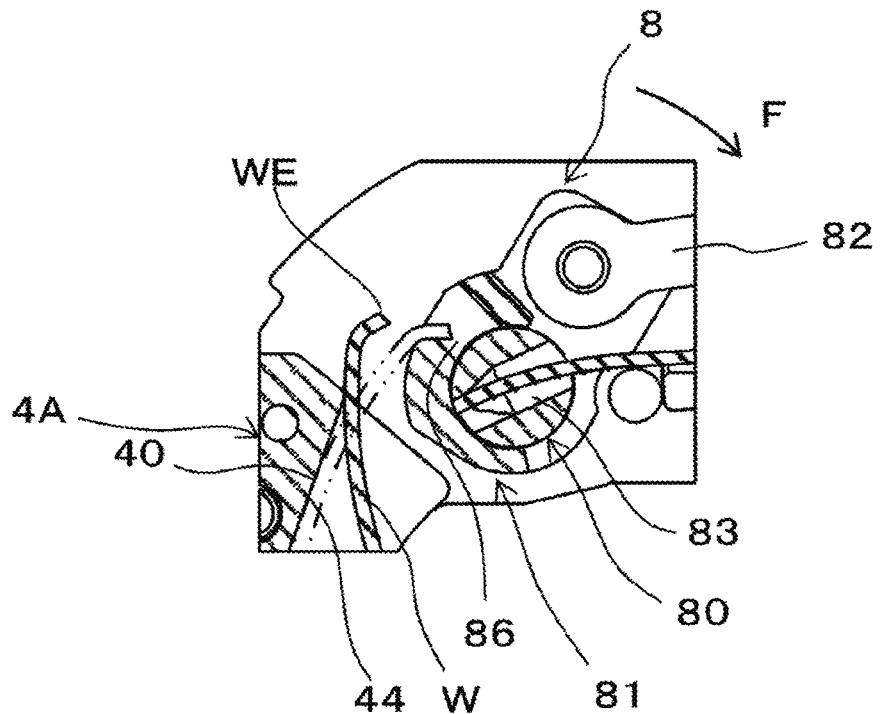
FIG. 4D is a view illustrating the operation and problem of the cutting portion of the related art.

However, when the tip end portion of the first engagement surface 91 described above is worn out, the wire W cannot be held by the first engagement surface 91. Therefore, when a force to pull the wire W is applied by a motion for twisting the wire W wound around reinforcing bar S with the binding portion 5A, as illustrated in FIG. 4D, there is a possibility that the wire W moves from a position illustrated by the two-dot chain line to a position illustrated by the solid line.

Figure 4E:
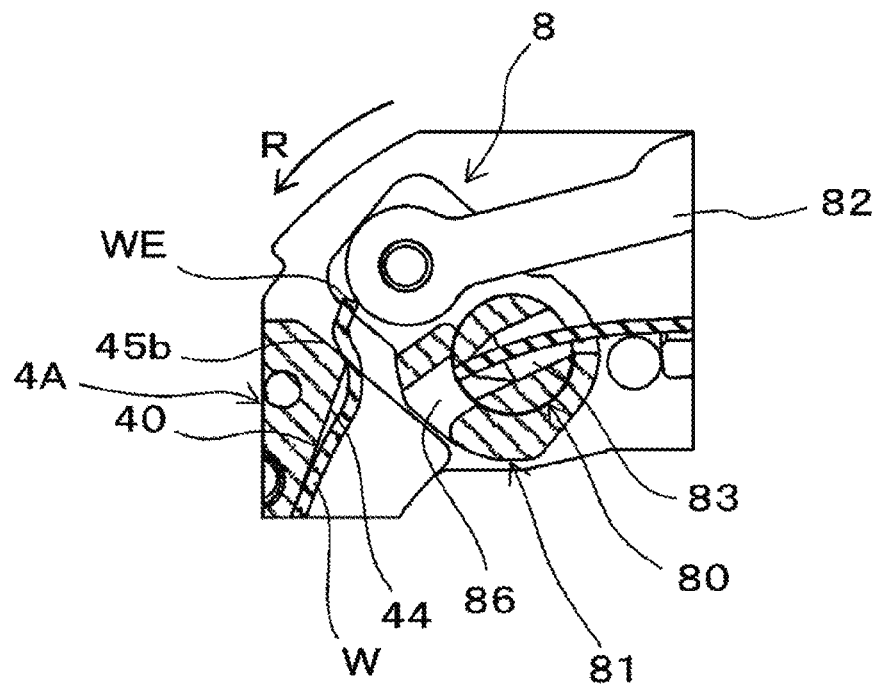
FIG. 4E is a view illustrating the operation and problem of the cutting portion of the related art.
Figure 4F:
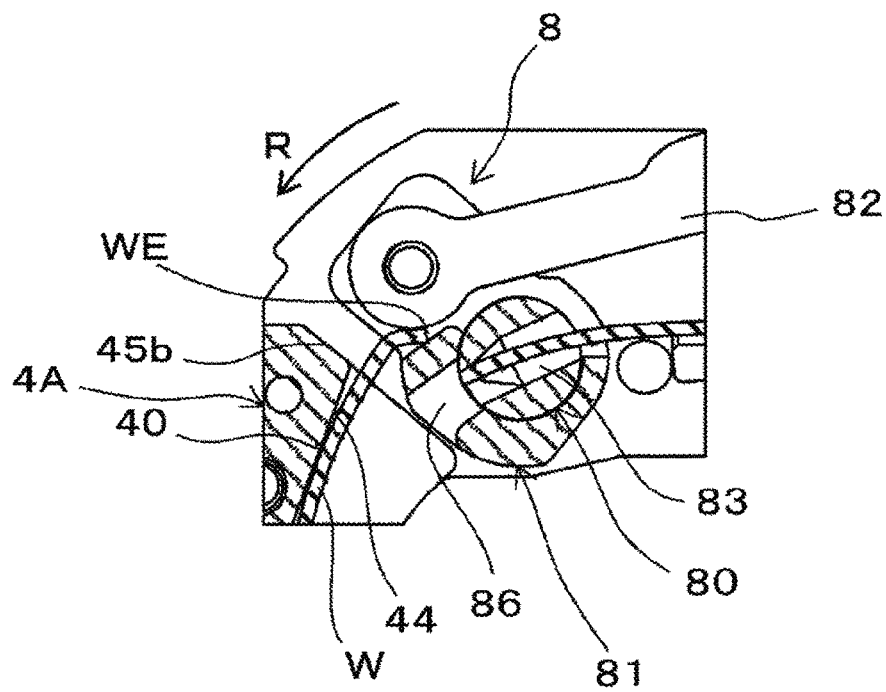
FIG. 4F is a view illustrating the operation and problem of the cutting portion of the related art.

When the rear end portion WE of the wire W cannot be held by the movable blade 81, there is a possibility that the rear end portion WE of the wire W is pinched between the driving member 82 and the guide portion 40 by rotational motion of the movable blade 81 in the retracting direction indicated by the arrow R, as illustrated in FIG. 4E. As illustrated in FIG. 4F, there is a possibility that the rear end portion WE of the wire W is pinched between the driving member 82 and the movable blade 81. In such a state, it becomes difficult for the wire W after binding to come off, and thus the working efficiency is reduced.

Therefore, in the reinforcing bar binding machine 1A of the embodiment, the configuration of the cutting portion 8A, the configuration of the curl forming portion 4A, and the control of the cutting portion 8A prevent the wire W after cutting from being pinched.

Example of Cutting Portion of First Embodiment

FIGS. 5A to 5D are views illustrating a first example of the cutting portion according to the first embodiment provided in the reinforcing bar binding machine of the embodiment.

Figure 5A:
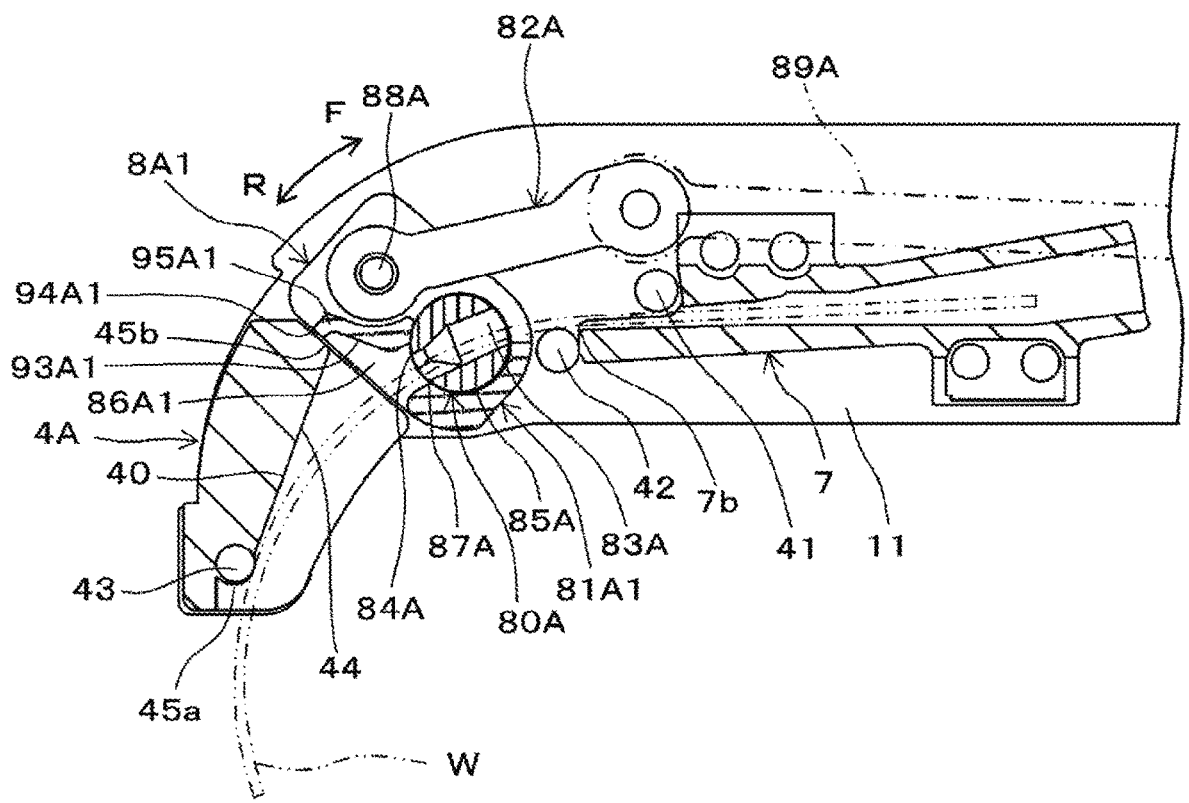
FIG. 5A is a view illustrating a first example of a cutting portion according to a first embodiment provided in the reinforcing bar binding machine according to the embodiment.

As illustrated in FIG. 5A, a cutting portion 8A1 of the first example of the first embodiment includes the fixed blade 80A fixed to the guide frame 11, a movable blade 81A1 rotatably provided relative to the fixed blade 80A, and the driving member 82A for rotating the movable blade 81A1.

The fixed blade 80A is provided in a feeding path of the wire W which passes through the guiding path 7. The fixed blade 80A is formed of a column-shaped member and is erected from the guide frame 11 so that an axial direction of the column shape is perpendicular to the feeding direction of the wire W. In the fixed blade 80A, a first wire passage 83A through which the wire W passes is formed penetrating the column shape in a radial direction.

The first wire passage 83A is configured by an opening such as a groove or a hole through which the wire W passes and extends along the feeding path of the wire W which passes through the guiding path 7 and an end portion on the upstream side along the feeding direction of the wire W opens toward the end portion 7b of the guiding path 7. In the first wire passage 83A, an end portion on the downstream side along the feeding direction of the wire W opens toward the guide portion 40 of curl forming portion 4A and a blade portion 84A is formed at an edge portion of an opening of the end portion on the downstream side along feeding direction of the wire W. Furthermore, the diameter of the first wire passage 83A is configured to be slightly larger than the diameter of the wire W.

The movable blade 81A1 which is the first example of the movable blade 81A illustrated in FIG. 1 includes a shaft hole portion 85A into which the fixed blade 80A is inserted and a second wire passage 86A1 through which the wire W passes. The movable blade 81A1 includes a blade portion 87A provided on one side of the second wire passage 86A1 and sliding along the outer peripheral surface of the fixed blade 80A and a passage forming member 95A1 provided on the other side of the second wire passage 86A1, that is, in a portion on the opposite side to the blade portion 87A. Furthermore, the movable blade 81A1 includes a connecting portion 88A to which the driving member 82A is connected.

The shaft hole portion 85A is formed with an opening having an inner diameter substantially equal to the outer diameter of the fixed blade 80A or slightly larger than the outer diameter of the fixed blade 80A. The movable blade 81A1 is rotatably supported about the fixed blade 80A by inserting the fixed blade 80A into the shaft hole portion 85A.

The second wire passage 86A1 is configured by an opening such as a groove or a hole through which the wire W passes. When the movable blade 81A1 is at the standby position illustrated in FIG. 5A, the second wire passage 86A1 is connected to the first wire passage 83A of the fixed blade 80A and forms a feeding path of the wire W through which the wire W before cutting passes. One side of the second wire passage 86A1 is a first side with respect to the feeding path of the wire W when the movable blade 81A1 is at the standby position. Also, the other side of the second wire passage 86A1 always becomes a second side with respect to the feeding path of the wire W. In the movable blade 81A1, in a state where the movable blade 81A1 is located at the standby position, the blade portion 87A is provided on the first side with respect to the feeding path of the wire W. In the movable blade 81A1, on the second side opposite to the first side, a passage forming member 95A1 forming the second wire passage 86A1 is provided. Furthermore, the second wire passage 86A1 does not communicate with the first wire passage 83A of the fixed blade 80A when the movable blade 81A1 is located at a rotation finish position which is a movement finish position illustrated in FIG. 5B.

The second wire passage 86A1 includes a guiding portion 93A1 which guides the wire W after cutting to a path where the wire W can be removed from the cutting portion 8A1 in a rotational operation in which the movable blade 81A1 after cutting the wire W moves to the standby position. The guiding portion 93A1 is provided in the passage forming member 95A1.

In the guiding portion 93A1, the second wire passage 86A1 is configured by a surface having concave and convex surfaces such that an opening at the end portion on the downstream side has a larger distance along the rotation direction of the movable blade 81A1 in comparison with that of the opening at the end portion on the upstream side along the feeding direction of the wire W. The guiding portion 93A1 extends toward the second side along the moving direction of the movable blade 81A1 with the movable blade 81A1 at the standby position. The guiding portion 93A1 may be configured by a curved surface, may be configured by a combination of a plane and a corner, or may be configured by a combination of a plane and a curved surface.

Figure 5B:
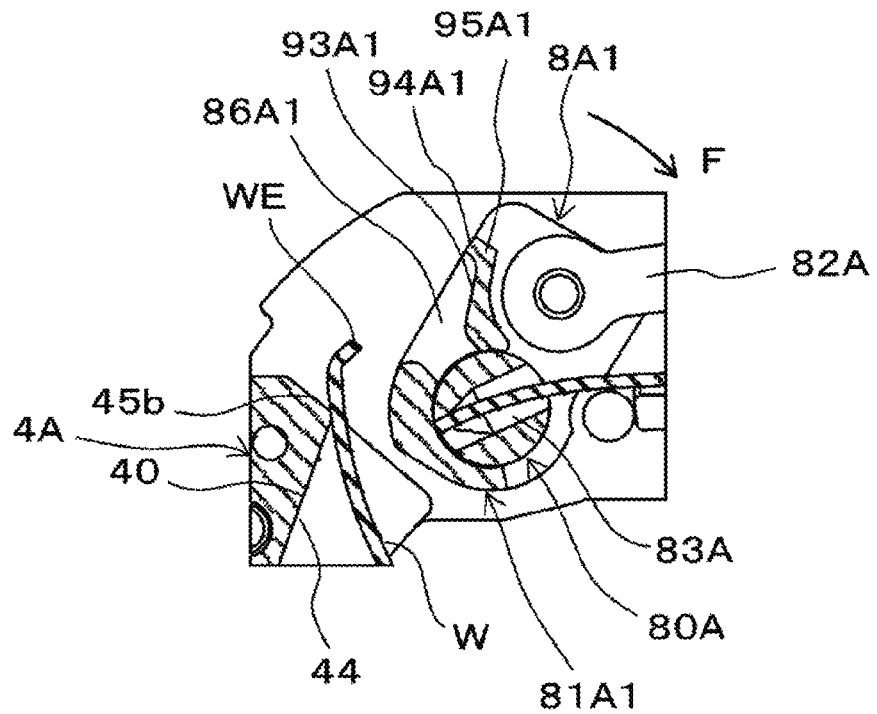
FIG. 5B is a view illustrating the first example of the cutting portion according to the first embodiment provided in the reinforcing bar binding machine according to the embodiment.
Figure 5C:
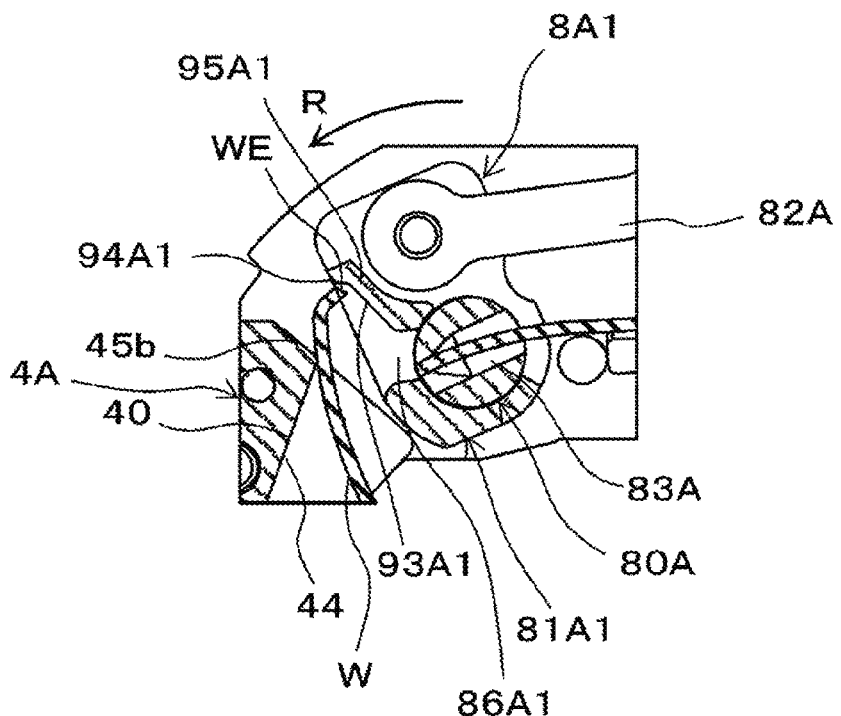
FIG. 5C is a view illustrating the first example of the cutting portion according to the first embodiment provided in the reinforcing bar binding machine according to the embodiment.
Figure 5D:
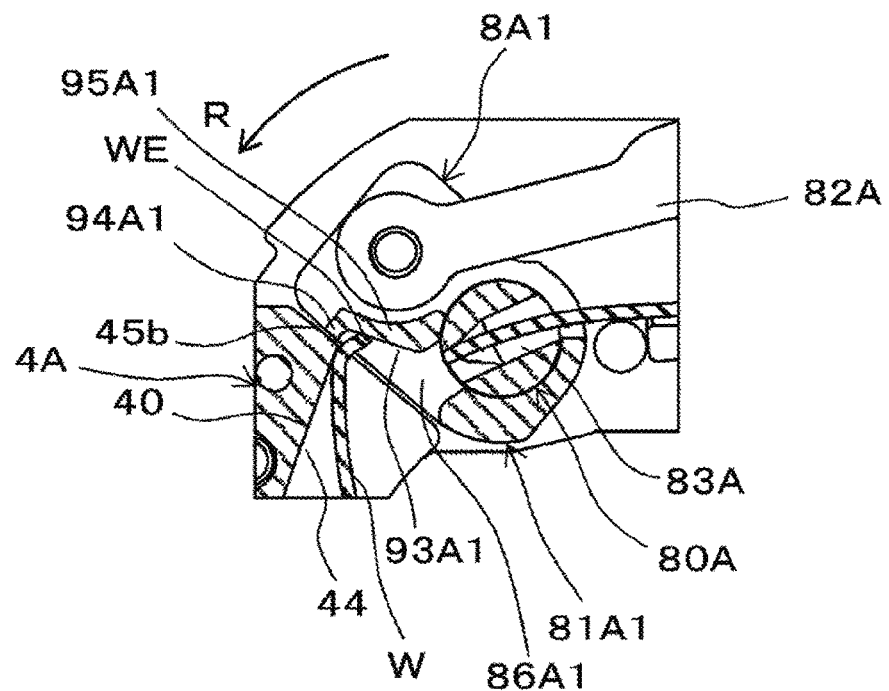
FIG. 5D is a view illustrating the first example of the cutting portion according to the first embodiment provided in the reinforcing bar binding machine according to the embodiment.

When the movable blade 81A1 has moved to the standby position illustrated in FIGS. 5A and 5D by rotation around the fixed blade 80A, in the guiding portion 93A1, on the downstream side along the feeding direction of the wire W, a side which is located on the second wire passage 86A1 and is an end portion 94A1 of the passage forming member 95A1 on a side facing the guide portion 40 is located at a position substantially corresponding to the wire sliding surface 44 of the guide portion 40.

In the guiding portion 93A1, the end portion 94A1 protrudes in a direction of the guide portion 40 when the movable blade 81A1 is moved to the standby position. When the movable blade 81A1 is moved to the standby position, a distance between the end portion 94A1 of the guiding portion 93A1 and an end portion 45b of the guide portion 40 which is on a side opposite to the cutting portion 8A1 on the upstream side along the feeding direction of the wire W is smaller than the diameter of the wire W.

As a result, when the movable blade 81A1 is moved to the standby position, the end portion 45b of the guide portion 40 is covered with the guiding portion 93A1. When the guiding portion 93A1 is provided with the end portion 94A1 protruding in the direction of the guide portion 40, the end portion 45b of the guide portion 40 is covered with the end portion 94A1.

The blade portion 87A is provided on the second wire passage 86A1 along the inner peripheral surface of the shaft hole portion 85A and the movable blade 81A1 slides along the outer peripheral surface of the fixed blade 80A by rotating around the fixed blade 80A.

When the movable blade 81A1 rotates in the cutting direction indicated by the arrow F from a state where the movable blade 81A1 is located at the standby position illustrated in FIG. 5A, the blade portion 87A moves toward the blade portion 84A of the fixed blade 80A. Therefore, the wire W passed through the first wire passage 83A of the fixed blade 80A is pinched between the blade portion 84A of the fixed blade 80A and the blade portion 87A of the movable blade 81A1 and is cut. The movable blade 81A1 moves from the cutting finish position where the wire W is cut to the rotation finish position illustrated in FIG. 5B by further rotating in the cutting direction by a predetermined amount.

Further, when the movable blade 81A1 rotates in the retracting direction indicated by the arrow R from a state where the movable blade 81A1 is located at the rotation finish position illustrated in FIG. 5B, the blade portion 87A moves away from the blade portion 84A of the fixed blade 80A in a direction of opening the first wire passage 83A of the fixed blade 80A and the second wire passage 86A1 of the movable blade 81A1 and the first wire passage 83A of the fixed blade 80A are connected.

The connecting portion 88A is formed on an opposite side to the shaft hole portion 85A and the driving member 82A is rotatably connected.

The driving member 82A is connected via the link 89A or the like to the advancing and retracting cylinder portion 54 which is driven by the torsion motor 51 illustrated in FIG. 2 and the driving member 82A moves along the extending direction of the screw shaft portion 53 with linear motion and rotational motion.

Therefore, the motion of advancing and retracting cylinder portion 54 reciprocating along screw shaft portion 53 is transmitted to the movable blade 81A1 through the driving member 82A and the link 89A and the movable blade 81A1 is rotated about the fixed blade 80A in the cutting direction indicated by the arrow F and in the retracting direction indicated by the arrow R.

When the tip end portion of the first engagement surface 91 illustrated in FIG. 4A is worn out, if a force to pull the wire W is applied by a motion for twisting the wire W wound around reinforcing bar S with the binding portion 5A, as illustrated in FIG. 5B, there is a possibility that the rear end portion WE of the wire W cannot be held by the movable blade 81A1.

On the other hand, in the configuration where the guiding portion 93A1 described above is provided in the movable blade 81A1, when the movable blade 81A1 is located at the rotation finish position illustrated in FIG. 5B, the distance between the end portion 94A1 of the guiding portion 93A1 and the end portion 45b of the guide portion 40 is larger than the distance between the second wire passage 86 of the movable blade 81 of the related art where the guiding portion 93A1 is not provided and the end portion 45b of the guide portion 40.

Therefore, when the movable blade 81A1 is located at the rotation finish position illustrated in FIG. 5B, even if the rear end portion WE of the wire W cannot be held, if the movable blade 81A1 rotates in the retracting direction indicated by the arrow R as illustrated in FIG. 5C, the rear end portion WE of the wire W comes into contact with the guiding portion 93A1 and is guided into the second wire passage 86A1 by the rotational movement of the movable blade 81A1.

Then, as illustrated in FIG. 5D, when the movable blade 81A1 rotates to the standby position, the end portion 45b of the guide portion 40 is covered with the guiding portion 93A1 in a state where the rear end portion WE of the wire W is guided into the second wire passage 86A1.

Therefore, even when the rear end portion WE of the wire W cannot be held by the movable blade 81A1, the rear end portion WE of the wire W is prevented from being pinched between the driving member 82A and the end portion 45b of the guide portion 40. In addition, the rear end portion WE of the wire W is prevented from being pinched between the driving member 82A and the movable blade 81A1. Therefore, it is suppressed that the wire W after binding becomes hard to come off, and thus the working efficiency is improved.

FIGS. 6A to 6D are views illustrating a second example of the cutting portion according to the first embodiment provided in the reinforcing bar binding machine of the embodiment.

Figure 6A:
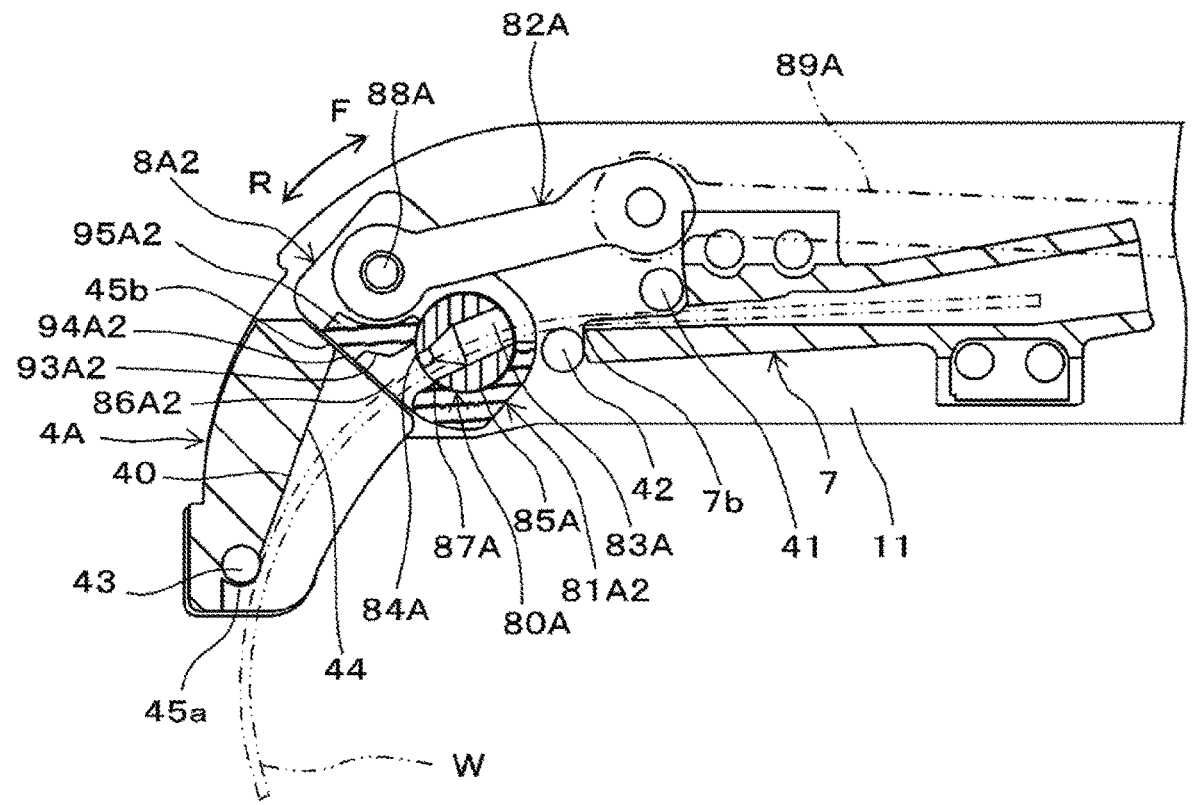
FIG. 6A is a view illustrating a second example of the cutting portion according to the first embodiment provided in the reinforcing bar binding machine according to the embodiment.

As illustrated in FIG. 6A, a cutting portion 8A2 of the second example of the first embodiment is different from the cutting portion 8A1 of the first example described above in the configuration of a movable blade 81A2. Hereinafter, the details of the movable blade 81A2 will be described and the other parts will be assigned the same reference numerals and letters as those of the cutting portion 8A1 of the first embodiment and the detailed description thereof will be omitted.

The movable blade 81A2 which is the second example of the movable blade 81A illustrated in FIG. 1 includes the shaft hole portion 85A into which the fixed blade 80A is inserted and a second wire passage 86A2 through which the wire W passes. The movable blade 81A2 includes the blade portion 87A provided on one side of the second wire passage 86A2 and sliding along the outer peripheral surface of the fixed blade 80A and a passage forming member 95A2 provided on the other side of the second wire passage 86A2, that is, in a portion on the opposite side to the blade portion 87A. Furthermore, the movable blade 81A2 includes the connecting portion 88A to which the driving member 82A is connected.

The second wire passage 86A2 is configured by an opening such as a groove or a hole through which the wire W passes. When the movable blade 81A2 is at the standby position illustrated in FIG. 6A, the second wire passage 86A2 is connected to the first wire passage 83A of the fixed blade 80A and forms a feeding path of the wire W through which the wire W before cutting passes. One side of the second wire passage 86A2 is a first side with respect to the feeding path of the wire W when the movable blade 81A2 is at the standby position. Also, the other side of the second wire passage 86A2 always becomes a second side with respect to the feeding path of the wire W. In the movable blade 81A2, in a state where the movable blade 81A2 is located at the standby position, the blade portion 87A is provided on the first side with respect to the feeding path of the wire W. In the movable blade 81A2, on the second side opposite to the first side, a passage forming member 95A2 forming the second wire passage 86A2 is provided. Furthermore, the second wire passage 86A2 does not communicate with the first wire passage 83A of the fixed blade 80A when the movable blade 81A2 is located at a rotation finish position which is a movement finish position illustrated in FIG. 6B.

The second wire passage 86A2 includes a guiding portion 93A2 which guides the wire W after cutting to a path where the wire W can be removed from the cutting portion 8A2 in a rotational operation in which the movable blade 81A2 after cutting the wire W moves to the standby position. The guiding portion 93A2 is provided in the passage forming member 95A2.

In the guiding portion 93A2, the second wire passage 86A2 is configured by a concavo-convex surface such that an opening at the end portion on the downstream side has a larger distance along the rotation direction of the movable blade 81A2 in comparison with that of the opening at the end portion on the upstream side along the feeding direction of the wire W. The guiding portion 93A2 extends toward the second side along the moving direction of the movable blade 81A1 with the movable blade 81A1 at the standby position. The guiding portion 93A2 may be configured by a curved surface, may be configured by a combination of a plane and a corner, or may be configured by a combination of a plane and a curved surface.

Figure 6B:
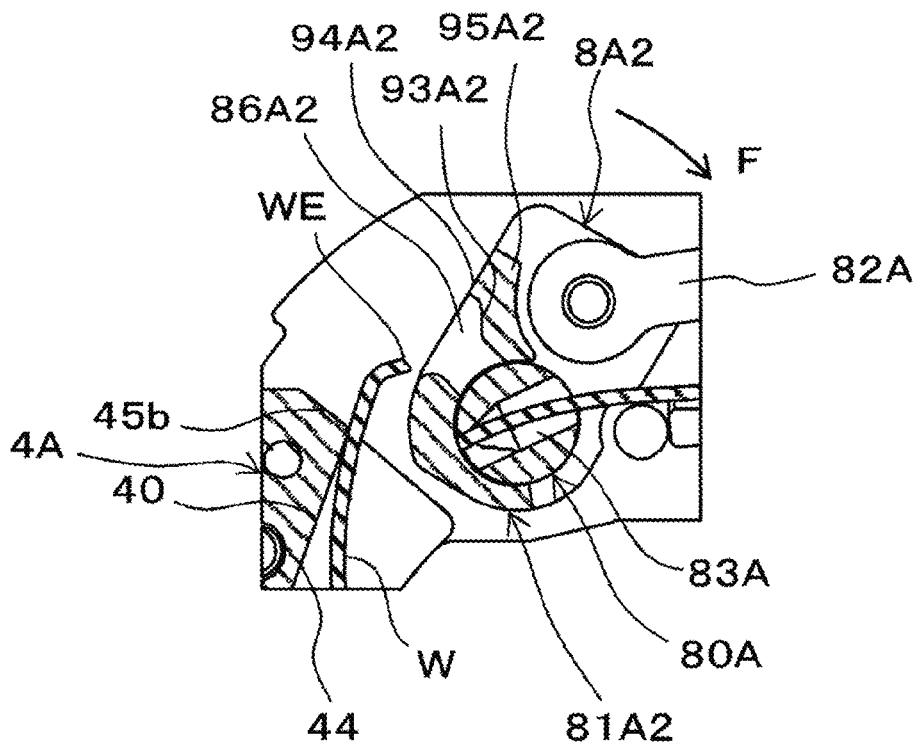
FIG. 6B is a view illustrating the second example of the cutting portion according to the first embodiment provided in the reinforcing bar binding machine according to the embodiment.
Figure 6C:
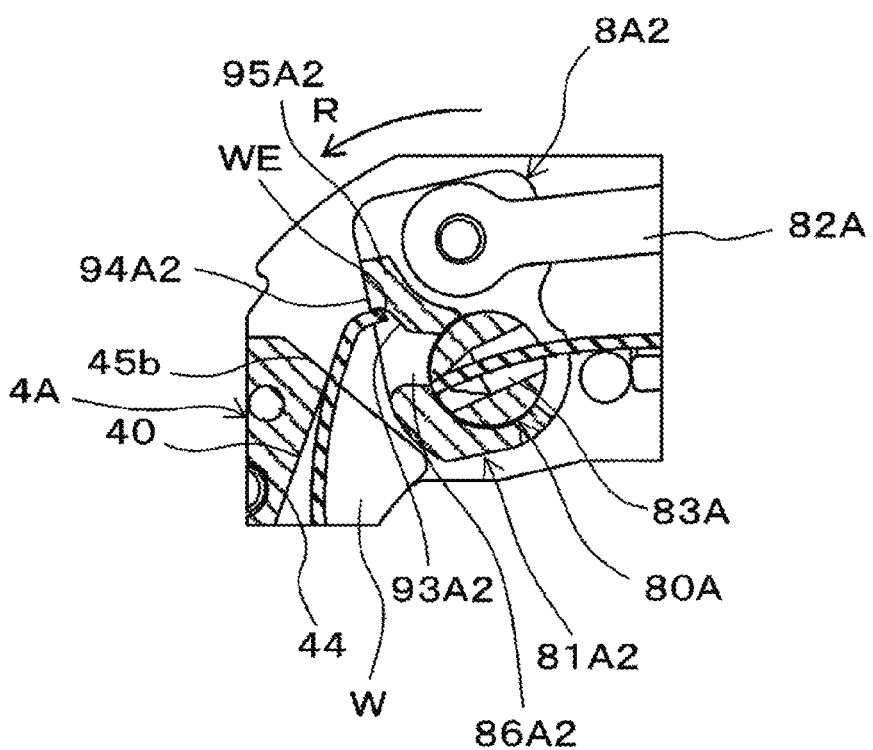
FIG. 6C is a view illustrating the second example of the cutting portion according to the first embodiment provided in the reinforcing bar binding machine according to the embodiment.
Figure 6D:
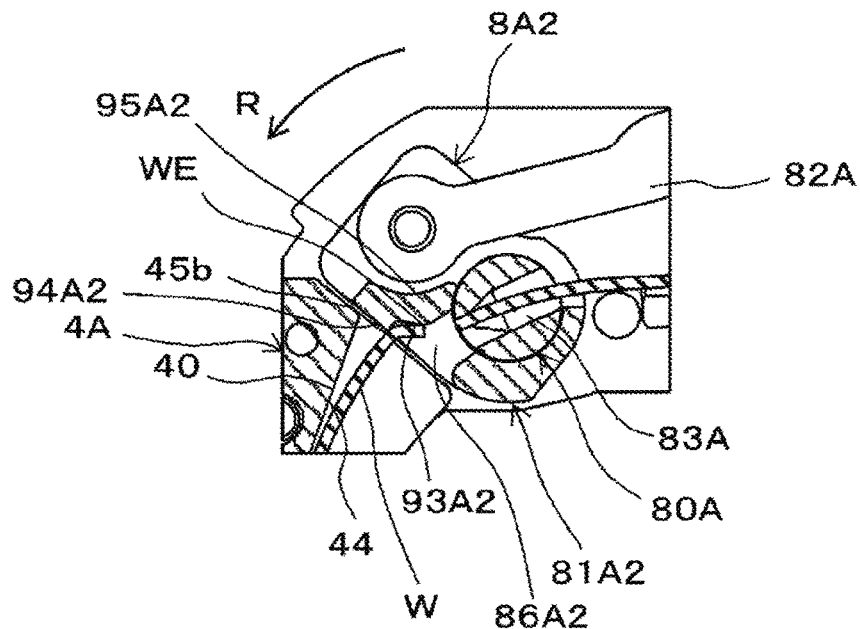
FIG. 6D is a view illustrating the second example of the cutting portion according to the first embodiment provided in the reinforcing bar binding machine according to the embodiment.

In the guiding portion 93A2, when the movable blade 81A2 is moved to the standby position illustrated in FIGS. 6A and 6D by rotation around the fixed blade 80A, on the downstream side along the feeding direction of the wire W, an end portion 94A2 of the passage forming member 95A2 on a side facing the guide portion 40 protrudes inward from the wire sliding surface 44 of the guide portion 40.

In the guiding portion 93A2, the end portion 94A2 protrudes in a direction of the guide portion 40 when the movable blade 81A2 is moved to the standby position. When the movable blade 81A2 is moved to the standby position, a distance between the end portion 94A2 of the guiding portion 93A2 and an end portion 45b of the guide portion 40 which is on a side facing the cutting portion 8A2 on the upstream side along the feeding direction of the wire W is smaller than the diameter of the wire W.

As a result, when the movable blade 81A2 is moved to the standby position, the end portion 45b of the guide portion 40 is covered with the end portion 94A2 of the guiding portion 93A2.

In the configuration where the guiding portion 93A2 described above is provided in the movable blade 81A2, when the movable blade 81A2 is located at the rotation finish position illustrated in FIG. 6B, the distance between the end portion 94A2 of the guiding portion 93A2 and the end portion 45b of the guide portion 40 is larger than the distance between the second wire passage 86 of the movable blade 81 of the related art where the guiding portion 93A2 is not provided and the end portion 45b of the guide portion 40.

Therefore, when the movable blade 81A2 is located at the rotation finish position illustrated in FIG. 6B, even if the rear end portion WE of the wire W cannot be held, if the movable blade 81A2 rotates in the retracting direction indicated by the arrow R as illustrated in FIG. 6C, the rear end portion WE of the wire W comes into contact with the guiding portion 93A2 or the end portion 94A2 of the guiding portion 93A2 and is guided into the second wire passage 86A2 by the rotational movement of the movable blade 81A2.

Then, as illustrated in FIG. 6D, when the movable blade 81A2 rotates to the standby position, the end portion 45b of the guide portion 40 is covered with the end portion 94A2 of the guiding portion 93A2 in a state where the rear end portion WE of the wire W is guided into the second wire passage 86A2.

Therefore, even when the rear end portion WE of the wire W cannot be held by the movable blade 81A2, the rear end portion WE of the wire W is prevented from being pinched between the driving member 82A and the end portion 45b of the guide portion 40. In addition, the rear end portion WE of the wire W is prevented from being pinched between the driving member 82A and the movable blade 81A2. Therefore, it is suppressed that the wire W after binding becomes hard to come off, and thus the working efficiency is improved.

FIGS. 7A to 7D are views illustrating a third example of the cutting portion according to the first embodiment provided in the reinforcing bar binding machine of the embodiment.

Figure 7A:
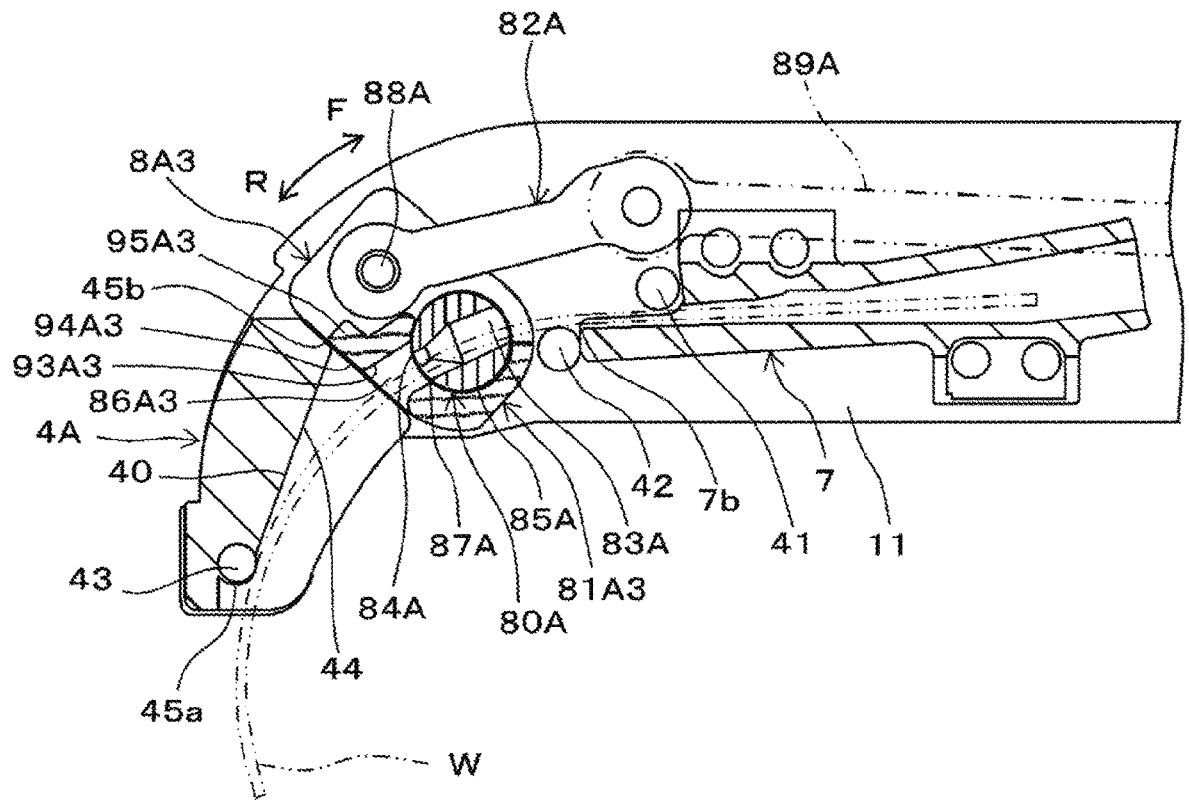
FIG. 7A is a view illustrating a third example of the cutting portion according to the first embodiment provided in the reinforcing bar binding machine according to the embodiment.

As illustrated in FIG. 7A, a cutting portion 8A3 of the third example of the first embodiment is different from the cutting portion 8A1 of the first example described above in the configuration of a movable blade 81A3. Hereinafter, the details of the movable blade 81A3 will be described and the other parts will be assigned the same reference numerals and letters as those of the cutting portion 8A1 of the first embodiment and the detailed description thereof will be omitted.

The movable blade 81A3 which is the third example of the movable blade 81A illustrated in FIG. 1 includes the shaft hole portion 85A into which the fixed blade 80A is inserted and a second wire passage 86A3 through which the wire W passes. The movable blade 81A3 includes the blade portion 87A provided on one side of the second wire passage 86A3 and sliding along the outer peripheral surface of the fixed blade 80A and a passage forming member 95A3 provided on the other side of the second wire passage 86A3, that is, in a portion on the opposite side to the blade portion 87A. Furthermore, the movable blade 81A3 includes the connecting portion 88A to which the driving member 82A is connected.

The second wire passage 86A3 is configured by an opening such as a groove or a hole through which the wire W passes. When the movable blade 81A3 is at the standby position illustrated in FIG. 7A, the second wire passage 86A3 is connected to the first wire passage 83A of the fixed blade 80A and forms a feeding path of the wire W through which the wire W before cutting passes. One side of the second wire passage 86A3 is a first side with respect to the feeding path of the wire W when the movable blade 81A3 is at the standby position. Also, the other side of the second wire passage 86A3 always becomes a second side with respect to the feeding path of the wire W. In the movable blade 81A3, in a state where the movable blade 81A3 is located at the standby position, the blade portion 87A is provided on the first side with respect to the feeding path of the wire W. Further, in the movable blade 81A3, on the second side opposite to the first side, a passage forming member 95A3 forming the second wire passage 86A3 is provided. Furthermore, the second wire passage 86A3 does not communicate with the first wire passage 83A of the fixed blade 80A when the movable blade 81A3 is located at a rotation finish position which is a movement finish position illustrated in FIG. 7B.

The second wire passage 86A3 includes a guiding portion 93A3 which guides the wire W after cutting to a path where the wire W can be removed from the cutting portion 8A3 in a rotational operation in which the movable blade 81A3 after cutting the wire W moves to the standby position. The guiding portion 93A3 is provided in the passage forming member 95A3.

Figure 7B:
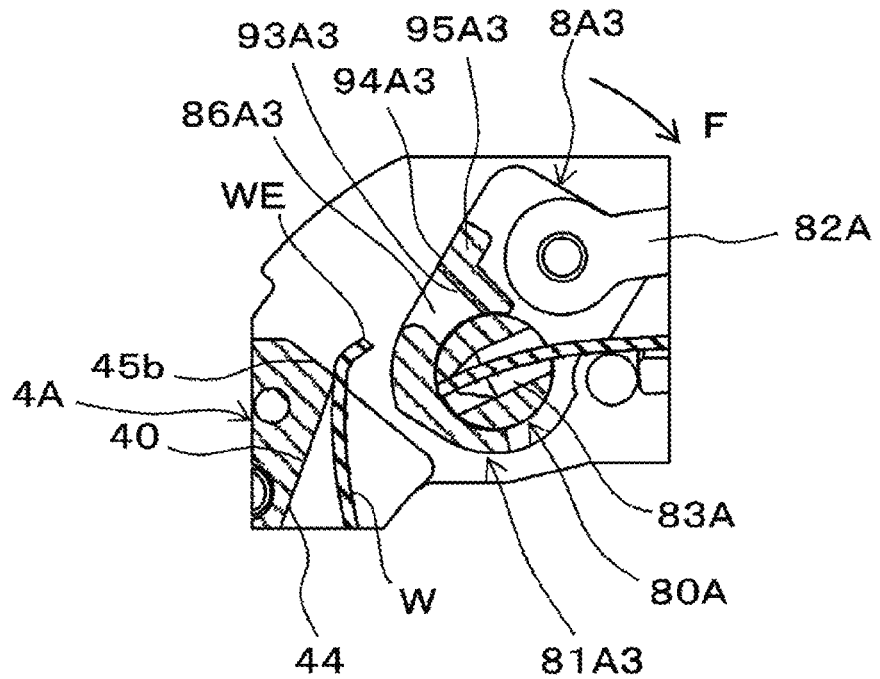
FIG. 7B is a view illustrating the third example of the cutting portion according to the first embodiment provided in the reinforcing bar binding machine according to the embodiment.
Figure 7C:
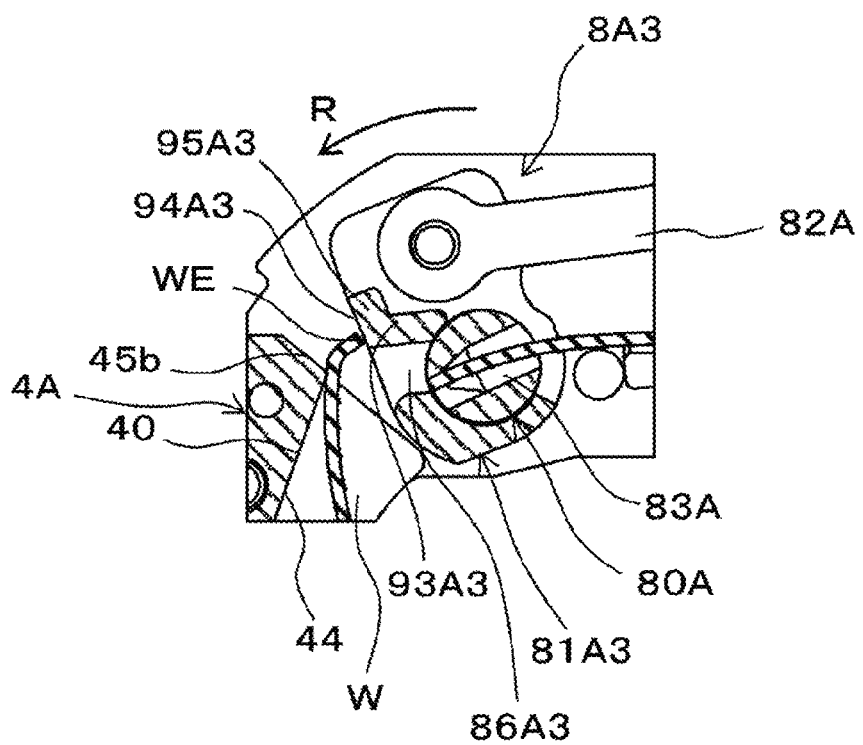
FIG. 7C is a view illustrating the third example of the cutting portion according to the first embodiment provided in the reinforcing bar binding machine according to the embodiment.
Figure 7D:
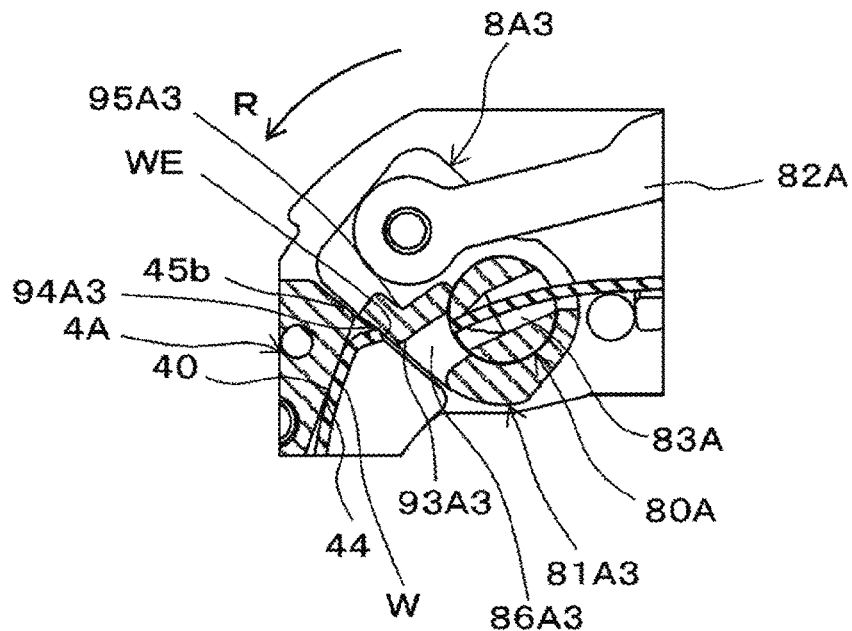
FIG. 7D is a view illustrating the third example of the cutting portion according to the first embodiment provided in the reinforcing bar binding machine according to the embodiment.

In the guiding portion 93A3, when the movable blade 81A3 is moved to the standby position illustrated in FIGS. 7A and 7D by rotation around the fixed blade 80A, on the downstream side along the feeding direction of the wire W, an end portion 94A3 of the passage forming member 95A3 on a side facing the guide portion 40 protrudes to the guide portion 40. As a result, the second wire passage 86A3 extends in the direction of the guide portion 40 to form the guiding portion 93A3.

When the movable blade 81A3 is moved to the standby position, a distance between the end portion 94A3 of the guiding portion 93A3 and the end portion 45b of the guide portion 40 which is on a side facing the cutting portion 8A3 on the upstream side along the feeding direction of the wire W is smaller than the diameter of the wire W.

As a result, when the movable blade 81A3 is moved to the standby position, the end portion 45b of the guide portion 40 is covered with the end portion 94A3 of the guiding portion 93A3.

In the configuration where the guiding portion 93A3 described above is provided in the movable blade 81A3, when the movable blade 81A3 rotates in the retracting direction indicated by the arrow R from a state where the movable blade 81A3 is located at the rotation finish position illustrated in FIG. 7B and the rear end portion WE of the wire W comes into contact with the end portion 94A3 of the guiding portion 93A3, the end portion 94A3 inclines in a direction in which a force to guide the wire W in the direction of the second wire passage 86A3 is applied.

Therefore, when the movable blade 81A3 is located at the rotation finish position illustrated in FIG. 7B, even if the rear end portion WE of the wire W cannot be held, if the movable blade 81A3 rotates in the retracting direction indicated by the arrow R, the rear end portion WE of the wire W comes into contact with the guiding portion 93A3 and is guided into the second wire passage 86A3 by the rotational movement of the movable blade 81A3. Further, even when the rear end portion WE of the wire W is not guided into the wire passage 86A3, as illustrated in FIG. 7C, the rear end portion WE of the wire W comes into contact with an end portion 94A4 of the guiding portion 93A3, so that the rear end portion WE of the wire W is pushed out by the end 94A4.

Then, as illustrated in FIG. 7D, when the movable blade 81A3 rotates to the standby position, the end portion 45b of the guide portion 40 is covered with the end portion 94A3 of the guiding portion 93A3.

Therefore, even when the rear end portion WE of the wire W cannot be held by the movable blade 81A3, the rear end portion WE of the wire W is prevented from being pinched between the driving member 82A and the end portion 45b of the guide portion 40. In addition, the rear end portion WE of the wire W is prevented from being pinched between the driving member 82A and the movable blade 81A3. Therefore, it is suppressed that the wire W after binding becomes hard to come off, and thus the working efficiency is improved.

FIGS. 8A to 8D are views illustrating a fourth example of the cutting portion according to the first embodiment provided in the reinforcing bar binding machine of the embodiment.

Figure 8A:
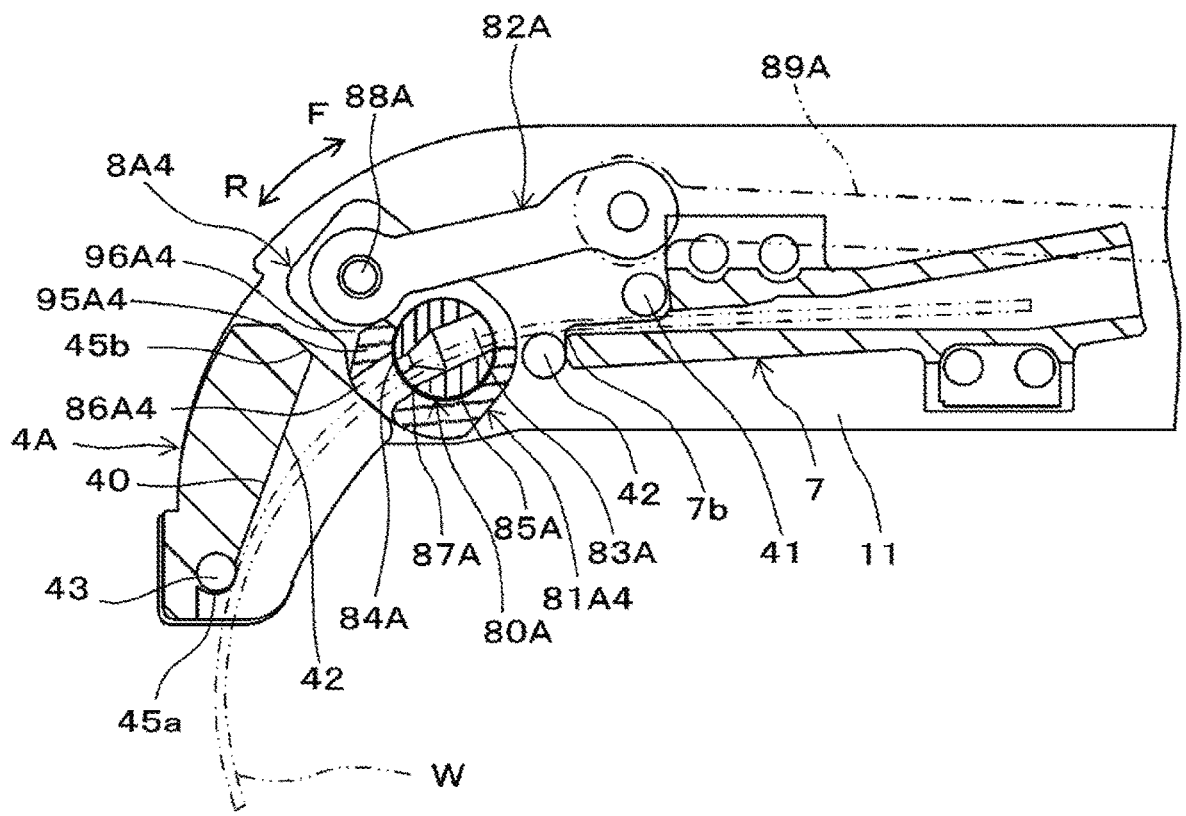
FIG. 8A is a view illustrating a fourth example of the cutting portion according to the first embodiment provided in the reinforcing bar binding machine according to the embodiment.

As illustrated in FIG. 8A, a cutting portion 8A4 of the fourth example of the first embodiment is different from the cutting portion 8A1 of the first example described above in the configuration of a movable blade 81A4. Hereinafter, the details of the movable blade 81A4 will be described and the other parts will be assigned the same reference numerals and letters as those of the cutting portion 8A1 of the first embodiment and the detailed description thereof will be omitted.

The movable blade 81A4 which is the fourth example of the movable blade 81A illustrated in FIG. 1 includes the shaft hole portion 85A into which the fixed blade 80A is inserted and a second wire passage 86A4 through which the wire W passes. The movable blade 81A4 includes the blade portion 87A provided on one side of the second wire passage 86A4 and sliding along the outer peripheral surface of the fixed blade 80A and a passage forming member 95A4 provided on the other side of the second wire passage 86A4, that is, in a portion on the opposite side to the blade portion 87A. Furthermore, the movable blade 81A4 includes the connecting portion 88A to which the driving member 82A is connected.

The second wire passage 86A4 is configured by an opening such as a groove or a hole through which the wire W passes. When the movable blade 81A4 is at the standby position illustrated in FIG. 8A, the second wire passage 86A4 is connected to the first wire passage 83A of the fixed blade 80A and forms a feeding path of the wire W through which the wire W before cutting passes. One side of the second wire passage 86A4 is a first side with respect to the feeding path of the wire W when the movable blade 81A4 is at the standby position. Also, the other side of the second wire passage 86A4 always becomes a second side with respect to the feeding path of the wire W. In the movable blade 81A4, in a state where the movable blade 81A4 is located at the standby position, the blade portion 87A is provided on the first side with respect to the feeding path of the wire W. Further, in the movable blade 81A4, on the second side opposite to the first side, a passage forming member 95A4 forming the second wire passage 86A4 is provided. Furthermore, the second wire passage 86A4 does not communicate with the first wire passage 83A of the fixed blade 80A when the movable blade 81A4 is located at a rotation finish position which is a movement finish position illustrated in FIG. 8B.

The cutting portion 8A4 includes a discharge guiding portion 96A4 which guides the discharge of the wire W pinched between the movable blade 81A4 and the driving member 82A. The discharging guiding portion 96A4 is provided on a surface of the passage forming member 95A4, which is the surface facing the driving member 82A connected with the movable blade 81A4 in the connecting portion 88A. The movable blade 81A4 and the driving member 82A face the guide portion 40 in a state where the movable blade 81A4 is moved to the standby position illustrated in FIGS. 8A and 8D by rotation around the fixed blade 80A. The discharge guiding portion 96A4 is constituted by a surface which expands toward the guide portion 40 in a state where, when the movable blade 81A4 is moved to the standby position, an opening between the passage forming member 95A4 of the movable blade 81A4 and the driving member 82A is an opening equal to or larger than the diameter of the wire W. The discharge guiding portion 96A4 may be configured by a curved surface, may be configured by a plane, or may be configured by a concavo-convex surface.

Figure 8B:
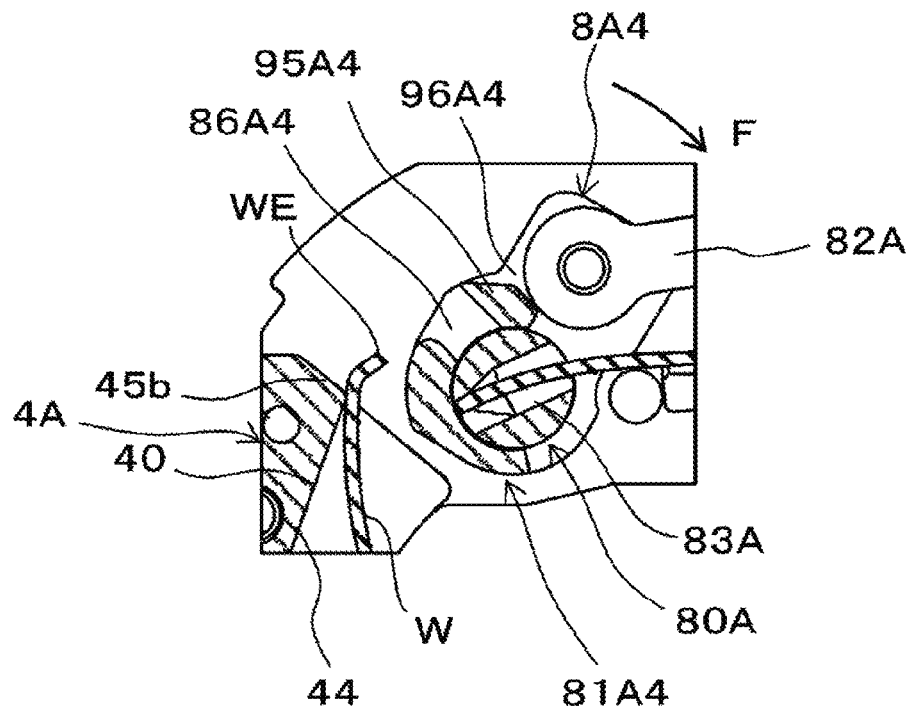
FIG. 8B is a view illustrating the fourth example of the cutting portion according to the first embodiment provided in the reinforcing bar binding machine according to the embodiment.
Figure 8C:
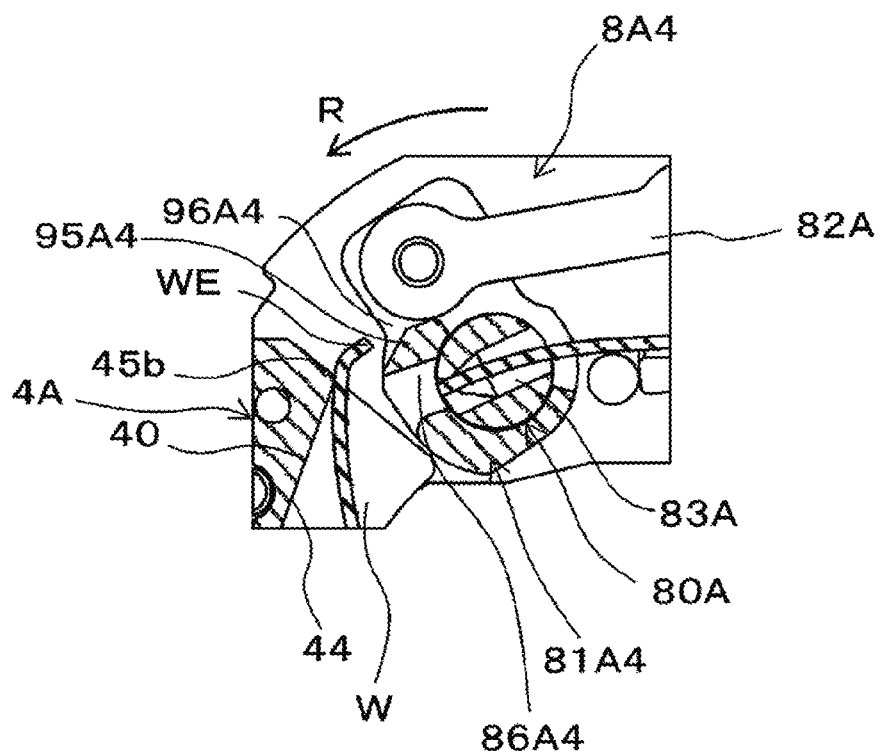
FIG. 8C is a view illustrating the fourth example of the cutting portion according to the first embodiment provided in the reinforcing bar binding machine according to the embodiment.
Figure 8D:
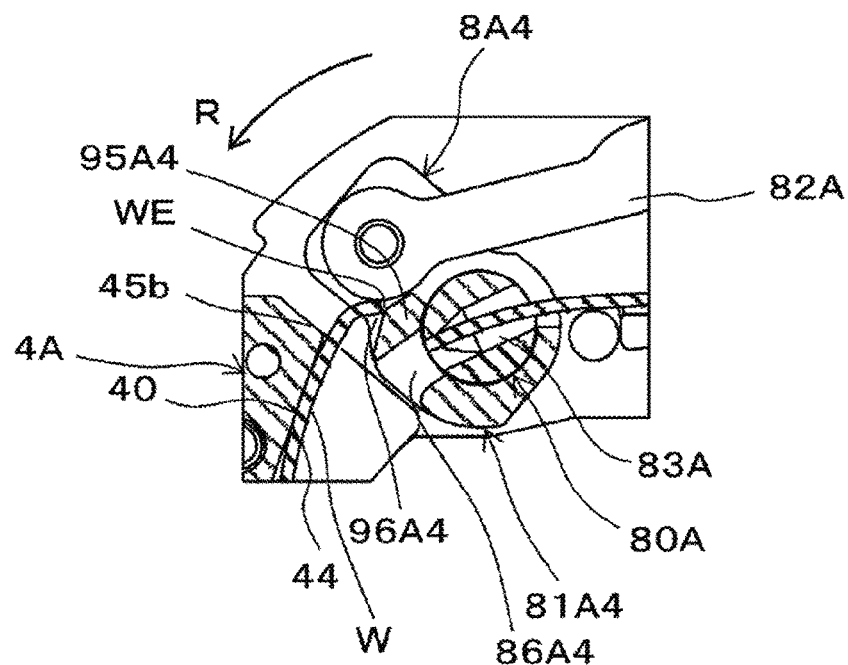
FIG. 8D is a view illustrating the fourth example of the cutting portion according to the first embodiment provided in the reinforcing bar binding machine according to the embodiment.

When the rear end portion WE of the wire W cannot be held by the movable blade 81A4 at the rotation finish position illustrated in FIG. 8B, if the movable blade 81A4 rotates in the retracting direction indicated by the arrow R as illustrated in FIG. 8C and rotates to the standby position as illustrated in FIG. 8D, the rear end portion WE of the wire W may be pinched between the movable blade 81A4 and the driving member 82A. Even in such a case, by providing the discharge guiding portion 96A4 described above, the wire W easily comes off from a portion between the passage forming member 95A4 of the movable blade 81A4 and the driving member 82A.

Therefore, even when the rear end portion WE of the wire W cannot be held by the movable blade 81A4, it is suppressed that the wire W after binding becomes hard to come off, and thus the working efficiency is improved.

FIGS. 9A to 9D are views illustrating a fifth example of the cutting portion according to the first embodiment provided in the reinforcing bar binding machine of the embodiment.

Figure 9A:
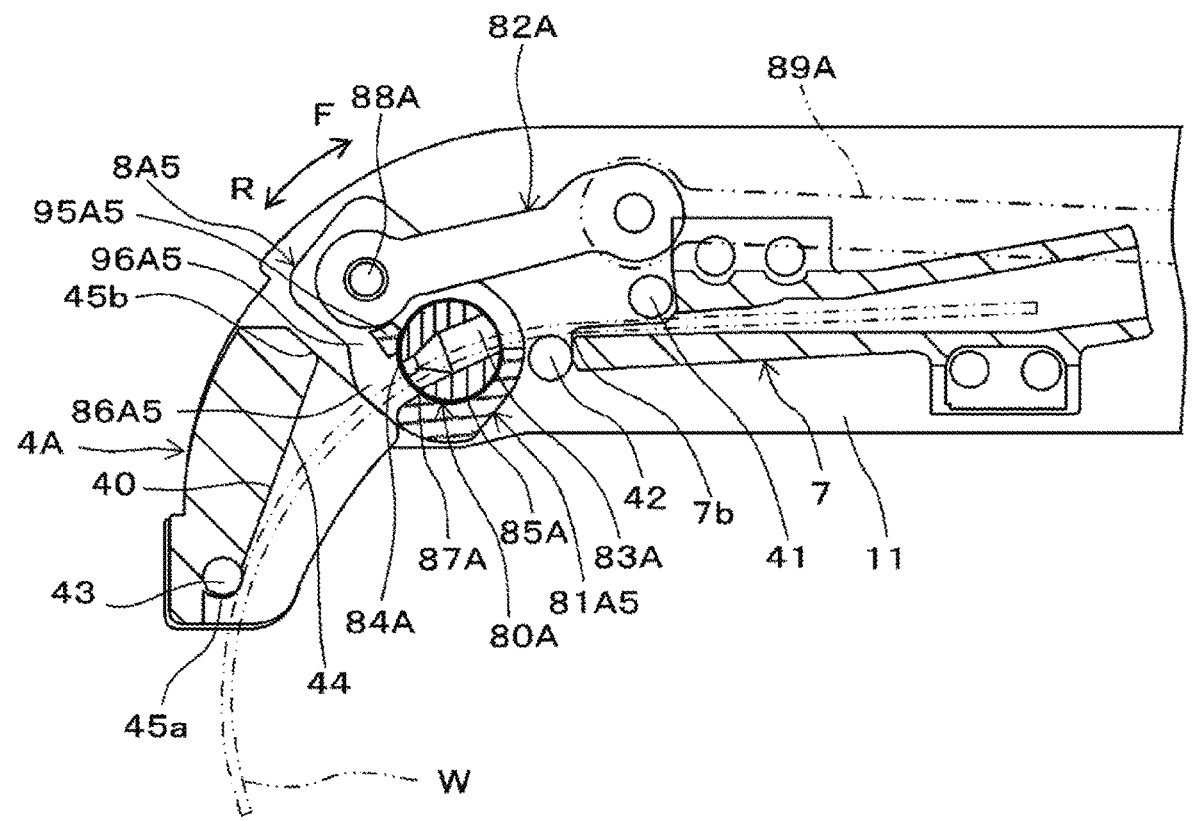
FIG. 9A is a view illustrating a fifth example of the cutting portion according to the first embodiment provided in the reinforcing bar binding machine according to the embodiment.

As illustrated in FIG. 9A, a cutting portion 8A5 of the fifth example of the first embodiment is different from the cutting portion 8A1 of the first example described above in the configuration of a movable blade 81A5. Hereinafter, the details of the movable blade 81A5 will be described and the other parts will be assigned the same reference numerals and letters as those of the cutting portion 8A1 of the first embodiment and the detailed description thereof will be omitted.

The movable blade 81A5 which is the fifth example of the movable blade 81A illustrated in FIG. 1 includes the shaft hole portion 85A into which the fixed blade 80A is inserted and a second wire passage 86A5 through which the wire W passes. The movable blade 81A5 includes the blade portion 87A provided on one side of the second wire passage 86A5 and sliding along the outer peripheral surface of the fixed blade 80A and a passage forming member 95A5 provided on the other side of the second wire passage 86A5, that is, in a portion on the opposite side to the blade portion 87A. Furthermore, the movable blade 81A5 includes the connecting portion 88A to which the driving member 82A is connected.

The second wire passage 86A5 is configured by an opening such as a groove or a hole through which the wire W passes. When the movable blade 81A5 is at the standby position illustrated in FIG. 9A, the second wire passage 86A5 is connected to the first wire passage 83A of the fixed blade 80A and forms a feeding path of the wire W through which the wire W before cutting passes. One side of the second wire passage 86A5 is a first side with respect to the feeding path of the wire W when the movable blade 81A5 is at the standby position. Also, the other side of the second wire passage 86A5 always becomes a second side with respect to the feeding path of the wire W. In the movable blade 81A5, in a state where the movable blade 81A5 is located at the standby position, the blade portion 87A is provided on the first side with respect to the feeding path of the wire W. In the movable blade 81A5, on the second side opposite to the first side, a passage forming member 95A5 forming the second wire passage 86A5 is provided. Furthermore, the second wire passage 86A5 does not communicate with the first wire passage 83A of the fixed blade 80A when the movable blade 81A5 is located at a rotation finish position which is a movement finish position illustrated in FIG. 9B.

The cutting portion 8A5 includes a suppressing portion 96A5 which suppresses the wire W from being pinched between the movable blade 81A5 and the driving member 82A. The suppressing portion 96A5 is configured such that, when the movable blade 81A5 is moved to the standby position illustrated in FIGS. 9A and 9D by rotation around the fixed blade 80A, an end portion of the passage forming member 95A5 which faces the guide portion 40 is retracted in a direction away from the guide portion 40.

Figure 9B:
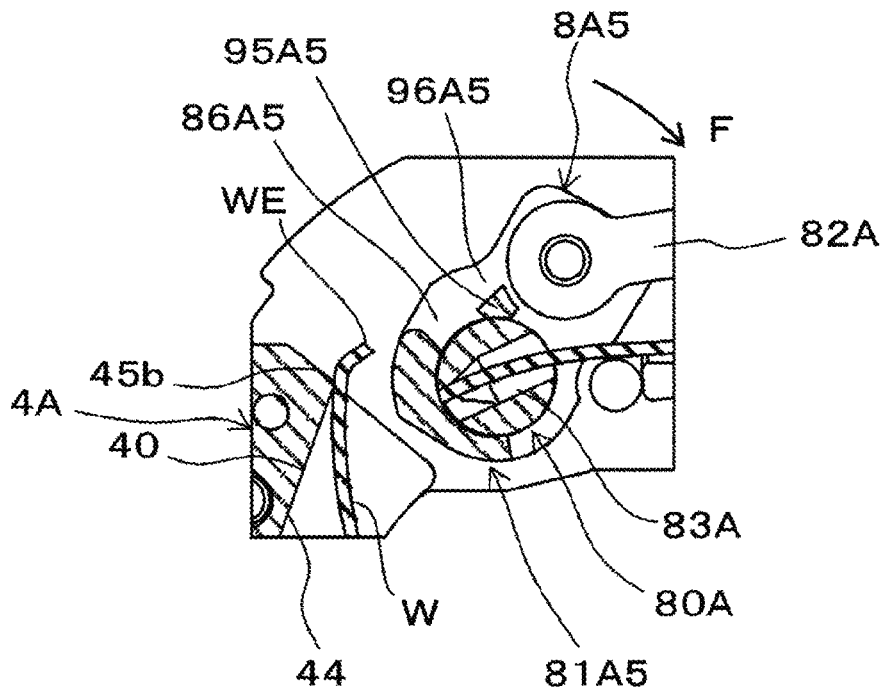
FIG. 9B is a view illustrating the fifth example of the cutting portion according to the first embodiment provided in the reinforcing bar binding machine according to the embodiment.
Figure 9C:
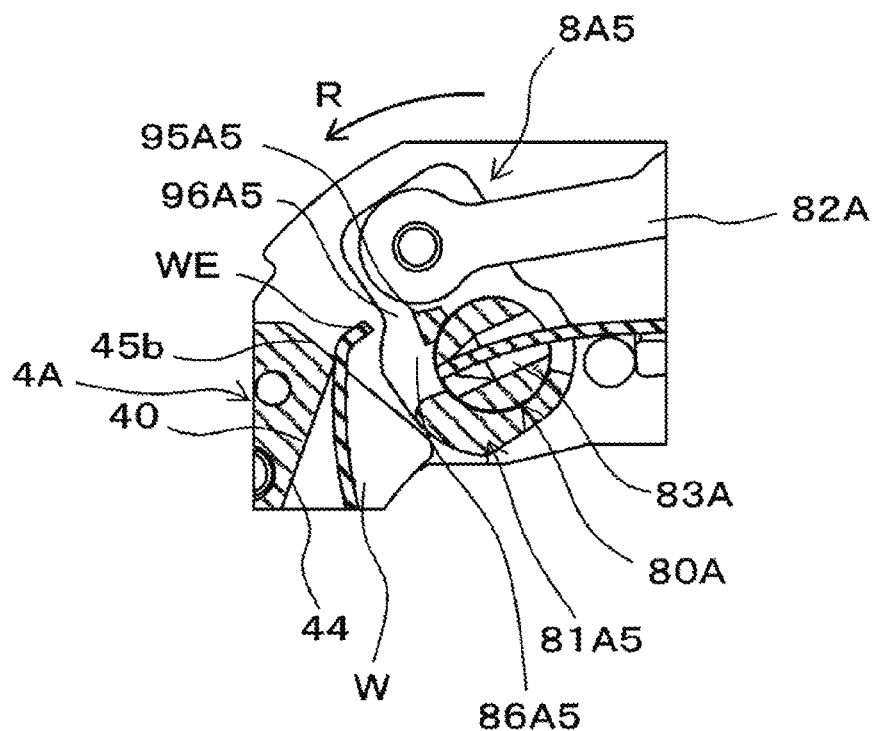
FIG. 9C is a view illustrating the fifth example of the cutting portion according to the first embodiment provided in the reinforcing bar binding machine according to the embodiment.
Figure 9D:
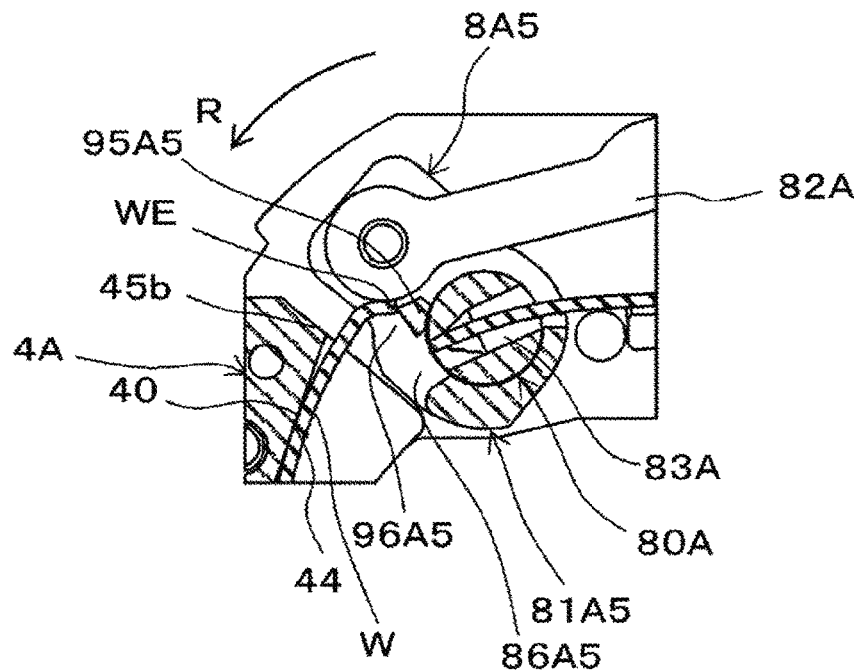
FIG. 9D is a view illustrating the fifth example of the cutting portion according to the first embodiment provided in the reinforcing bar binding machine according to the embodiment.

When the rear end portion WE of wire W cannot be held by the movable blade 81A5 at the rotation finish position illustrated in FIG. 9B, if the movable blade 81A5 rotates in the retracting direction indicated by the arrow R as illustrated in FIG. 9C and rotates to the standby position as illustrated in FIG. 9D, a space is formed by the suppressing portion 96A5 in a portion between the guide portion 40 and the passage forming member 95A5 of the movable blade 81A5. As a result, the wire W is not pinched between the movable blade 81A5 and the driving member 82A.

Therefore, even when the rear end portion WE of the wire W cannot be held by the movable blade 81A5, it is suppressed that the wire W after binding becomes hard to come off, and thus the working efficiency is improved.

FIGS. 10A to 10E are views illustrating a sixth example of the cutting portion according to the first embodiment provided in the reinforcing bar binding machine of the embodiment.

Figure 10A:
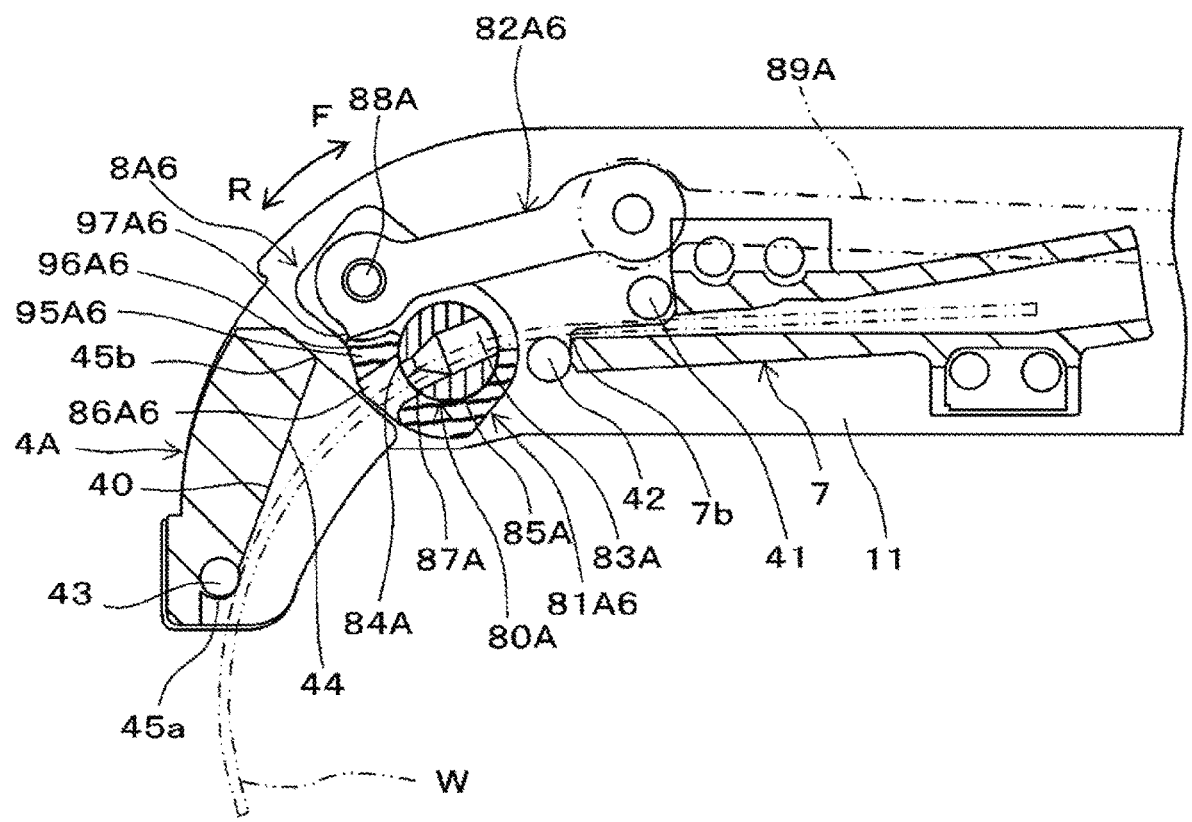
FIG. 10A is a view illustrating a sixth example of the cutting portion according to the first embodiment provided in the reinforcing bar binding machine according to the embodiment.

As illustrated in FIG. 10A, a cutting portion 8A6 of the sixth example of the first embodiment is different from the cutting portion 8A1 of the first example described above in the configuration of a movable blade 81A6 and a driving member 82A6. Hereinafter, the details of the movable blade 81A6 and the driving member 82A6 will be described and the other parts will be assigned the same reference numerals and letters as those of the cutting portion 8A1 of the first embodiment and the detailed description thereof will be omitted.

The movable blade 81A6 which is the sixth example of the movable blade 81A illustrated in FIG. 1 includes the shaft hole portion 85A into which the fixed blade 80A is inserted and a second wire passage 86A6 through which the wire W passes. The movable blade 81A6 includes the blade portion 87A provided on one side of the second wire passage 86A6 and sliding along the outer peripheral surface of the fixed blade 80A and a passage forming member 95A6 provided on the other side of the second wire passage 86A6, that is, in a portion on the opposite side to the blade portion 87A. Furthermore, the movable blade 81A6 includes the connecting portion 88A to which the driving member 82A6 is connected.

The second wire passage 86A6 is configured by an opening such as a groove or a hole through which the wire W passes. When the movable blade 81A6 is at the standby position illustrated in FIG. 10A, the second wire passage 86A6 is connected to the first wire passage 83A of the fixed blade 80A and forms a feeding path of the wire W through which the wire W before cutting passes. One side of the second wire passage 86A6 is a first side with respect to the feeding path of the wire W when the movable blade 81A6 is at the standby position. Also, the other side of the second wire passage 86A6 always becomes a second side with respect to the feeding path of the wire W. In the movable blade 81A6, in a state where the movable blade 81A6 is located at the standby position, the blade portion 87A is provided on the first side with respect to the feeding path of the wire W. In the movable blade 81A6, on the second side opposite to the first side, a passage forming member 95A6 forming the second wire passage 86A6 is provided. Furthermore, the second wire passage 86A6 does not communicate with the first wire passage 83A of the fixed blade 80A when the movable blade 81A6 is located at a rotation finish position which is a movement finish position illustrated in FIG. 10B.

The movable blade 81A6 includes a suppressing portion 96A6 which suppresses the wire W from being pinched between the passage forming member 95A6 and the driving member 82A6. In the movable blade 81A6, the suppressing portion 96A6 is configured by providing a convex portion protruding in the direction of the driving member 82A6 on a surface which is the surface facing the driving member 82A6 and connected to the movable blade 81A6 at the connecting portion 88A. When the movable blade 81A6 is moved to the standby position illustrated by FIGS. 10A and 10E by rotation around the fixed blade 80A, the movable blade 81A6 and the driving member 82A6 face the guide portion 40. The suppressing portion 96A6 is provided at the end portion of the passage forming member 95A6 on a side facing the guide portion 40.

The driving member 82A6 is provided with a suppressing portion 97A6 which suppresses that the wire W is pinched between the driving member 82A6 and the passage forming member 95A6. The suppressing portion 97A6 is configured by providing a convex portion protruding in the direction of the movable blade 81A6 on a surface of the driving member 82A6 which is the surface facing the passage forming member 95A6. The suppressing portion 97A6 is provided at the end portion of the driving member 82A6 on a side facing the guide portion 40.

In the cutting portion 8A6, at least one of the movable blade 81A6 and the driving member 82A6 may be provided with the suppressing portion as long as it is configured such that the distance between the passage forming member 95A6 of the movable blade 81A6 and the driving member 82A6 is less than the diameter of the wire W with the movable blade 81A6 moved to the standby position.

Figure 10B:
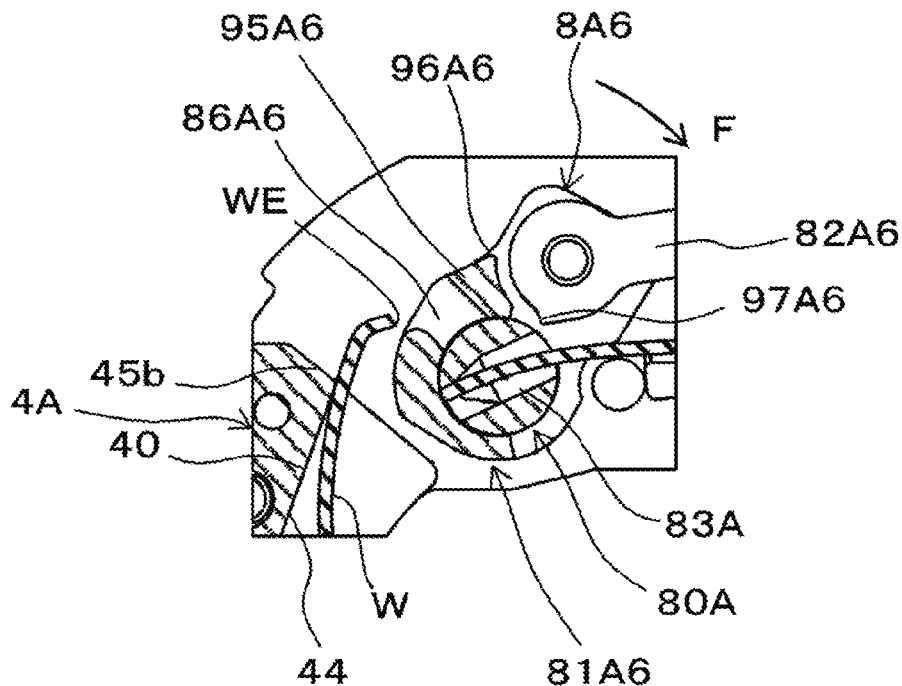
FIG. 10B is a view illustrating the sixth example of the cutting portion according to the first embodiment provided in the reinforcing bar binding machine according to the embodiment.
Figure 10C:
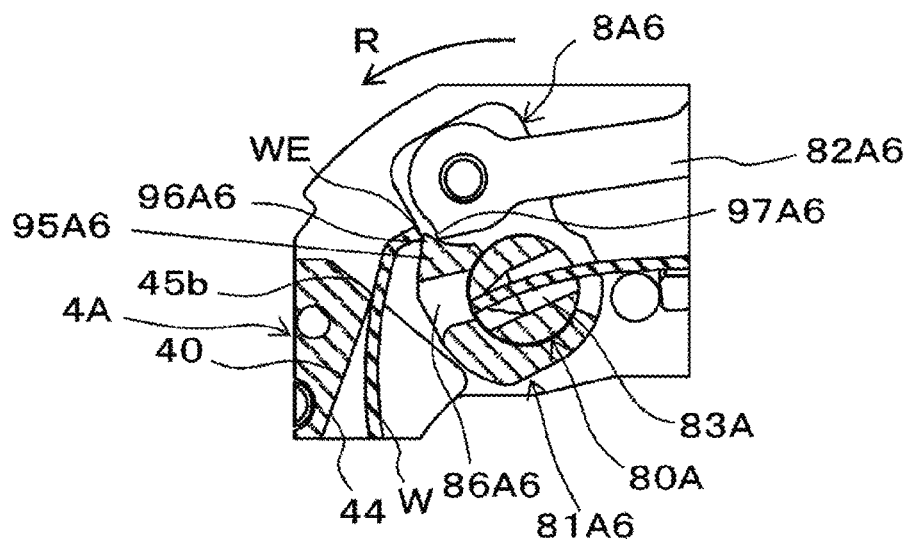
FIG. 10C is a view illustrating the sixth example of the cutting portion according to the first embodiment provided in the reinforcing bar binding machine according to the embodiment.
Figure 10D:
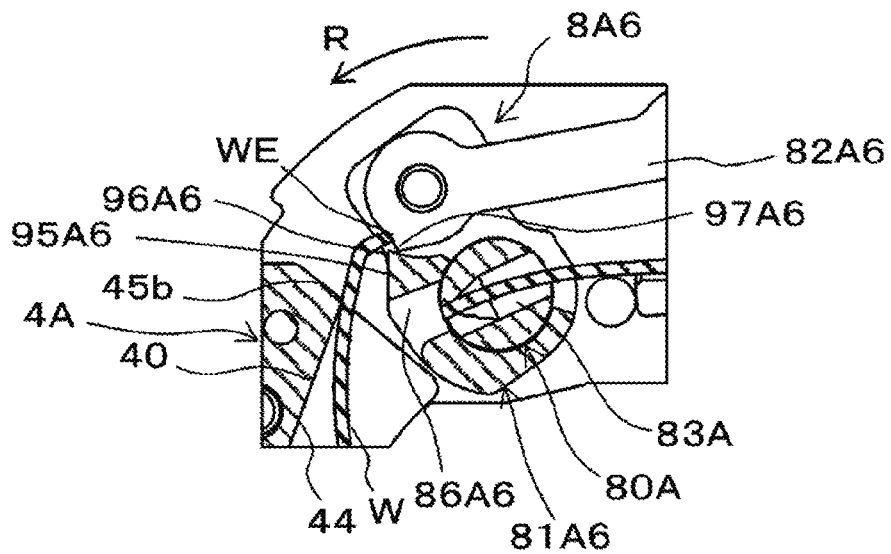
FIG. 10D is a view illustrating the sixth example of the cutting portion according to the first embodiment provided in the reinforcing bar binding machine according to the embodiment.
Figure 10E:
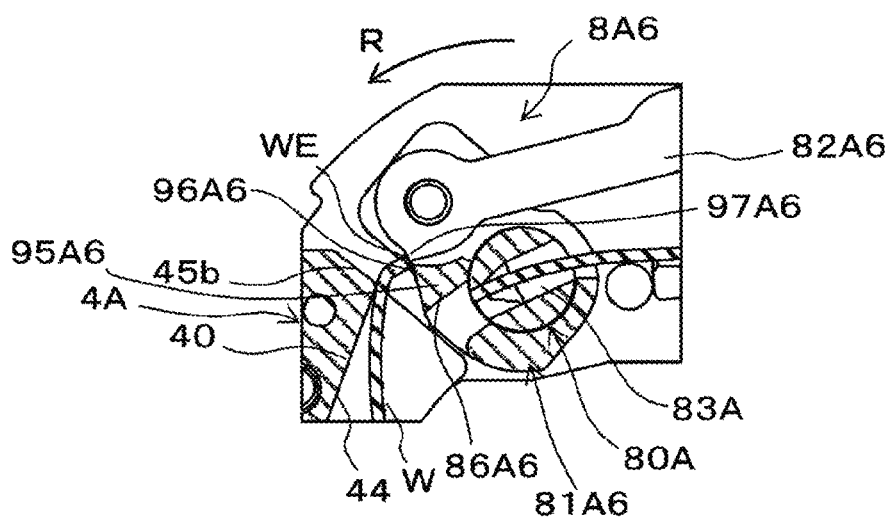
FIG. 10E is a view illustrating the sixth example of the cutting portion according to the first embodiment provided in the reinforcing bar binding machine according to the embodiment.

When the rear end portion WE of wire W cannot be held by the movable blade 81A6 at the rotation finish position illustrated in FIG. 10B, if the movable blade 81A6 rotates in the retracting direction indicated by the arrow R as illustrated in FIG. 10C, the rear end portion WE of the wire W comes into contact with the suppressing portion 96A6 of the movable blade 81A6 and the rear end portion WE of the wire W is suppressed from being pinched between the movable blade 81A6 and the driving member 82A6. As illustrated in FIG. 10D, the rear end portion WE of the wire W comes into contact with the suppressing portion 97A6 of the driving member 82A6 and the rear end portion WE of the wire W is suppressed from being pinched between the movable blade 81A6 and the driving member 82A6. Therefore, when the movable blade 81A6 rotates to the standby position as illustrated by FIG. 10E, the rear end portion WE of the wire W is suppressed from being pinched between the movable blade 81A6 and the driving member 82A6 by the suppressing portion 96A6 of the movable blade 81A6 and the suppressing portion 97A6 of the driving member 82A6.

Therefore, even when the rear end portion WE of the wire W cannot be held by the movable blade 81A6, it is suppressed that the wire W after binding becomes hard to come off, and thus the working efficiency is improved.

Figure 11A:
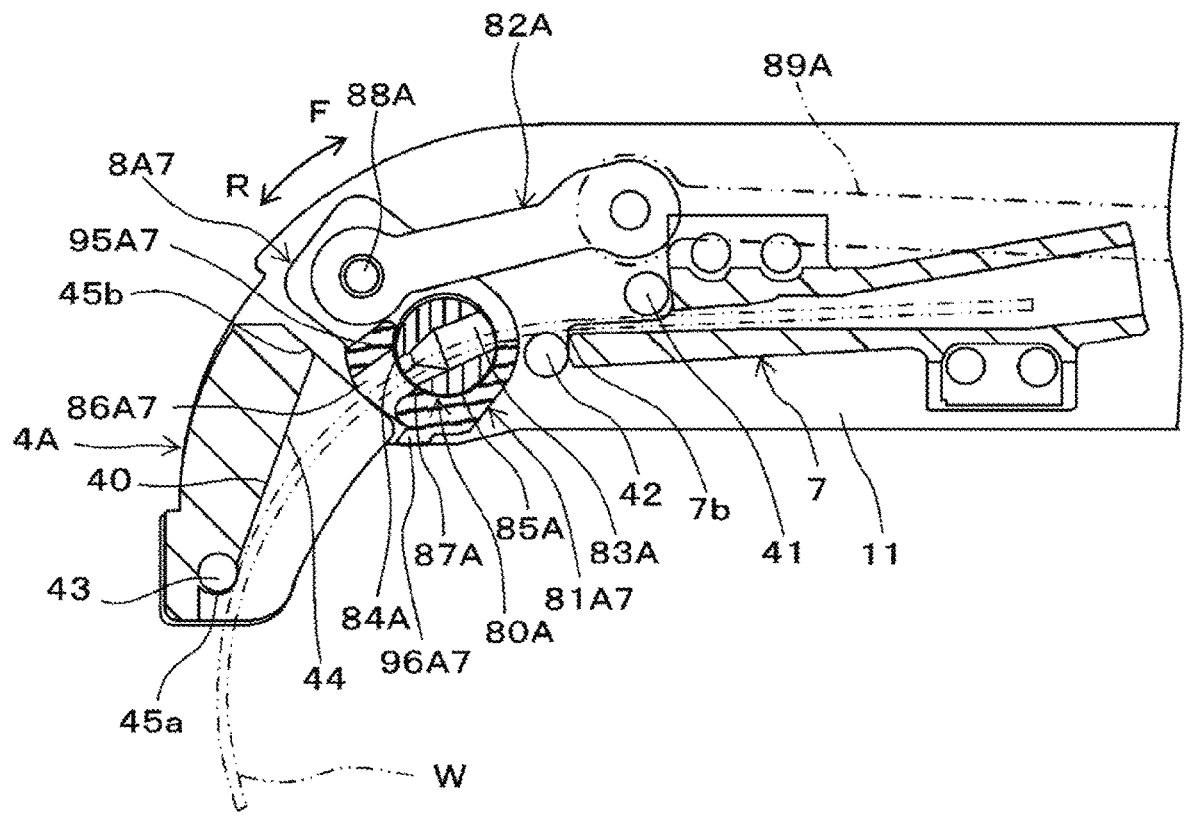
FIG. 11A is a view illustrating a seventh example of the cutting portion according to the first embodiment provided in the reinforcing bar binding machine according to the embodiment.
Figure 11B:
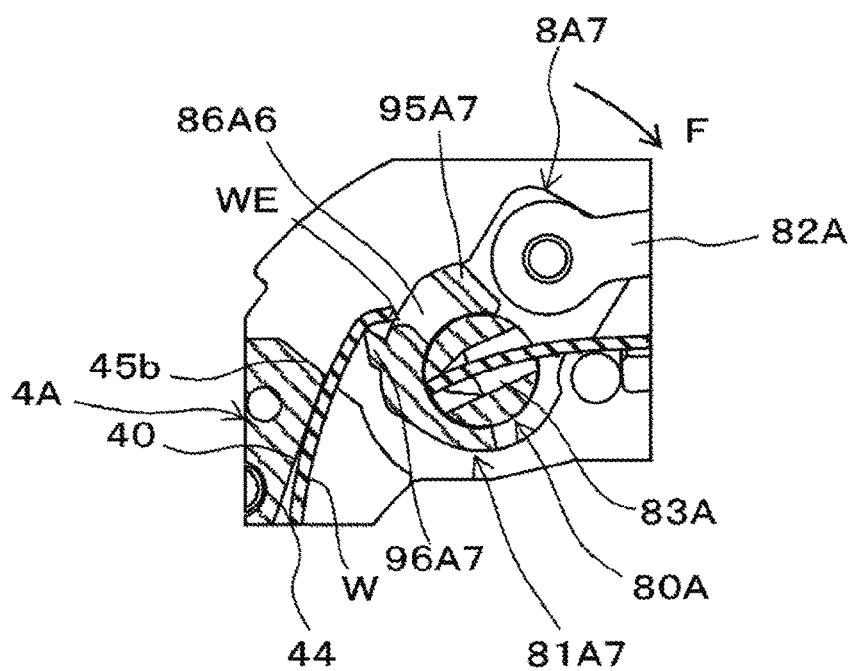
FIG. 11B is a view illustrating the seventh example of the cutting portion according to the first embodiment provided in the reinforcing bar binding machine according to the embodiment.
Figure 11C:
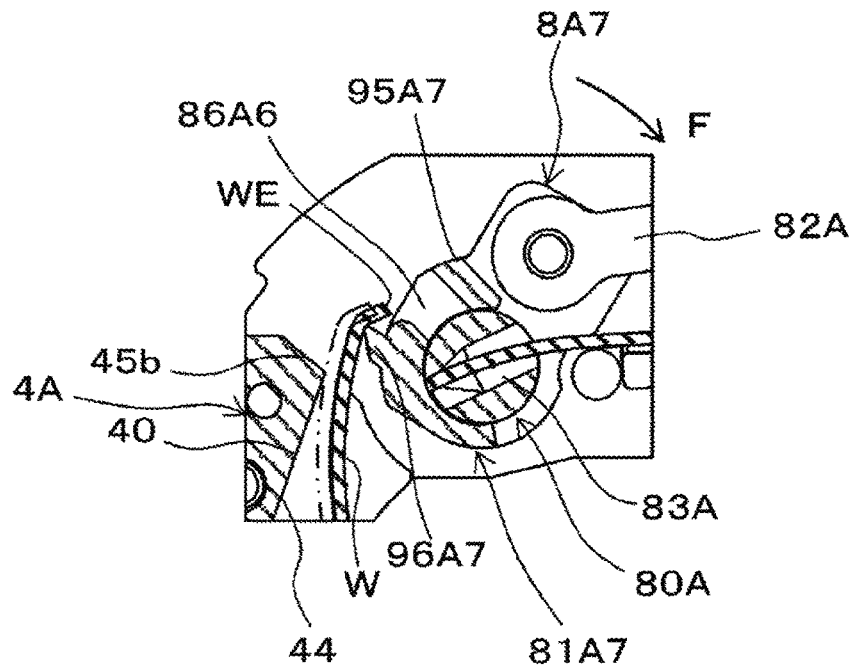
FIG. 11C is a view illustrating the seventh example of the cutting portion according to the first embodiment provided in the reinforcing bar binding machine according to the embodiment.

FIGS. 11A to 11C are views illustrating a seventh example of the cutting portion according to the first embodiment provided in the reinforcing bar binding machine of the embodiment.

As illustrated in FIG. 11A, a cutting portion 8A7 of the seventh example of the first embodiment is different from the cutting portion 8A1 of the first example described above in the configuration of a movable blade 81A7. Hereinafter, the details of the movable blade 81A7 will be described and the other parts will be assigned the same reference numerals and letters as those of the cutting portion 8A1 of the first embodiment and the detailed description thereof will be omitted.

The movable blade 81A7 which is the seventh example of the movable blade 81A illustrated in FIG. 1 includes the shaft hole portion 85A into which the fixed blade 80A is inserted and a second wire passage 86A7 through which the wire W passes. The movable blade 81A7 includes the blade portion 87A provided on one side of the second wire passage 86A7 and sliding along the outer peripheral surface of the fixed blade 80A and a passage forming member 95A7 provided on the other side of the second wire passage 86A7, that is, in a portion on the opposite side to the blade portion 87A. Furthermore, the movable blade 81A7 includes the connecting portion 88A to which the driving member 82A6 is connected.

The second wire passage 86A7 is configured by an opening such as a groove or a hole through which the wire W passes. When the movable blade 81A7 is at the standby position illustrated in FIG. 11A, the second wire passage 86A7 is connected to the first wire passage 83A of the fixed blade 80A and forms a feeding path of the wire W through which the wire W before cutting passes. One side of the second wire passage 86A7 is a first side with respect to the feeding path of the wire W when the movable blade 81A7 is at the standby position. Also, the other side of the second wire passage 86A7 always becomes a second side with respect to the feeding path of the wire W. In the movable blade 81A7, in a state where the movable blade 81A7 is located at the standby position, the blade portion 87A is provided on the first side with respect to the feeding path of the wire W. Further, in the movable blade 81A7, on the second side opposite to the first side, a passage forming member 95A7 forming the second wire passage 86A7 is provided. Furthermore, the second wire passage 86A7 does not communicate with the first wire passage 83A of the fixed blade 80A when the movable blade 81A7 is located at a rotation finish position which is a movement finish position illustrated in FIG. 11B.

The movable blade 81A7 includes a behavior change suppressing portion 96A7 which suppresses the behavior change of the wire W between the movable blade 81A7 and the guide portion 40. The behavior change suppressing portion 96A7 is configured by providing a convex portion protruding in a direction of the guide portion 40 in an end portion of the movable blade 81A7 which faces the end portion 45b of the guide portion 40 in a state where the movable blade 81A7 is moved to the rotation finish position which is the movement finish position illustrated in FIGS. 11B and 11C by rotation around the fixed blade 80A.

The behavior change suppressing portion 96A7 faces the guide portion 40 when the movable blade 81A7 is at the rotation finish position illustrated in FIG. 11B. Thus, the distance between the movable blade 81A7 and the guide portion 40 decreases compared to the configuration in which the behavior change suppressing portion 96A7 is not provided.

When the tip end portion of the first engagement surface 91 described above is worn, it may not be possible to hold the rear end portion WE of the wire W. Even in such a case, when a force to pull the wire W is applied by twisting the wire W wound around the reinforcing bar S with the binding portion 5A, as illustrated by a two-dot chain line in FIG. 11C, it is suppressed that the behavior of the wire W is greatly changed. Thus, the freedom of movement of the wire W between the guide portion 40 and the movable blade 81A7 can be limited. Therefore, when the movable blade 81A7 rotates to the standby position, the movement of the end portion WE of the wire W to a position where the end portion WE is pinched between the movable blade 81A7 and the driving member 82A can be suppressed.

Therefore, when the movable blade 81A7 rotates to the standby position, it is suppressed that the wire W after binding becomes hard to come off, and thus the working efficiency is improved.

FIGS. 12A to 12E are views illustrating a first example of a curl forming portion according to the first embodiment provided in the reinforcing bar binding machine of to the embodiment.

Figure 12A:
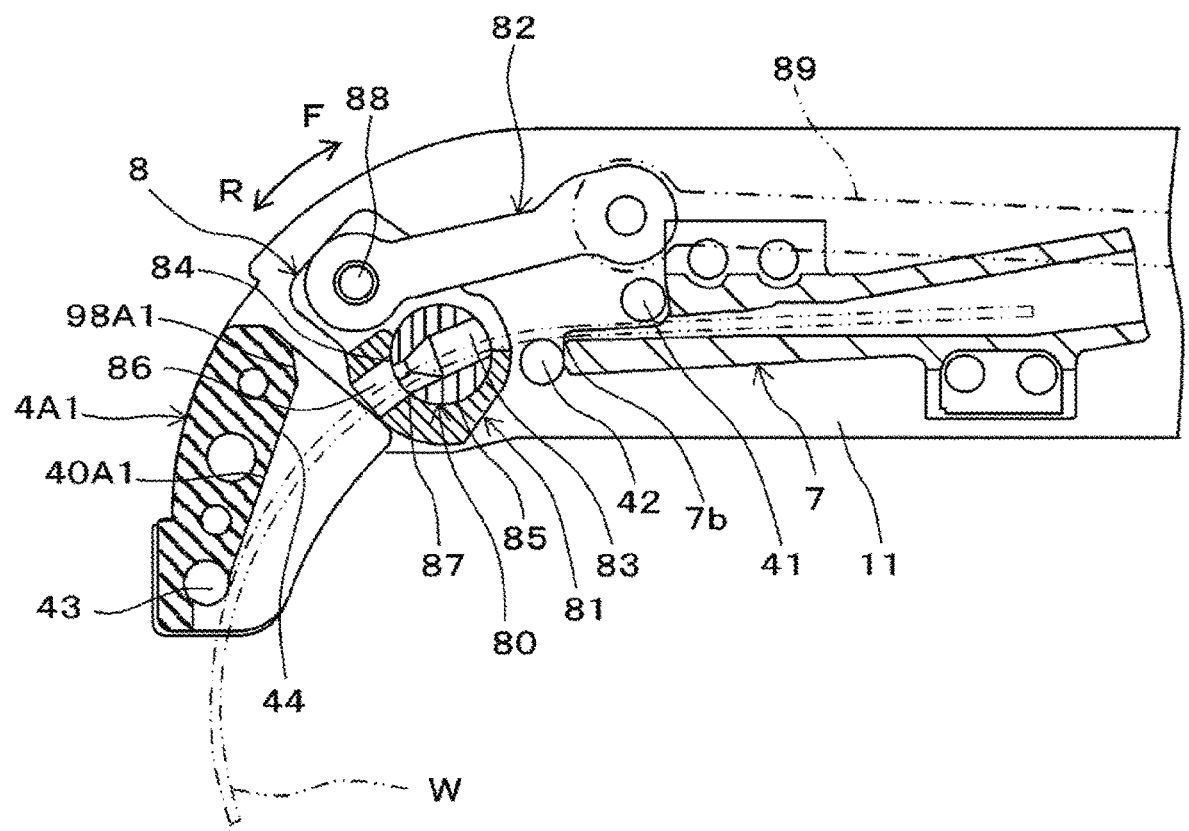
FIG. 12A is a view illustrating a first example of a curl forming portion according to the first embodiment provided in the reinforcing bar binding machine of the embodiment.
Figure 12B:
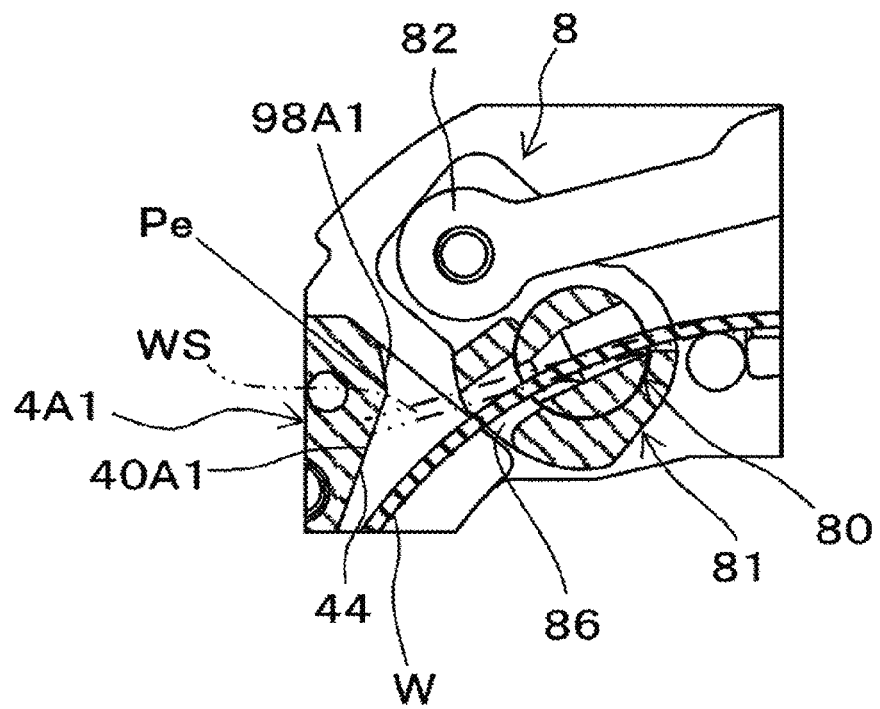
FIG. 12B is a view illustrating the first example of the curl forming portion according to the first embodiment provided in the reinforcing bar binding machine of the embodiment.

As illustrated in FIG. 12A, a curl forming portion 4A1 of the first example of the first embodiment includes a wire retracting portion 98A1 which suppresses the wire W from being pinched between a guide portion 40A1 and the cutting portion 8.

The wire retracting portion 98A1 is provided at an end portion of the guide portion 40A1 which is the end portion on a side facing the movable blade 81. The wire retracting portion 98A1 is formed of a surface inclined with respect to the wire sliding surface 44 in a direction in which the distance from the movable blade 81 increases. The wire retracting portion 98A1 may be formed of a flat surface, a curved surface, or a concavo-convex surface.

In the wire retracting portion 98A1, an end portion Pe on the downstream side along the feeding direction of the wire W is located further on the upstream side along the feeding direction of the wire W than a position where a feeding path WS of the wire W before curl formation which is illustrated by a two-dot chain line is in contact with the wire sliding surface 44.

As a result, the tip end of the wire W before curl formation comes into contact with the wire sliding surface 44 and the wire W is guided to the third wire guide 43, in such a manner that it is possible to make the wire W curl.

Figure 12C:
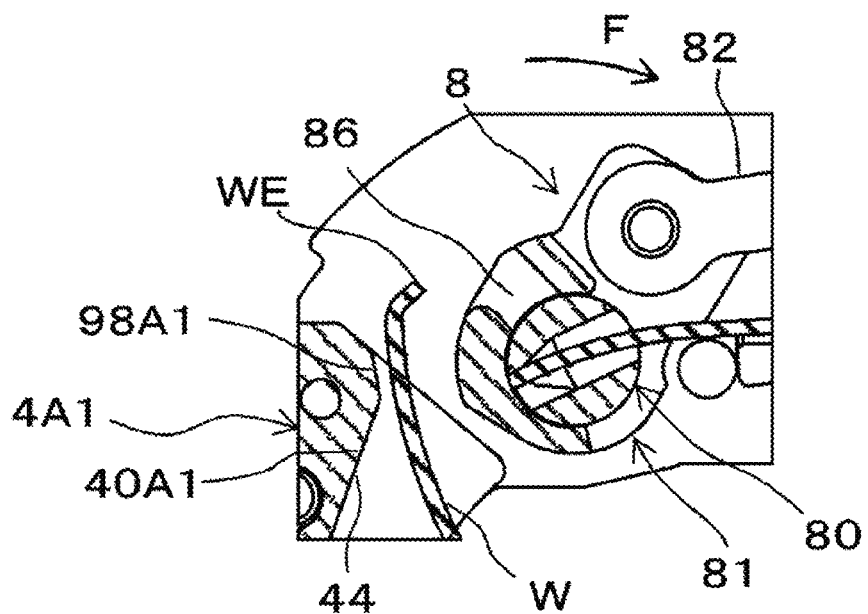
FIG. 12C is a view illustrating the first example of the curl forming portion according to the first embodiment provided in the reinforcing bar binding machine of the embodiment.
Figure 12D:
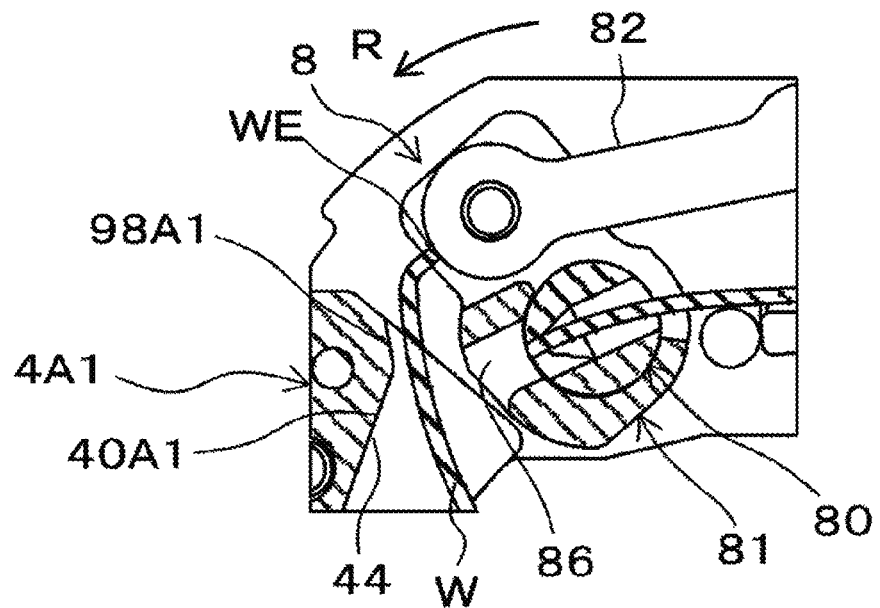
FIG. 12D is a view illustrating the first example of the curl forming portion according to the first embodiment provided in the reinforcing bar binding machine of the embodiment.
Figure 12E:
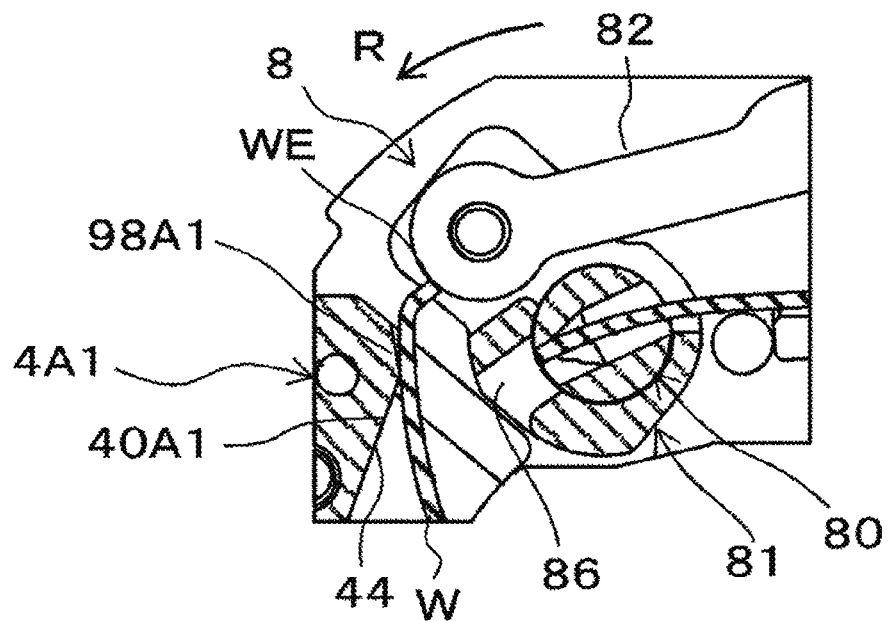
FIG. 12E is a view illustrating the first example of the curl forming portion according to the first embodiment provided in the reinforcing bar binding machine of the embodiment.

When the rear end portion WE of the wire W cannot be held by the movable blade 81 at the rotation finish position illustrated in FIG. 12C, even if the movable blade 81 rotates in the retracting direction indicated by the arrow R as illustrated in FIG. 12D, the rear end portion WE of the wire W does not enter the second wire passage 86 and comes into contact with the driving member 82. However, since the wire retracting portion 98A1 is provided, the distance between the wire sliding surface 44 and the movable blade 81 is further expanded compared to the case or the related art. Therefore, even when the movable blade 81 rotates to the standby position as illustrated in FIG. 12E, the wire W is prevented from being pinched between the wire sliding surface 44 and the movable blade 81 and bent.

Therefore, even when the rear end portion WE of the wire W cannot be held by the movable blade 81, it is suppressed that the wire W after binding becomes hard to come off, and thus the working efficiency is improved.

FIGS. 13A to 13E are views illustrating a second example of the curl forming portion according to the first embodiment provided in the reinforcing bar binding machine of to the embodiment.

Figure 13A:
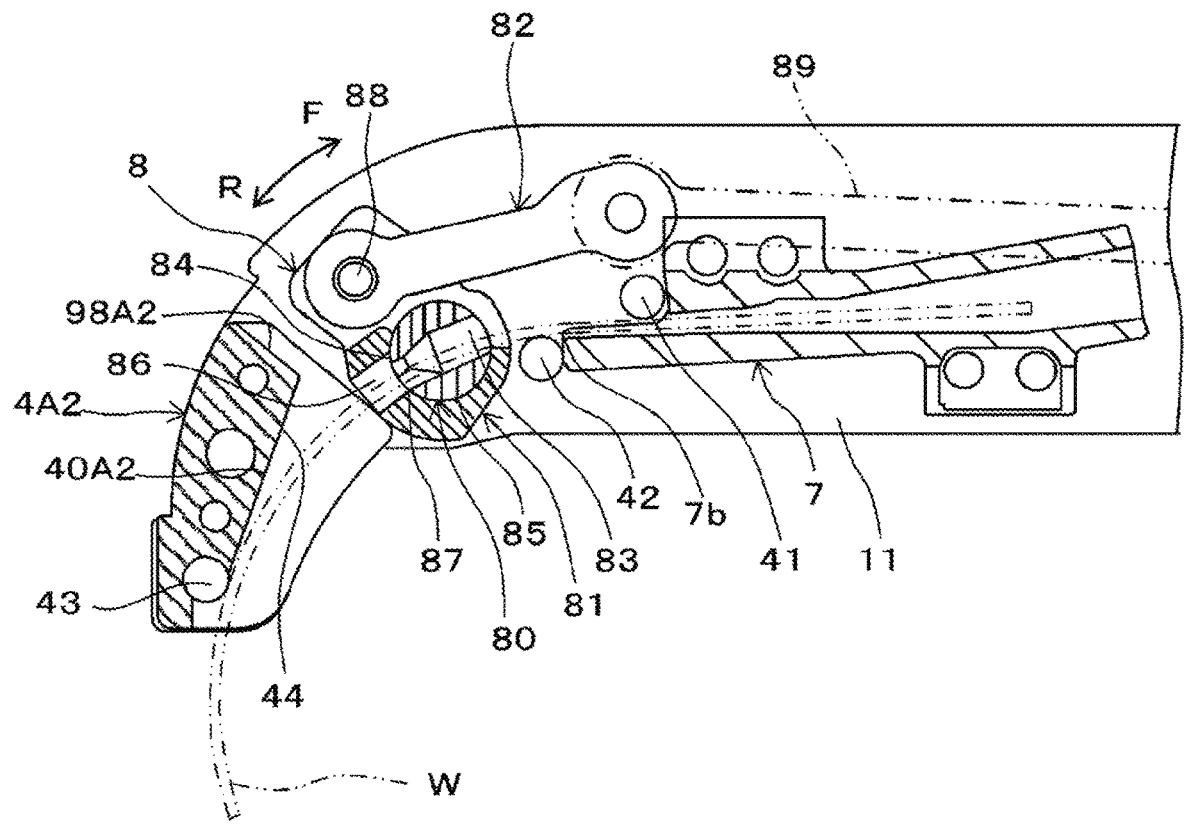
FIG. 13A is a view illustrating a second example of the curl forming portion according to the first embodiment provided in the reinforcing bar binding machine of the embodiment.
Figure 13B:
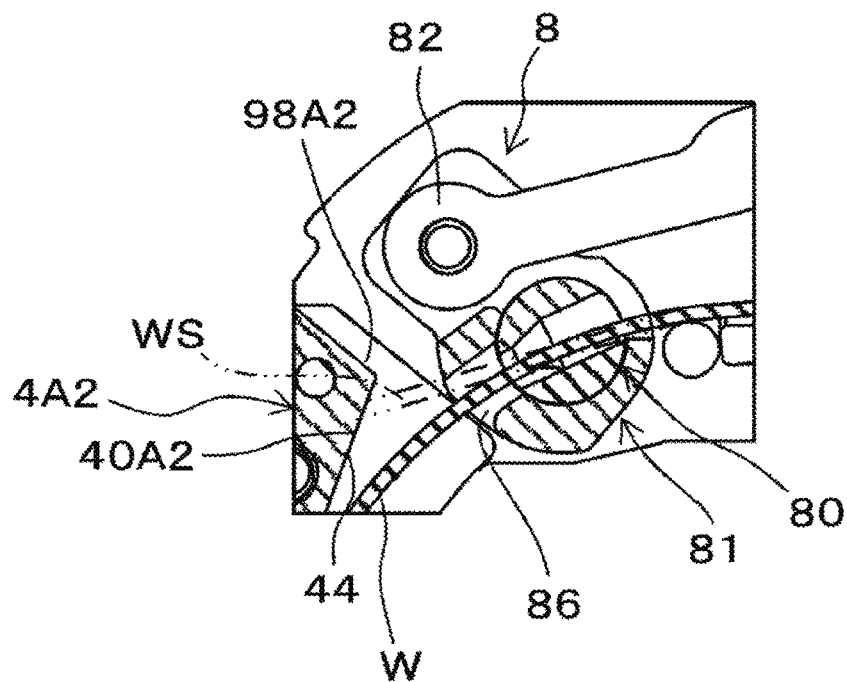
FIG. 13B is a view illustrating the second example of the curl forming portion according to the first embodiment provided in the reinforcing bar binding machine of the embodiment.

As illustrated in FIG. 13A, a curl forming portion 4A2 of the second example of the first embodiment includes a wire retracting portion 98A2 which suppresses the wire W from being pinched between a guide portion 40A2 and the cutting portion 8.

The wire retracting portion 98A2 is provided at an end portion of the guide portion 40A2 which is the end portion on a side facing the movable blade 81. In the wire retracting portion 98A2, an end portion of the guide portion 40A2 on a side facing the movable blade 81, which is an upstream side along the feeding direction of the wire W, is configured by a surface retracted in a direction away from the movable blade 81.

The wire retracting portion 98A2 is located further on the upstream side along the feeding direction of the wire W than a position where the feeding path WS of the wire W before curl formation illustrated by a two-dot chain line comes into contact with the wire sliding surface 44.

As a result, the tip end of the wire W before curl formation comes into contact with the wire sliding surface 44 and the wire W is guided to the third wire guide 43, in such a manner that it is possible to make the wire W curl.

Figure 13C:
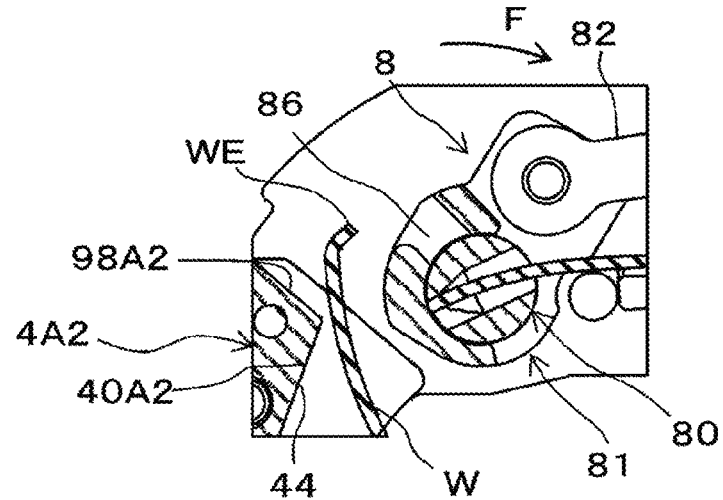
FIG. 13C is a view illustrating the second example of the curl forming portion according to the first embodiment provided in the reinforcing bar binding machine of the embodiment.
Figure 13D:
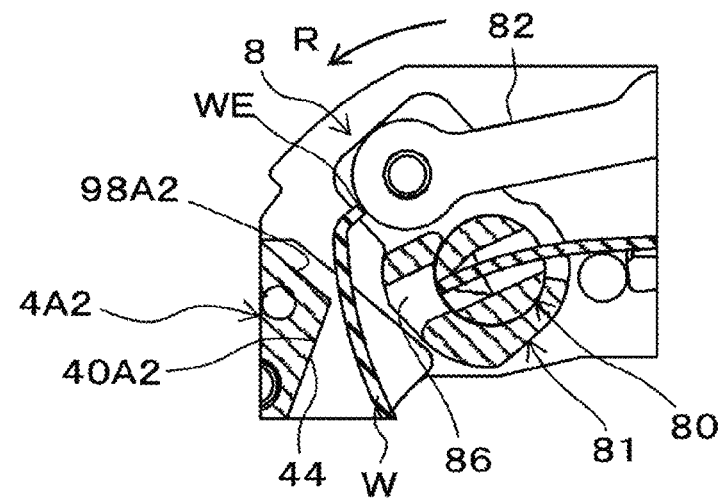
FIG. 13D is a view illustrating the second example of the curl forming portion according to the first embodiment provided in the reinforcing bar binding machine of the embodiment.
Figure 13E:
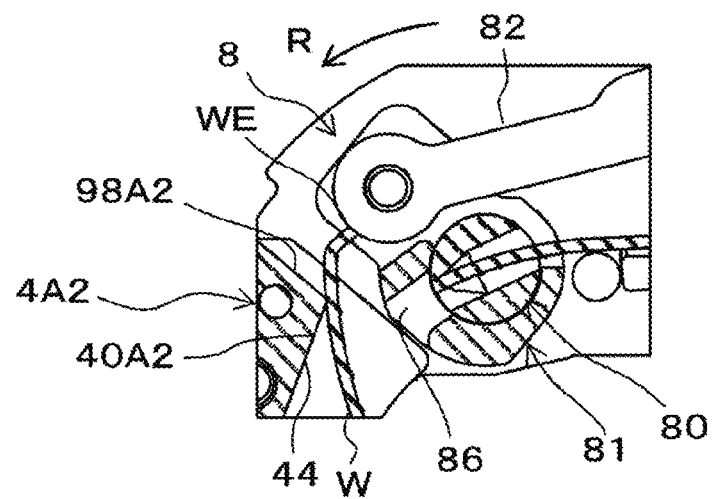
FIG. 13E is a view illustrating the second example of the curl forming portion according to the first embodiment provided in the reinforcing bar binding machine of the embodiment.

When the rear end portion WE of the wire W cannot be held by the movable blade 81 at the rotation finish position illustrated in FIG. 13C, even if the movable blade 81 rotates in the retracting direction indicated by the arrow R as illustrated in FIG. 13D, the rear end portion WE of the wire W does not enter the second wire passage 86 and comes into contact with the driving member 82. However, since the wire retracting portion 98A2 is provided, the distance between the wire sliding surface 44 and the movable blade 81 is further expanded compared to the case or the related art. Therefore, even when the movable blade 81 rotates to the standby position as illustrated in FIG. 13E, the wire W is prevented from being pinched between the wire sliding surface 44 and the movable blade 81 and bent.

Therefore, even when the rear end portion WE of the wire W cannot be held by the movable blade 81, it is suppressed that the wire W after binding becomes hard to come off, and thus the working efficiency is improved.

FIGS. 14A to 14E are views illustrating a third example of the curl forming portion according to the first embodiment provided in the reinforcing bar binding machine of to the embodiment.

Figure 14A:
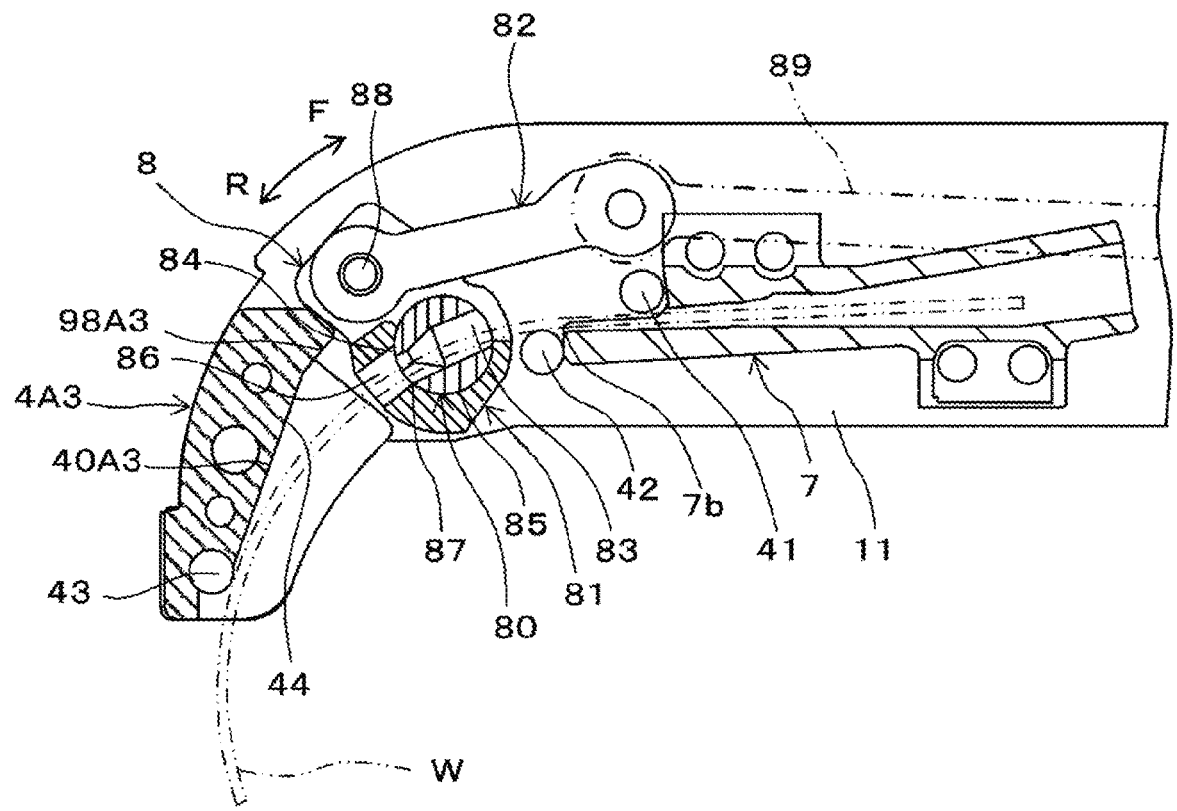
FIG. 14A is a view illustrating a third example of the curl forming portion according to the first embodiment provided in the reinforcing bar binding machine of the embodiment.

As illustrated in FIG. 14A, a curl forming portion 4A3 of the third example of the first embodiment includes a movable range suppressing portion 98A3 which reduces the movable range of the wire W between a guide portion 40A3 and the cutting portion 8.

The movable range suppressing portion 98A3 is provided at an end portion of the guide portion 40A3 which is the end portion on a side facing the movable blade 81. The movable range suppressing portion 98A3 is constituted by extending the end portion of the guide portion 40A3 on a side facing the movable blade 81 in a direction of the movable blade 81 and configured by a surface inclined in a direction in which the distance from movable blade 81 decreases with respect to the wire sliding surface 44.

Figure 14B:
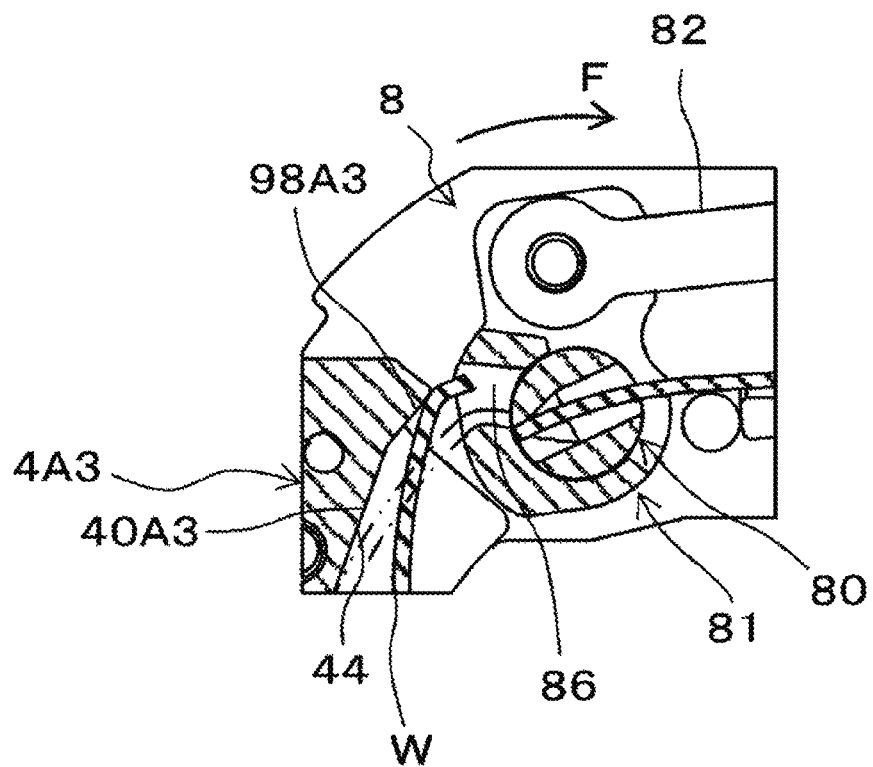
FIG. 14B is a view illustrating the third example of the curl forming portion according to the first embodiment provided in the reinforcing bar binding machine of the embodiment.

When the movable blade 81 rotates in the cutting direction indicated by the arrow F as illustrated in FIG. 14B and cuts the wire W, the wire W may move in a direction of the guide portion 40A3 as indicated by the solid line. The guide portion 40A3 includes the movable range suppressing portion 98A3, so that the distance from the movable blade 81 decreases and the movable range of the wire W is reduced.

Figure 14C:
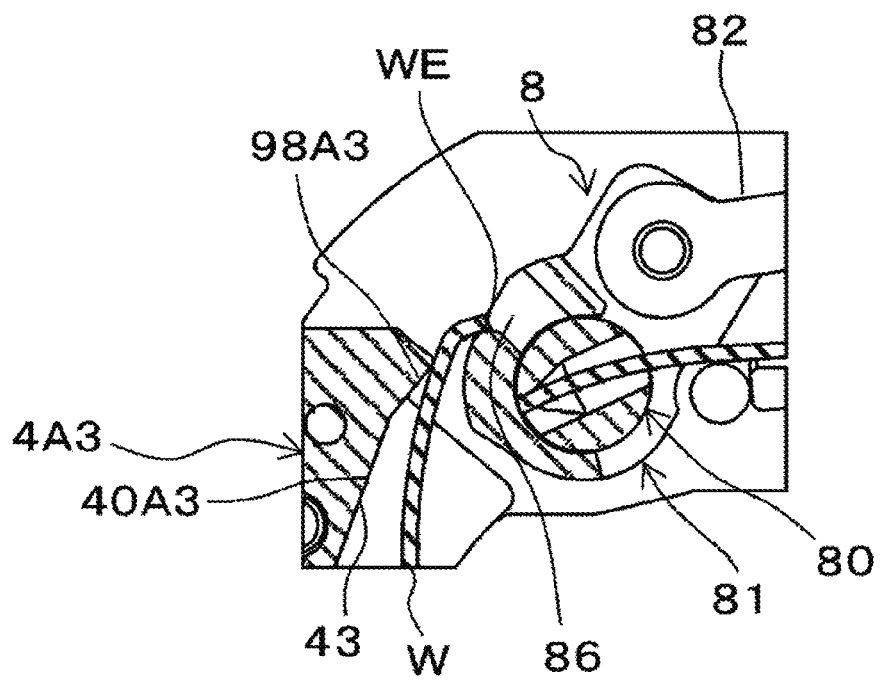
FIG. 14C is a view illustrating the third example of the curl forming portion according to the first embodiment provided in the reinforcing bar binding machine of the embodiment.

Therefore, as illustrated in FIG. 14C, even when the movable blade 81 rotates to the rotation finish position and a force to pull the wire W is applied by a motion for twisting the wire W wound around the reinforcing bar S with the binding portion 5A, a state where the wire W is held by the second wire passage 86 is maintained.

Figure 14D:
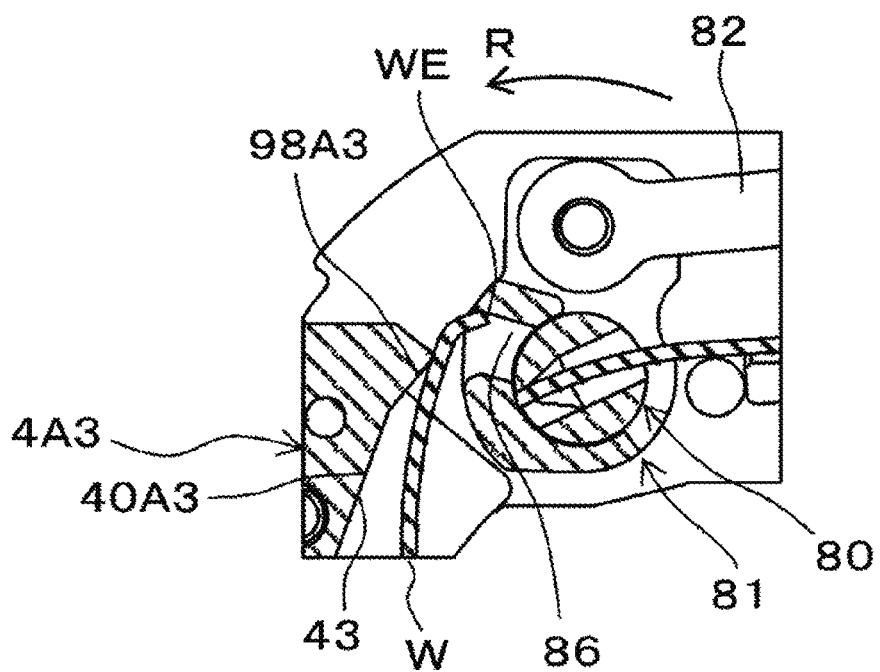
FIG. 14D is a view illustrating the third example of the curl forming portion according to the first embodiment provided in the reinforcing bar binding machine of the embodiment.
Figure 14E:
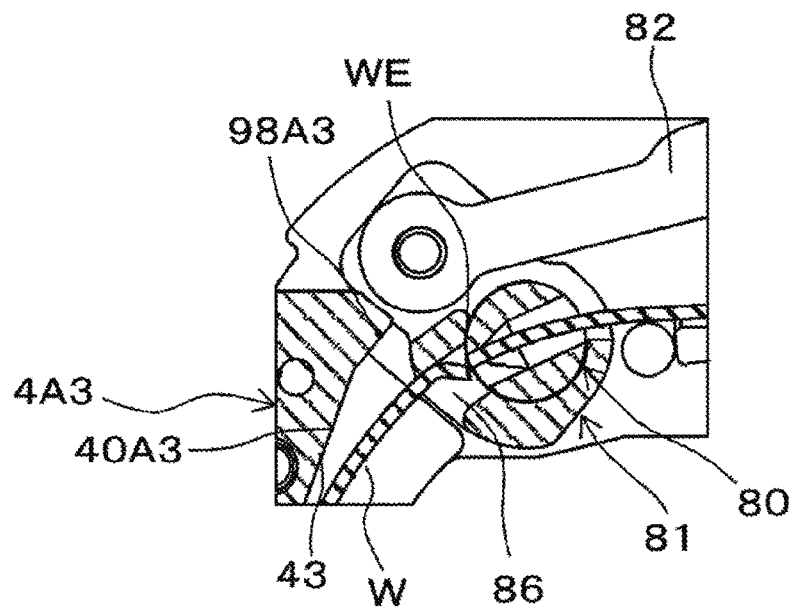
FIG. 14E is a view illustrating the third example of the curl forming portion according to the first embodiment provided in the reinforcing bar binding machine of the embodiment.

Then, when the movable blade 81 rotates in the retracting direction indicated by the arrow R as illustrated in FIG. 14D, the rear end portion WE of the wire W is guided into the second wire passage 86. Thus, even when the movable blade 81 rotates to the standby position as illustrated in FIG. 14E, the wire W is prevented from being pinched between the movable blade 81 and the driving member 82.

Therefore, it is suppressed that the wire W after binding becomes hard to come off, and thus the working efficiency is improved.

FIGS. 15A to 15D are views illustrating a fourth example of the curl forming portion according to the first embodiment provided in the reinforcing bar binding machine of to the embodiment.

Figure 15A:
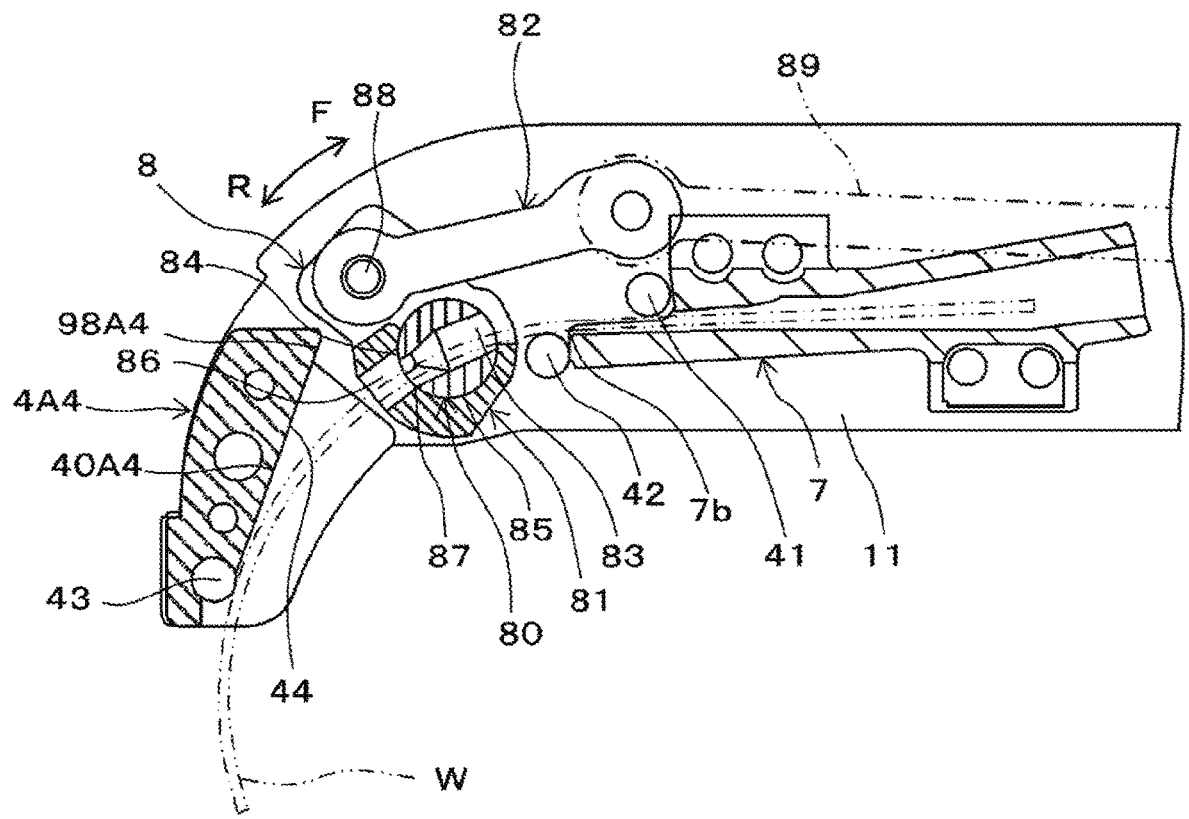
FIG. 15A is a view illustrating a fourth example of the curl forming portion according to the first embodiment provided in the reinforcing bar binding machine of the embodiment.

As illustrated in FIG. 15A, a curl forming portion 4A4 of the fourth example of the first embodiment includes a movable range suppressing portion 98A4 which reduces the movable range of the wire W between the guide portion 40A4 and the cutting portion 8.

The movable range suppressing portion 98A4 is provided at an end portion of the guide portion 40A4 which is the end portion on a side facing the movable blade 81. The movable range suppressing portion 98A4 is constituted by extending the end portion of the guide portion 40A4 on a side facing the movable blade 81 in a direction of the movable blade 81.

Figure 15B:
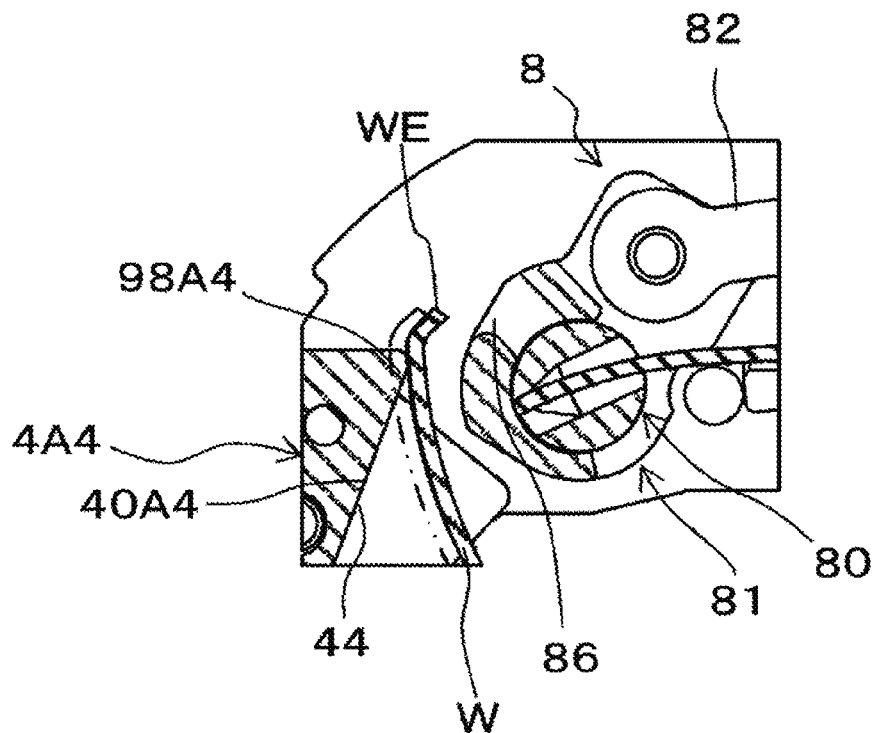
FIG. 15B is a view illustrating the fourth example of the curl forming portion according to the first embodiment provided in the reinforcing bar binding machine of the embodiment.

When the rear end portion WE of the wire W cannot be held by the movable blade 81 at the rotation finish position illustrated in FIG. 15B, in a configuration not provided with the movable range suppressing portion 98A4, the wire W can move to a position illustrated by a two-dot chain line. On the other hand, by extending the guide portion 40A4 in the direction of the movable blade 81 and providing the movable range suppressing portion 98A4, the distance between the guide portion 40A4 and the movable blade 81 decreases, and thus the movable range of the wire W is reduced.

Figure 15C:
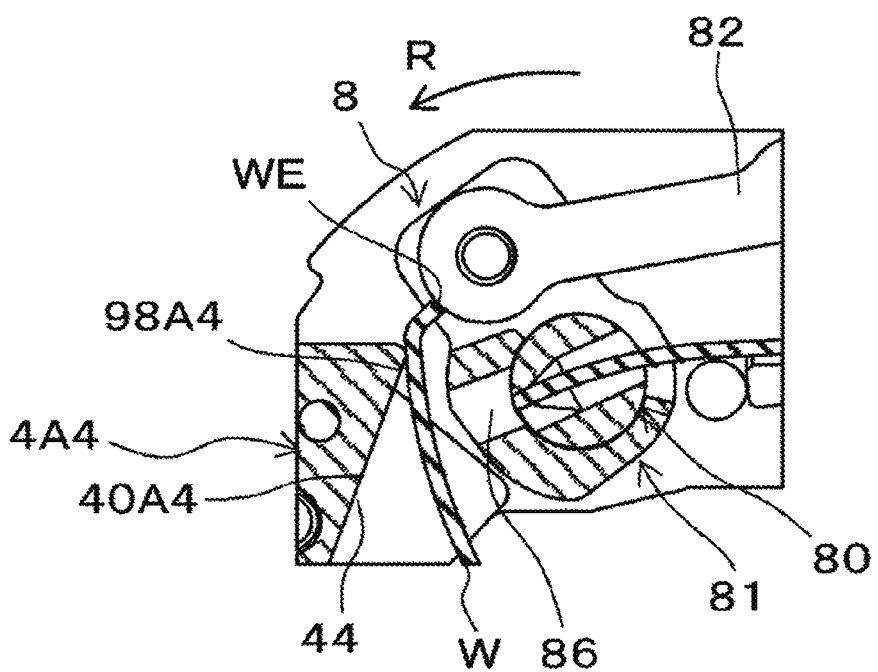
FIG. 15C is a view illustrating the fourth example of the curl forming portion according to the first embodiment provided in the reinforcing bar binding machine of the embodiment.
Figure 15D:
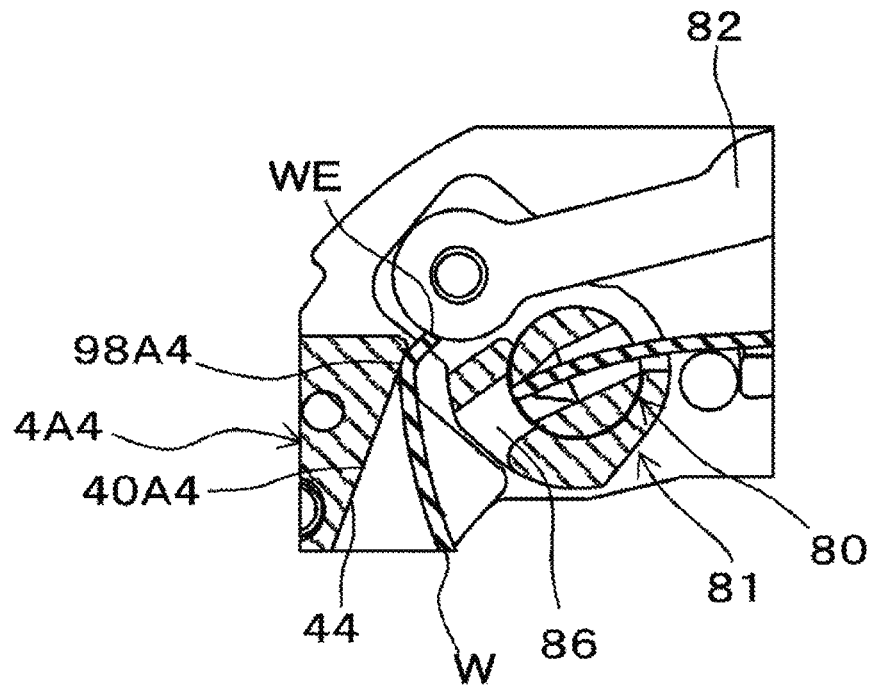
FIG. 15D is a view illustrating the fourth example of the curl forming portion according to the first embodiment provided in the reinforcing bar binding machine of the embodiment.

Therefore, when the movable blade 81 rotates to the retracting direction indicated by the arrow R as illustrated in FIG. 15C, the rear end portion WE of the wire W is pushed by the driving member 82 and guided to the direction of wire sliding surface 44. As a result, even when the movable blade 81 rotates to the standby position as illustrated in FIG. 15D, the wire W is prevented from being pinched between the driving member 82 and the guide portion 40A4.

Therefore, it is suppressed that the wire W after binding becomes hard to come off, and thus the working efficiency is improved.

Figure 16A:
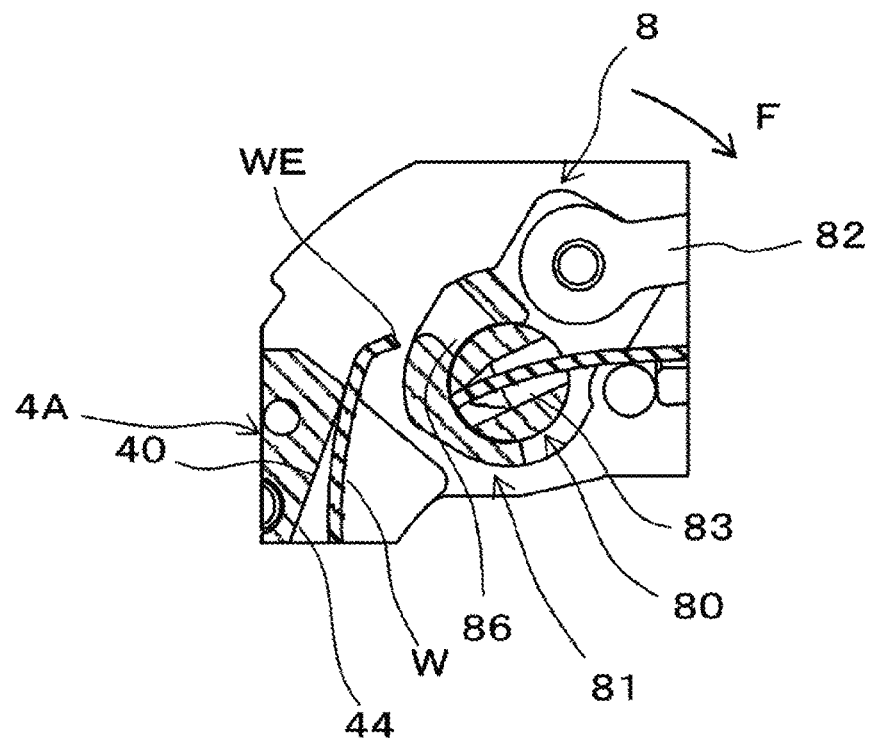
FIG. 16A is a view illustrating another embodiment of the reinforcing bar binding machine of the embodiment.
Figure 16B:
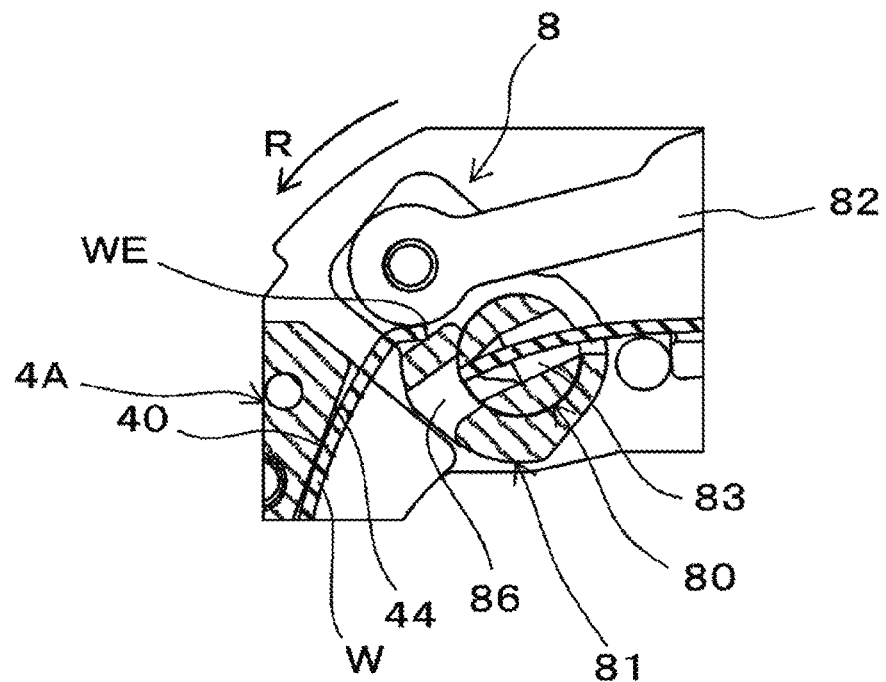
FIG. 16B is a view illustrating another embodiment of the reinforcing bar binding machine of the embodiment.
Figure 16C:
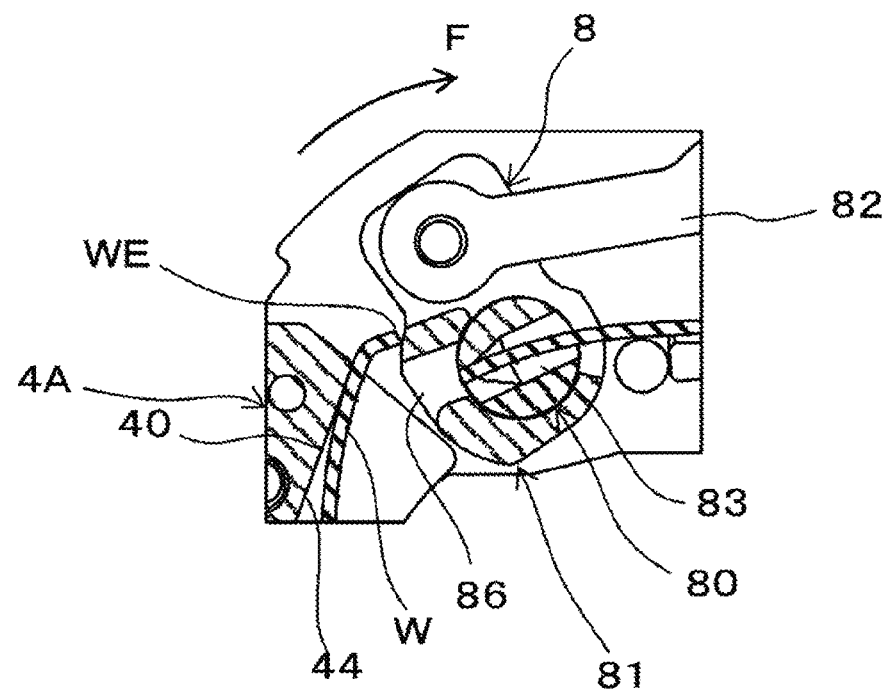
FIG. 16C is a view illustrating another embodiment of the reinforcing bar binding machine of the embodiment.
Figure 16D:
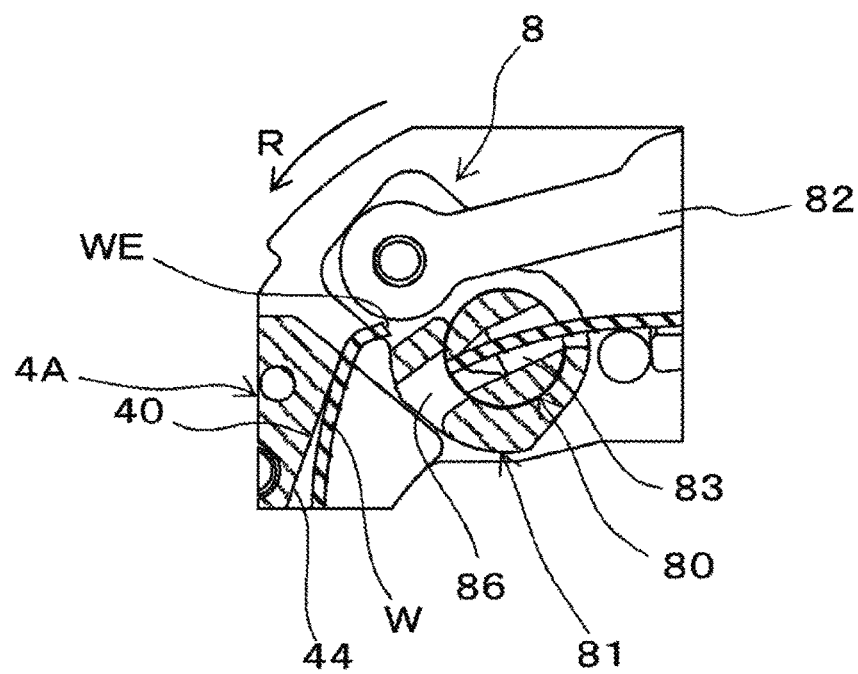
FIG. 16D is a view illustrating another embodiment of the reinforcing bar binding machine of the embodiment.
Figure 17:
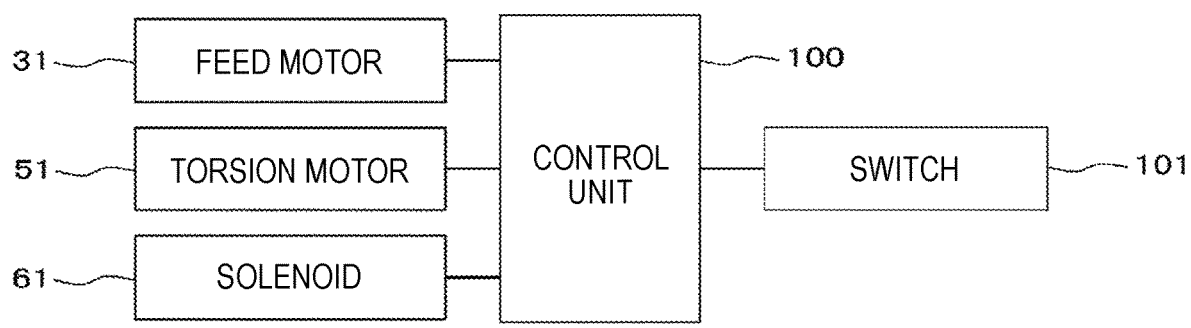
FIG. 17 is a block diagram illustrating another embodiment of the reinforcing bar binding machine of the embodiment.
Figure 18:
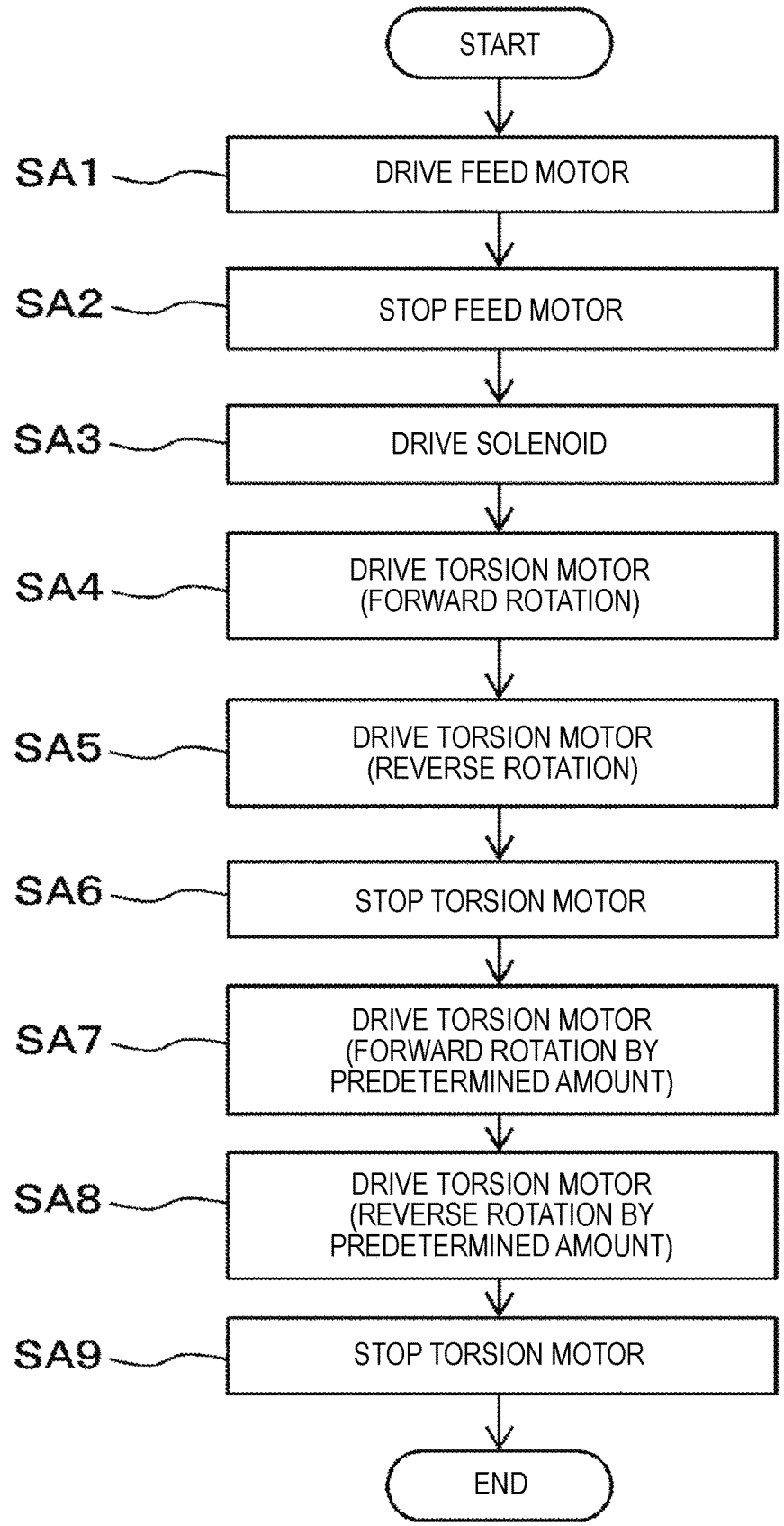
FIG. 18 is a flow chart illustrating another embodiment of the reinforcing bar binding machine of the embodiment.

FIGS. 16A to 16D are views illustrating another embodiment of the reinforcing bar binding machine of the embodiment and FIG. 17 is a block diagram illustrating another embodiment of the reinforcing bar binding machine of the embodiment. FIG. 18 is a flow chart illustrating another embodiment of the reinforcing bar binding machine of the embodiment and the control of the cutting portion 8 suppresses the wire W after cutting from being pinched.

In a reinforcing bar binding machine 1A, the movement of the advancing and retracting cylinder portion 54, which is moved by the rotational movement of the torsion motor 51 illustrated in FIG. 2, is transmitted to the driving member 82 illustrated in FIGS. 16A to 16D and the movable blade 81 of the cutting portion 8 is driven. As a result, the torsion motor 51 becomes a driving unit of the driving member 82. The reinforcing bar binding machine 1A includes a control unit 100 which controls the torsion motor 51. When a switch 101 is operated by the operation of the trigger 10t, the control unit 100 controls the feed motor 31, the solenoid 61, and the torsion motor 51 according to a prestored program.

When the switch 101 is operated by operating the trigger 10t, the control unit 100 drives the feed motor 31 at Step SA1 of FIG. 18. The control unit 100 controls the amount of rotation of the feed motor 31 by a known method, and by rotating the feed motor 31 by a predetermined amount, the wire W is sent by a predetermined amount, whereby the wire W is wound around the reinforcing bar S by the curl forming portion 4A illustrated in FIG. 1 and the like.

When the control unit 100 rotates the feed motor 31 by a predetermined wire-W-feeding amount, the control unit 100 stops the feed motor 31 in Step SA2. When the control unit 100 stops the feed motor 31, the solenoid 61 is driven at Step SA3 and the reel brake 60 is operated to regulate the rotation of the wire reel 20.

The control unit 100 drives the solenoid 61, and then drives the torsion motor 51 at Step SA4 and makes the torsion motor 51 rotating forward. The control unit 100 controls the amount of rotation of the torsion motor 51 by a known method and, first, the forward movement of the advancing and retracting cylinder portion 54 illustrated in FIG. 2 is transmitted to the driving member 82 by a driving force transmission mechanism (not illustrated), whereby the movable blade 81 rotates in the cutting direction indicated by the arrow F as illustrated in FIG. 16A and the wire W is cut.

Also, in conjunction with the advancing of the advancing and retracting cylinder portion 54, the torsion hook 55 is operated in a closing direction and a part of the wire wound in a loop shape is grasped. After the movable blade 81 rotates to the rotation finish position which is the movement finish position, the connection between the advancing and retracting cylinder portion 54 and the driving member 82 is disconnected. Then, by rotating the advancing and retracting cylinder portion 54, the torsion hook 55 grasping the wire W rotates and the wire W is twisted.

The control unit 100 reverses the torsion motor 51 at Step SA5 when the torsion motor 51 is rotated forward by the amount necessary for the twisting operation described above. When the torsion motor 51 is reversed, the advancing and retracting cylinder portion 54 and the torsion hook 55 move backward and the torsion hook 55 opens to release the wire W. The control unit 100 reverses the torsion motor 51 until the advancing and retracting cylinder portion 54 and the torsion hook 55 move to the standby position. The advancing and retracting cylinder portion 54 and the driving member 82 are re-connected while the advancing and retracting cylinder portion 54 and the torsion hook 55 move to the standby position and, as illustrated in FIG. 16B, the movable blade 81 rotates in the retracting direction indicated by the arrow R.

When the control unit 100 reverses the torsion motor 51 by an amount necessary for moving the advancing and retracting cylinder portion 54 and the movable blade 81 to the standby position, the torsion motor 51 is stopped in Step SA6.

In a state where the tip end portion of the first engagement surface 91 described above is worn out, when the movable blade 81 rotates to the rotation finish position, which is the movement finish position, and then a force to pull the wire W is applied by motion for twisting the wire W wound around the reinforcing bar S with the binding portion SA, as illustrated in FIG. 16A, the rear end portion WE of the wire W may not be held by the movable blade 81.

When the rear end portion WE of the wire W cannot be held by the movable blade 81, as illustrated in FIG. 16B, the rear end portion WE of the wire W may be pinched between the driving member 82 and the movable blade 81 as the movable blade 81 rotates in the retracting direction indicated by the arrow R.

After rotating the movable blade 81 to the standby position in consideration of such a case, in Step SA7, the control unit 100 causes the torsion motor 51 to rotate forward by a predetermined amount. By causing the torsion motor 51 to rotate forward by a predetermined amount from the state where the movable blade 81 is at the standby position, the movable blade 81 rotates by a predetermined amount in the cutting direction indicated by the arrow F as illustrated in FIG. 16C. As a result, the movable blade 81 and the driving member 82 move in a direction away from the rear end portion WE of the wire W, so that the wire W pinched between the driving member 82 and the movable blade 81 is released. Then, the control unit 100 reverses the torsion motor 51 by a predetermined amount necessary for moving the advancing and retracting cylinder portion 54 and the movable blade 81 to the standby position in Step SA8 and stops the torsion motor 51 in Step SA9. As a result, as illustrated in FIG. 16D, when the movable blade 81 rotates in the retracting direction indicated by the arrow R and moves to the standby position, the wire W is prevented from being pinched between the movable blade 81 and the driving member 82.

Therefore, it is suppressed that the wire W after binding becomes hard to come off, and thus the working efficiency is improved. In addition, even when the cutting portion and the guide portion have the configuration of the related art, it is possible to suppress the wire W from being pinched only by the control of the movable blade.

The invention claimed is:

1. A binding machine, comprising:
a wire feeding portion which feeds a wire;
a cutting portion which is provided on a downstream side of the wire feeding portion along a feeding direction of the wire fed by the wire feeding portion and cuts the wire; and
a guide portion which is provided on a downstream side of the cutting portion along the feeding direction of the wire and causes the wire to curl by regulating an advancing direction of the wire,
wherein the cutting portion includes:
a fixed blade in which a first wire passage through which the wire passes is formed;
a movable blade in which a second wire passage through which the wire passes is formed and which slides on an outer peripheral surface of the fixed blade and cuts the wire;
a driving member which is connected to the movable blade and drives the movable blade;
a driving portion which drives the driving member; and
a controller which controls the driving portion,
wherein the movable blade is driven by the driving member between a standby position where the first wire passage and the second wire passage communicate with each other and a movement finish position where the first wire passage and the second wire passage do not communicate with each other by sliding on the outer peripheral surface of the fixed blade, and
the controller is configured to control the driving portion, during a single binding operation, to move the driving member to cause the movable blade to move:
from the standby position to the movement finish position in a wire cutting direction to cut the wire, then
from the movement finish position to the standby position in a reverse direction that is opposite of the wire cutting direction, then
from the standby position towards the movement finish position by a predetermined amount in the wire cutting direction
return back to the standby position.

* * * * *